United States Patent [19]
Wade et al.

[11] Patent Number: 5,872,987
[45] Date of Patent: Feb. 16, 1999

[54] MASSIVELY PARALLEL COMPUTER INCLUDING AUXILIARY VECTOR PROCESSOR

[75] Inventors: Jon P. Wade, Cambridge; Daniel R. Cassiday, Topsfield; Robert D. Lordi, Wayland; Guy Lewis Steele, Jr.; Margaret A. St. Pierre, both of Lexington; Monica C. Wong-Chan, Cambridge; Zahi S. Abuhamdeh, Newton; David C. Douglas, Concord; Mahesh N. Ganmukhi, Littleton; Jeffrey V. Hill, Malden; W. Daniel Hillis, Cambridge; Scott J. Smith, Boston; Shaw-Wen Yang, Waltham; Robert C. Zak, Jr., Lexington, all of Mass.

[73] Assignee: Thinking Machines Corporation, Cambridge, Mass.

[21] Appl. No.: 714,635

[22] Filed: Sep. 16, 1996

Related U.S. Application Data

[63] Continuation of Ser. No. 559,507, Nov. 15, 1995, abandoned, which is a continuation of Ser. No. 306,853, Sep. 15, 1994, abandoned, which is a continuation of Ser. No. 926,980, Aug. 7, 1992, abandoned.

[51] Int. Cl.$^6$ ........................................................ G06F 7/02
[52] U.S. Cl. ................................ 395/800.03; 395/800.1; 395/800.11; 364/DIG. 1
[58] Field of Search .............................. 395/800, 800.01, 395/800.1, 800.11, 800.16; 364/DIG. 1

[56] References Cited

U.S. PATENT DOCUMENTS

| | | | |
|---|---|---|---|
| 4,048,593 | 9/1977 | Zillman ................................ | 333/70 R |
| 4,435,765 | 3/1984 | Uchida et al. ........................... | 395/550 |
| 4,591,814 | 5/1986 | Ito et al. .................................. | 333/177 |
| 4,664,456 | 5/1987 | Blair et al. ............................. | 339/14 P |
| 4,727,474 | 2/1988 | Batcher ................................... | 395/800 |
| 4,786,258 | 11/1988 | Shaffer et al. .......................... | 439/188 |
| 4,891,751 | 1/1990 | Call et al. ............................... | 395/800 |
| 5,006,978 | 4/1991 | Neches .................................... | 395/650 |
| 5,008,882 | 4/1991 | Peterson et al. ....................... | 370/94.3 |
| 5,010,477 | 4/1991 | Omoda et al. .......................... | 395/800 |
| 5,123,095 | 6/1992 | Papadopoulos et al. ............... | 395/375 |
| 5,151,042 | 9/1992 | Okada ..................................... | 439/169 |

(List continued on next page.)

OTHER PUBLICATIONS

Tseung et al. "Guaranteed, Reliable, Secure Broadcast Networks", IEEE, May 1990, pp. 576–583.
U.S. Patent Application Serial No. 08/202,394 filed Feb. 25, 1994 (Abstract and Drawings only included).

*Primary Examiner*—Alyssa H. Bowler
*Assistant Examiner*—Dzung C. Nguyen
*Attorney, Agent, or Firm*—Cesari and McKenna, LLP

[57] ABSTRACT

A massively-parallel computer includes a plurality of processing nodes and at least one control node interconnected by a network. The network faciliates the transfer of data among the processing nodes and of commands from the control node to the processing nodes. Each each processing node includes an interface for transmitting data over, and receiving data and commands from, the network, at least one memory module for storing data, a node processor and an auxiliary processor. The node processor receives commands received by the interface and processes data in response thereto, in the process generating memory access requests for facilitating the retrieval of data from or storage of data in the memory module. The node processor further controlling the transfer of data over the network by the interface. The auxiliary processor is connected to the memory module and the node processor. In response to memory access requests from the node processor, the auxiliary processor performs a memory access operation to store data received from the node processor in the memory module, or to retrieve data from the memory module for transfer to the node processor. In response to auxiliary processing instructions from the node processor, the auxiliary processor performs data processing operations in connection with data in the memory module.

7 Claims, 20 Drawing Sheets

U.S. PATENT DOCUMENTS

| | | | |
|---|---|---|---|
| 5,212,773 | 5/1993 | Hillis | 395/800 |
| 5,218,602 | 6/1993 | Grant et al. | 370/58 |
| 5,230,079 | 7/1993 | Grondalski | 395/800 |
| 5,239,629 | 8/1993 | Miller et al. | 395/325 |
| 5,239,748 | 8/1993 | Hamilton | 29/843 |
| 5,247,613 | 9/1993 | Bromley | 395/200 |
| 5,247,694 | 9/1993 | Dahl | 395/800 |
| 5,316,486 | 5/1994 | Tanaka et al. | 439/62 |
| 5,326,272 | 7/1994 | Harhen et al. | 439/86 |
| 5,334,057 | 8/1994 | Blackwell | 439/839 |

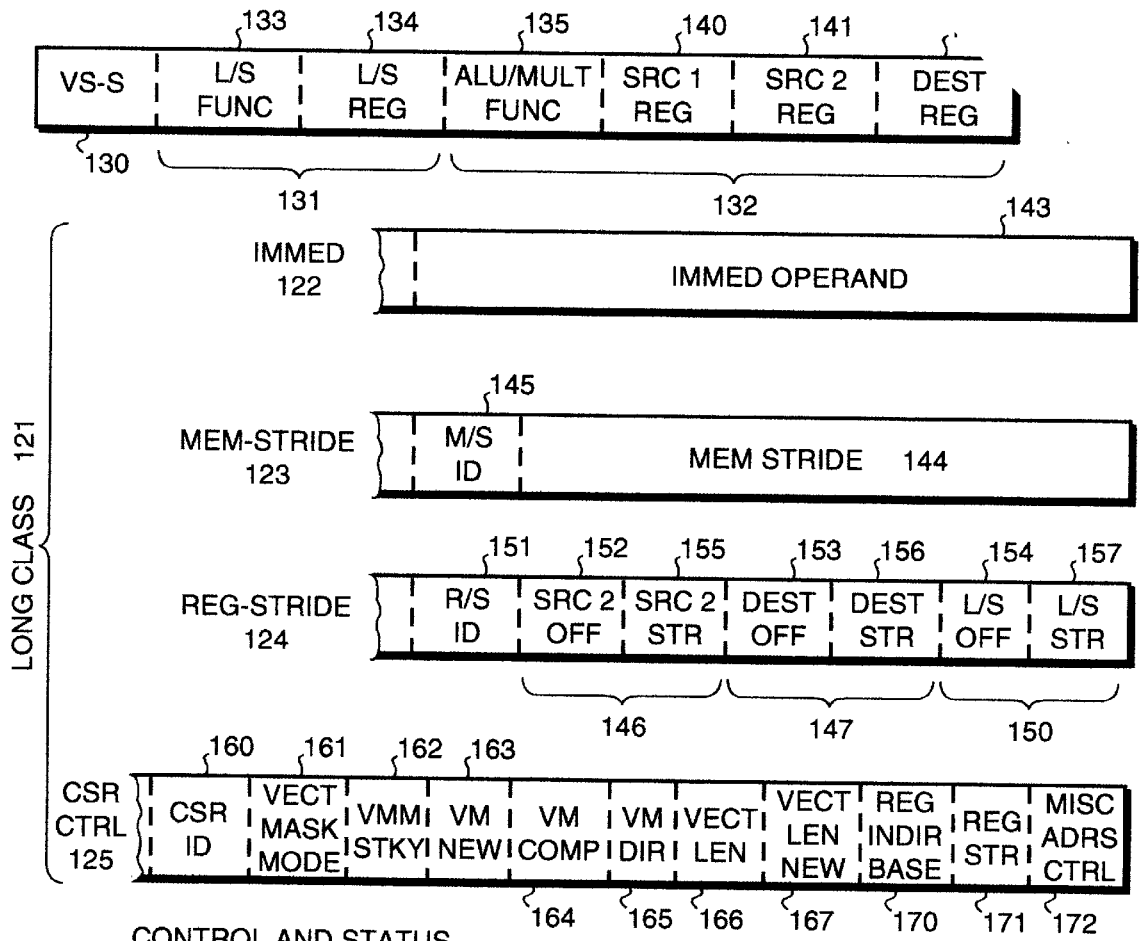
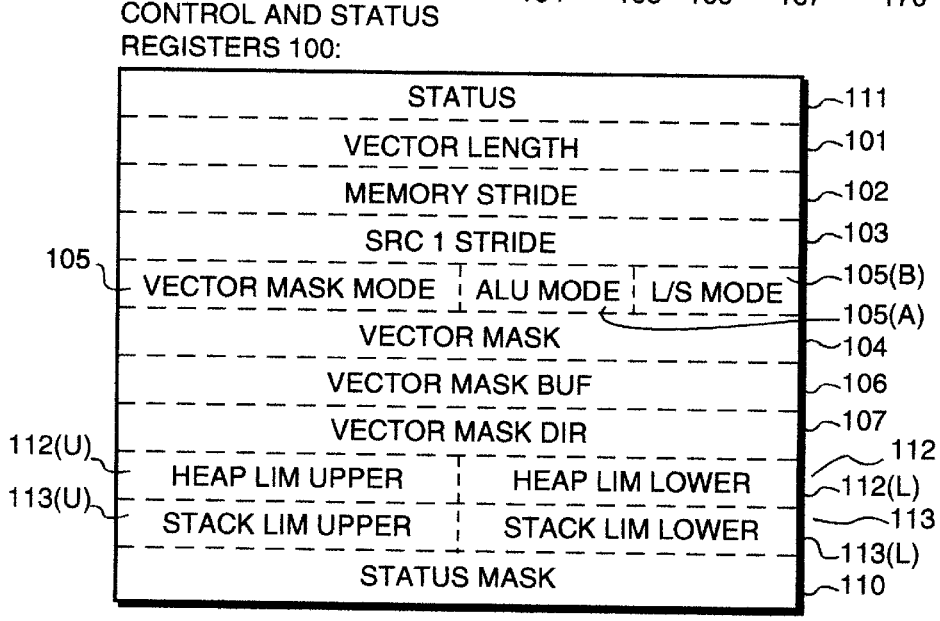
FIG. 2C

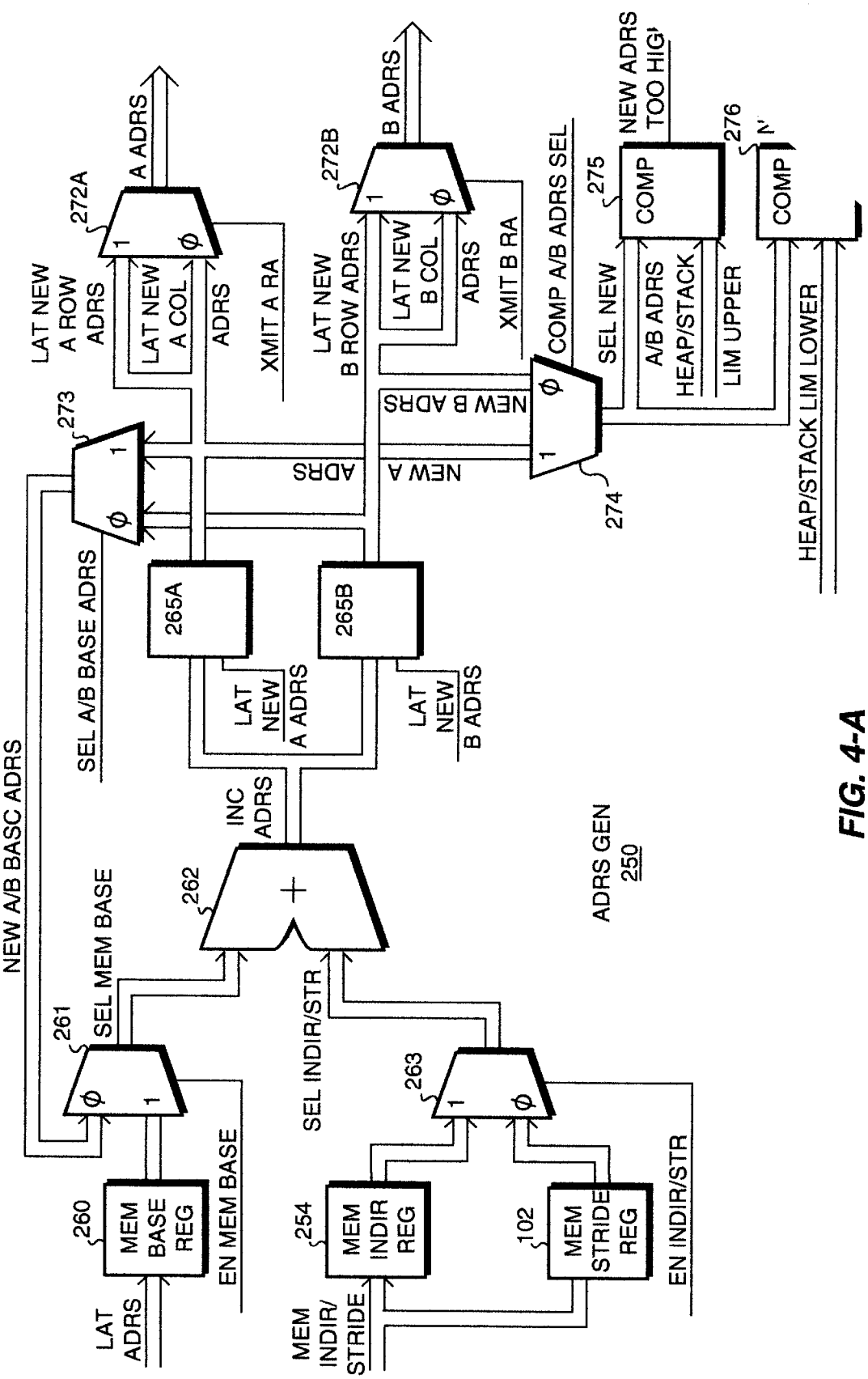
FIG. 4-A

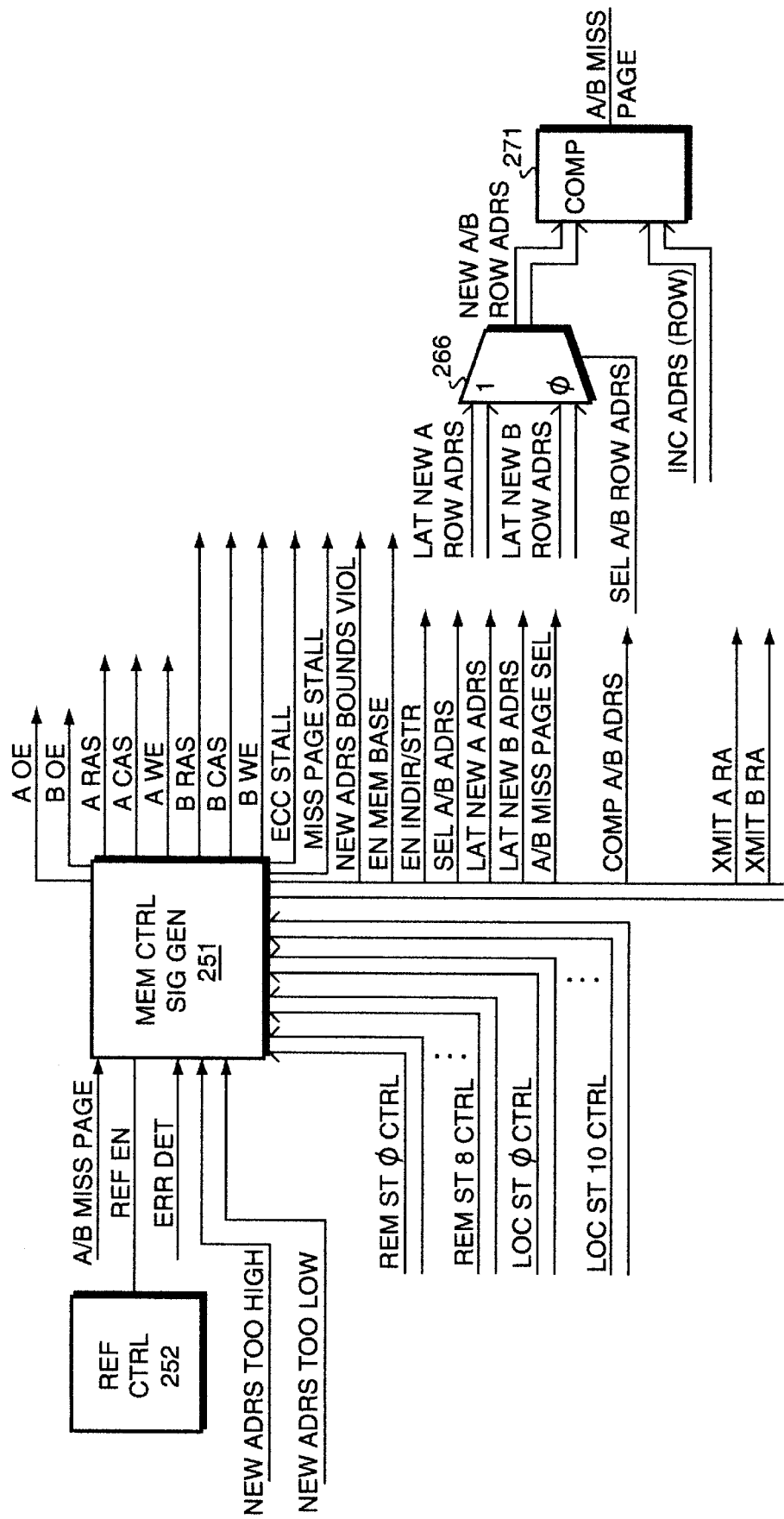
FIG. 4-B

```
     ┌─────┐
     │ Fig │
     │ 7B  │
     │  a  │
     └──┬──┘
        ▼
```

STATE LO-L(7): PERFORM ERR DET. ENABLE DATA INT 51 TO TRANSMIT DATA SIGNALS ONTO B BUS 36. ENABLE LD/STR REG ID GEN 61 TO TRANSMIT L/S REG ID SIGNALS TO REG FILE 34, CONDITIONED ON STATE OF VECTOR MASK BIT FOR CURRENT VECTOR ELEMENT, ENABLE REG FILE 34 TO LOAD DATA FROM B BUS INTO IDENTIFIED REG.

↓ NO ERR

STATE LO-L(8): ENABLE SRC 1, SRC 2 AND DEST REG ID GEN 62, 63 AND 64 TO TRANSMIT SRC 1 REG ID, SRCE 2 REG ID AND DEST REG ID SIGNALS TO REG FILE 34 AND ENABLE REG FILE 34 TO TRANSMIT CONTENTS OF IDENTIFIED REG TO ALU/MULT 66. CONDITIONED ON STATE OF VECTOR MASK BIT FOR CURRENT VECTOR ELEMENT, ENABLE TRANSMISSION OF SEL FUNC SIGNALS TO ALU/MULT 66

STATE LO-L(9) TO LO-L(13): WAIT FOR DATA FROM ALU/MULT 66

STATE LO-L(14): ENABLE REG FILE 34 TO LOAD DATA FROM ALU/MULT 66 IN REG IDENTIFIED BY DEST REG ID SIGNALS

STATE LO-L(15): ENABLE VECTOR MASK REG 104(A/B) TO LATCH SEL STATUS BIT

*FIG. 7B*

LOCAL OPERATION (WITH STORE)

STATE L0-S(0): ENABLE REG FILE 34 TO TRANSMIT CONTENTS OF REG IDENTIFIED BY INDIR REG ID SIGNALS FROM INDIR ADRS REG ID GEN 65 ONTO A BUS 35.

STATE L0-S(1): ENABLE REG 254 TO LATCH MEM INDIR/STRIDE SIGNALS FROM A BUS 36 AND COUPLE THEM TO ADDER 262.

STATE L0-S(2): ADDER GENERATES INC ADRS SIGNALS IN RESPONSE TO SIGNALS FROM REG 254 AND BASE ADDRESS SIGNALS PREVIOUSLY LATCHED IN REG 260, WHCIH CORRESPOND TO ADDRESS SIGNALS FROM PROC BUS 23. ENABLE REG 265A/B TO LATCH INC ADRS SIGNALS

STATE L0-S(3): TEST FOR MISS PAGE STALL CONDITION. ENABLE MUX 272A/B TO TRANSMIT A/B COL ADRS SIGNALS AS A/B ADRS SIGNALS, ASSERT A/B CAS SIGNAL

STATE L0-S(4): NEGATE A/B CAS SIGNAL

↓ NO

STATE L0-S(5):

STATE L0-S(6): ENABLE DATA INT 51 TO LATCH A/B DATA SIGNALS, ENABLE REG FILE 34 TO TRANSMIT DATA FROM REG IDENTIFIED BY L/S REG ID SIGNALS ONTO B BUS 36.

MASSIVELY PARALLEL COMPUTER INCLUDING AUXILIARY VECTOR PROCESSOR

This is a continuation of Ser. No. 559,507, filed Nov. 15, 1995 abandoned, which is a continuation of application Ser. No. 08/306,853 filed on Sep. 15, 1994 which is continuation of application Ser. No. 07/926,980 filed on Aug. 7, 1992, abandoned.

CROSS REFERENCE

U.S. patent application Ser. No. 07/592,029, filed Oct. 3, 1990, in the name of David. C. Douglas, et al., for Parallel Computer System.

U.S. patent application Ser. No. 07/602,441, filed Oct. 23, 1990, in the name of W. Daniel Hillis, and entitled Parallel Processor.

U.S. patent application Ser. No. 07/746,035, filed Aug. 18, 1991, in the name of David C. Douglas, et al., for Massively Parallel Computer Partitionable Through A Switchable Fat-Tree Control Network.

U.S. patent application Ser. No. 07/746,038, filed Aug. 18, 1991, in the name of David S. Wells, et al., for Input/Output System For Massively Parallel Computer System.

FIELD OF THE INVENTION

The invention relates generally to the field of digital computer systems, and more particularly to massively parallel computer systems.

BACKGROUND OF THE INVENTION

A digital computer system generally comprises three basic elements, namely, a memory element, an input/output element and a processor element. The memory element stores information in addressable storage locations. This information includes data and instructions for processing the data. The processor element fetches information from the memory element, interprets the information as either an instruction or data, processes the data in accordance with the instructions, and returns the processed data to the memory element. The input/output element, under control of the processor element, also communicates with the memory element to transfer information, including instructions and the data to be processed, to the memory, and to obtain processed data from the memory.

Most modern computing systems are considered "von Neumann" machines, since they are generally constructed according to a paradigm attributed to John von Neumann. Von Neumann machines are characterized by having a processing element, a global memory which stores all information in the system, and a program counter that identifies the location in the global memory of the instruction being executed. The processing element executes one instruction at a time, that is, the instruction identified by the program counter. When the instruction is executed, the program counter is advanced to identify the location of the next instruction to be processed. (In many modern systems, the program counter is actually advanced before the processor has finished processing the current instruction.)

Von Neumann systems are conceptually uncomplicated to design and program, since they do only one operation at a time. A number of advancements have been made to the original von Neumann paradigm to permit the various parts of the system, most notably the various components of the processor, to operate relatively independently and achieve a significant increase in processing speed. One such advancement is pipelining of the various steps in executing an instruction, including instruction fetch, operation code decode (a typical instruction includes an operation code which identifies the operation to be performed, and in most cases one or more operand specifiers, which identify the location in memory of the operands, or data, to be used in executing the instruction), operand fetch, execution (that is, performing the operation set forth in the operation code on the fetched operands), and storing of processed data, which steps are performed relatively independently by separate hardware in the processor. In a pipelined processor, the processor's instruction fetch hardware may be fetching one instruction while other hardware is decoding the operation code of another instruction, fetching the operands of still another instruction, executing yet another instruction, and storing the processed data of a fifth instruction. Since the five steps are performed sequentially, pipelining does not speed up processing of an individual instruction. However, since the processor begins processing of additional instructions before it has finished processing a current instruction, it can speed up processing of a series of instructions.

A pipelined processor is obviously much more complicated than a simple processor in a von Neumann system, as it requires not only the various circuits to perform each of the operations (in a simple von Neumann processor, many circuits could be used to perform several operations), but also control circuits to coordinate the activities of the various operational circuits. However, the speed-up of the system can be dramatic.

More recently, some processors have been provided with execution hardware which includes multiple functional units each being optimized to perform a certain type of mathematical operation. For example, some processors have separate functional units for performing integer arithmetic and floating point arithmetic, since they are processed very differently. Some processors have separate hardware functional units each of which performs one or only several types of mathematical operations, including addition, multiplication, and division operations, and other operations such as branch control and logical operations, all of which can be operating concurrently. This can be helpful in speeding up certain computations, most particularly those in which several functional units may be used concurrently for performing parts of a single computation.

In addition, some processors have been organized so as to process operands as "vectors," in which the same operation is applied to a series of sets of operands. The operands to be processed are rapidly sequenced through very fast processing circuits. Many type of problems lend themselves to vector processing, and the vector processors are effective in providing fast processing times, but the processing speed typically requires expensive circuitry.

In a von Neumann processor, including those which incorporate pipelining or multiple functional units (or both, since both may be incorporated into a single processor), a single instruction stream operates on a single data stream. That is, each instruction operates on data to enable one calculation at a time. Such processors have been termed "SISD," for single-instruction/single-data. If a program requires a segment of a program to be used to operate on a number of diverse elements of data to produce a number of calculations, the program causes the processor to loop through that segment for each calculation. In some cases, in which the program segment is short or there are only a few data elements, the time required to perform such a calculation may not be unduly long.

However, for many types of such programs, SISD processors would require a very long time to perform all of the calculations required. Accordingly, processors have been developed which incorporate a large number of processing elements all of which may operate concurrently on the same instruction stream, but with each processing element processing a separate data stream. These processors have been termed "SIMD" processors, for "single-instruction/multiple-data," or generally "SPMD" for "single-program/multiple-data.

SPMD processors are useful in a number of applications, such as image processing, signal processing, artificial intelligence, database operations, and computer simulation of a number of things, such as electronic circuits and fluid dynamics. In image processing, each processing element may be used to perform processing on a pixel ("picture element") of the image to enhance the overall image. In signal processing, the processors concurrently perform a number of the calculations required to perform such computations as the "Fast Fourier transform" of the data defining the signal. In artificial intelligence, the processors perform searches on extensive rule bases representing the stored knowledge of the particular application. Similarly, in database operations, the processors perform searches on the data in the database, and may also perform sorting and other operations. In computer simulation of, for example, electronic circuits, each processor may represent one part of the circuit, and the processor's iterative computations indicate the response of the part to signals from other parts of the circuit. Similarly, in simulating fluid dynamics, which can be useful in a number of applications such as weather predication and airplane design, each processor is associated with one point in space, and the calculations provide information about various factors such as fluid flow, temperature, pressure and so forth.

Typical SPMD systems, such as those described in the aforementioned Hillis, Douglas, et al., and Wells, et al., patent applications include a SPMD array, which includes the array of processing elements and a router network, a control processor and an input/output component. The input/output component, under control of the control processor, enables data to be transferred into the array for processing and receives processed data from the array for storage, display, and so forth. The control processor also controls the SIMD array, iteratively broadcasting instructions to the processing elements for execution in parallel. The router network enables the processing elements to communicate the results of a calculation to other processing elements for use in future calculations.

SUMMARY OF THE INVENTION

The invention provides a new and improved auxiliary processor for use in connection with a massively parallel computer system.

In brief summary, a massively-parallel computer includes a plurality of processing nodes and at least one control node interconnected by a network. The network faciliates the transfer of data among the processing nodes and of commands from the control node to the processing nodes. Each processing node includes an interface for transmitting data over, and receiving data and commands from, the network, at least one memory module for storing data, a node processor and an auxiliary processor. The node processor receives commands received by the interface and processes data in response thereto, in the process generating memory access requests for facilitating the retrieval of data from or storage of data in the memory module. The node processor further controls the transfer of data over the network by the interface. The auxiliary processor is connected to the memory module and the node processor. In response to memory access requests from the node processor, the auxiliary processor performs a memory access operation to store data received from the node processor in the memory module, or to retrieve data from the memory module for transfer to the node processor. In response to auxiliary processing instructions from the node processor, the auxiliary processor performs data processing operations in connection with data in the memory module.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2C depicts details of registers included in the auxiliary processor and the format of instructions executed thereby;

FIGS. 3A through 6 are detailed block diagrams of various circuits in the auxiliary processor; and FIGS. 7A through 10B are flow diagrams detailing operations performed by the auxiliary processor.

DETAILED DESCRIPTION OF AN ILLUSTRATIVE EMBODIMENT

I. General Description

A. General Description Of Computer System

Figure 1:
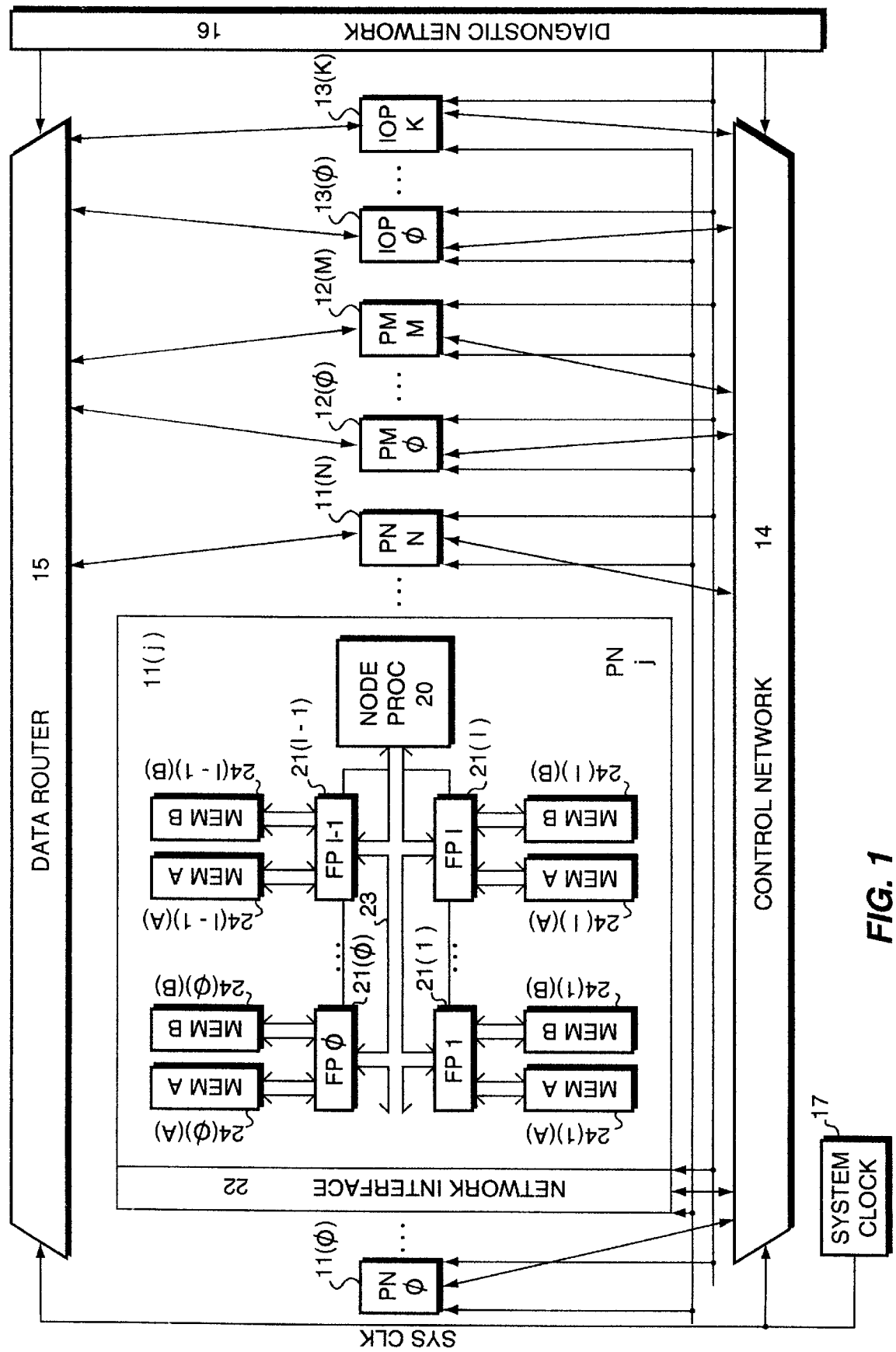
FIG. 1 is a general block diagram depicting a massively parallel computer incorporating an auxiliary processor constructed in accordance with the invention.

FIG. 1 depicts a general block diagram of a massively parallel digital computer system 10 in which an auxiliary processor according to the invention may be used. With reference to FIG. 1, the computer system 10 includes a plurality of processing nodes 11(0) through 11(N) (generally identified by reference numeral 11) which operate under control of one or more partition managers 12(0) through 12(M) (generally identified by reference numeral 12). Selected ones of the processing nodes 11(x) through 11(y) ("x" and "y" are integers) are assigned to a particular partition manager 12(z) ("z" is an integer), which transmits data processing commands to processing nodes 11(x) through 11(y) defining a particular partition assigned thereto. The processing nodes 11(x) through 11(y) process the data processing commands, generally in parallel, and in response generate status and synchronization information which they transmit among themselves and to the controlling partition manager 12(z). The partition manager 12(z) may use the status and synchronization information in determining the progress of the processing nodes 11(x) through 11(y) in processing the data processing commands, and in determining the timing of transmission of data processing commands to the processing nodes, as well as the selection of particular data processing commands to transmit. One embodiment of processing nodes 11 and partition managers 12 useful in one embodiment of system 10 is described in detail in the aforementioned Douglas, et al., patent applications.

The system further includes one or more input/output processors 13(i) through 13(k) (generally identified by reference numeral 13) which store data and programs which may be transmitted to the processing nodes 11 and partition managers 12 under control of input/output commands from the partition managers 12. In addition, the partition managers 12 may enable the processing nodes 11 in particular partitions assigned thereto to transmit processed data to the input/output processors 13 for storage therein. Input/output processors 13 useful in one embodiment of system 10 are described in detail in the aforementioned Wells, et al., patent application.

The system 10 further includes a plurality of communications networks, including a control network 14 and a data router 15 which permit the processing nodes 11, partition managers 12 and input/output processors 13 to communicate to transmit data, commands and status and synchronization information thereamong. The control network 14 defines the processing nodes 11 and partition managers 12 assigned to each partition. In addition, the control network 14 is used by the partition managers 12 to transmit processing and input/output commands to the processing nodes 11 of the partition and by the processing nodes 11 of each partition to transmit status and synchronization information among each other and to the partition manager 12. The control network 14 may also be used to facilitate the down-loading of program instructions by or under control of a partition manager 12(z) to the processing nodes 11(x) through 11(y) of its partition, which the processing nodes execute in the processing of the commands. A control network 14 useful in one embodiment of system 10 is described in detail in the aforementioned Douglas, et al., patent applications.

The data router 15 facilitates the transfer of data among the processing nodes 11, partition managers 12 and input/output processors 13. In one embodiment, described in the aforementioned Douglas, et al., patent applications, partitioning of the system is defined with respect to the control network 14, but the processing nodes 11, partition managers and input/output processors 13 can use the data router 15 to transmit data to others in any partition. In addition, in that embodiment the partition managers 12 use the data router 15 to transmit input/output commands to the input/output processors 13, and the input/output processors 13 use the data router 15 to carry input/output status information to the partition managers 12. A data router 15 useful in one embodiment of system 10 is described in detail in the aforementioned Douglas, et al., patent applications.

One embodiment of system 10 also includes a diagnostic network 16, which facilitates diagnosis of failures, establishes initial operating conditions within the system 10 and conditions the control network 14 to facilitate the establishment of partitions. The diagnostic network 16 operates under control of a diagnostic processor (not shown) which may comprise, for example, one of the partition managers 16. One embodiment of diagnostic network 16 useful in system 10 is also described in connection with the aforementioned Douglas, et al., patent applications.

The system 10 operates under control of a common system clock 17, which provides SYS CLK system clocking signals to the components of the system 10. The various components use the SYS CLK signal to synchronize their operations.

The processing nodes 11 are similar, and so only one processing node, in particular processing node 11(j) is shown in detail. As shown in FIG. 1, the processing node 11(j) includes a node processor 20, one or more auxiliary processors 21(0) through 21(I) [generally identified by reference numeral 21(i)], and a network interface 22, all of which are interconnected by a processor bus 23. The node processor 20 may comprise a conventional microprocessor, and one embodiment of network interface 22 is described in detail in the aforementioned Douglas, et al., patent applications.

Also connected to each auxiliary processor 21(i) are two memory banks 24(0)(A) through 24(I)(B) [generally identified by reference numeral 24(i)(j), where "i" corresponds to the index "i" of the auxiliary processor reference numeral 21(i) and index "j" corresponds to bank identifier "A" or "B"]. The memory banks 24(i)(j) contain data and instructions for use by the node processor 20 in a plurality of addressable storage locations (not shown). The addressable storage locations of the collection of memory banks 24(i)(j) of a processing node 11(j) form an address space defined by a plurality of address bits, the bits having a location identifier portion that is headed by an auxiliary processor identifier portion and memory bank identifier. The node processor 20 may initiate the retrieval of the contents of a particular storage location in a memory bank 24(i)(j) by transmitting an address over the bus 23 whose auxiliary processor identifier identifies the particular auxiliary processor 21(i) connected to the memory bank 24(i)(j) containing the location whose contents are to be retrieved, and location identifier identifies the particular memory bank 24(i)(j) and storage location whose contents are to be retrieved. In response, the auxiliary processor 21(i) connected to the memory bank 24(i)(j) which contains the storage location identified by the address signals retrieves the contents of the storage location and transmits them to the node processor 20 over the bus 23. Similarly, the node processor 20 may enable data or instructions (both generally referred to as "data") to be loaded into a particular storage location by transmitting an address and the data over the bus 23, and the auxiliary processor 21(i) that is connected to the memory bank 24(i)(j) containing the storage location identified by the address signals enables the memory bank 24(i)(j) that is identified by the address signals to store the data in the storage location identified by the address signals.

In addition, the auxiliary processors 21(i) can process operands, comprising either data provided by the node processor 20 or the contents of storage locations it retrieves from the memory banks 24(i)(j) connected thereto, in response to auxiliary processing instructions transmitted thereto by the node processor 20. To enable processing by an auxiliary processor 21(i), the node processor 20 can transmit an auxiliary processing instruction over processor bus 23, which includes the identification of one or more auxiliary processors 21(i) to execute the instruction, as well as the identification of operands to be processed in response to the auxiliary processing instruction. In response to the auxiliary processing instructions, the identified auxiliary processors 21(i) retrieve operands from the identified locations, perform processing operation(s) and store the resulting operand(s), representing the result of the processing operation(s), in one or more storage location(s) in memory banks 24(i)(j).

In one particular embodiment, the auxiliary processors 21(i) are in the form of a "RISC," or "reduced instruction set computer," in which retrievals of operands to be processed thereby from, or storage of operands processed thereby in, a memory bank 24(i)(j), are controlled only by explicit instructions, which are termed "load/store" instructions. Load/store instructions enable operands to be transferred between particular storage locations and registers (described below in connection with FIGS. 2A and 2B) in the auxiliary processor 21(i). A "load" instruction enables operands to be transferred from one or more storage locations to the registers, and a "store" instruction enables operands to be transferred from the registers to one or more storage locations. It should be noted that the load/store instructions processed by the auxiliary processors 21(*i*) control transfer of operands to be processed by the auxiliary processor 21(*i*) as well as operands representing the results of processing by the auxiliary processor 21(*i*). The node processor 20 and auxiliary processors 21(*i*) do not use the load/store instructions to control transfers directly between memory banks 24(*i*)(*j*) and the node processor 20. Other instructions, termed here "auxiliary data processing instructions," control processing in connection with the contents of registers and storage of the results of the processing in such registers. As will be described below in connection with FIG. 2C, each auxiliary processing instruction may include both a load/store instruction and an auxiliary data processing instruction.

The node processor 20 transmits individual auxiliary processing instructions for processing by individual auxiliary processors 21(*i*), or by selected groups of auxiliary processors 21(*i*), or by all auxiliary processors 21(*i*) on the processing node, generally in parallel. As will be described below in connection with FIG. 2C in greater detail, each load/store auxiliary processing instruction is further accompanied by a value which represents an offset, from the base of the particular memory bank 24(*i*)(*j*), of a storage location in memory which is to be used in connection with the load/store operation. As noted above, each auxiliary data processing instruction identifies one or more registers in the auxiliary processor 21(*i*) whose operands are to be used in execution of the auxiliary data processing instruction. Accordingly, if, for example, operands represent matrix elements which are distributed among the auxiliary processors, the node processor 20 can, with a single auxiliary data processing instruction transmitted for execution by multiple auxiliary processors 21(*i*), enable the auxiliary processors 21(*i*) to process the matrix elements generally in parallel, which may serve to speed up matrix processing. In addition, since such processing may be performed on all processing nodes 11 of a partition generally concurrently and in parallel, the auxiliary processors 21(*i*) enable operands comprising large matrices to be processed very rapidly.

As will be further described below in more detail, each auxiliary processing instruction can enable an auxiliary processor 21(*i*) to process a series of operands as a vector, performing the same operation in connection with each operand, or element, of the vector. If a operation initiated by a particular auxiliary processing instruction requires one ("monadic") operand, only one vector is required. However, if an operation requires two ("dyadic") or three ("triadic") operands, the auxiliary processor 21(*i*) processes corresponding elements from the required number of such vectors, performing the same operation in connection with each set of operands. If an auxiliary processing instruction enables an auxiliary processor 21(*i*) to so process operands as vectors, the processing of particular sets of operands may be conditioned on the settings of particular flags of a vector mask. An auxiliary processing instruction which does not enable processing of series of operands as a vector is said to initiate a "scalar" operation, and the operands therefor are in the form of "scalar" operands.

As will also be further described in more detail below, each auxiliary processor 21(*i*) may process data retrievals and stores for the node processor 20, as well as auxiliary processing instructions, in an overlapped manner. That is, node processor 20 may, for example, initiate a storage or retrieval operation with an auxiliary processor 21(*i*) and transmit an auxiliary processing instruction to the auxiliary processor 21(*i*) before it has finished the storage or retrieval operation. In, that example, the auxiliary processor 21(*i*) may also begin processing the auxiliary processing instruction before it has finished the retrieval or storage operation. Similarly, the node processor 20 may transmit an auxiliary processing instruction to the auxiliary processor 21(*i*), and thereafter initiate one or more storage or retrieval operations. The auxiliary processor 21(*i*) may, while executing the auxiliary processing instruction, also perform the storage or retrieval operations.

B. General Description Of Auxiliary Processor

Figures 1, 2A:
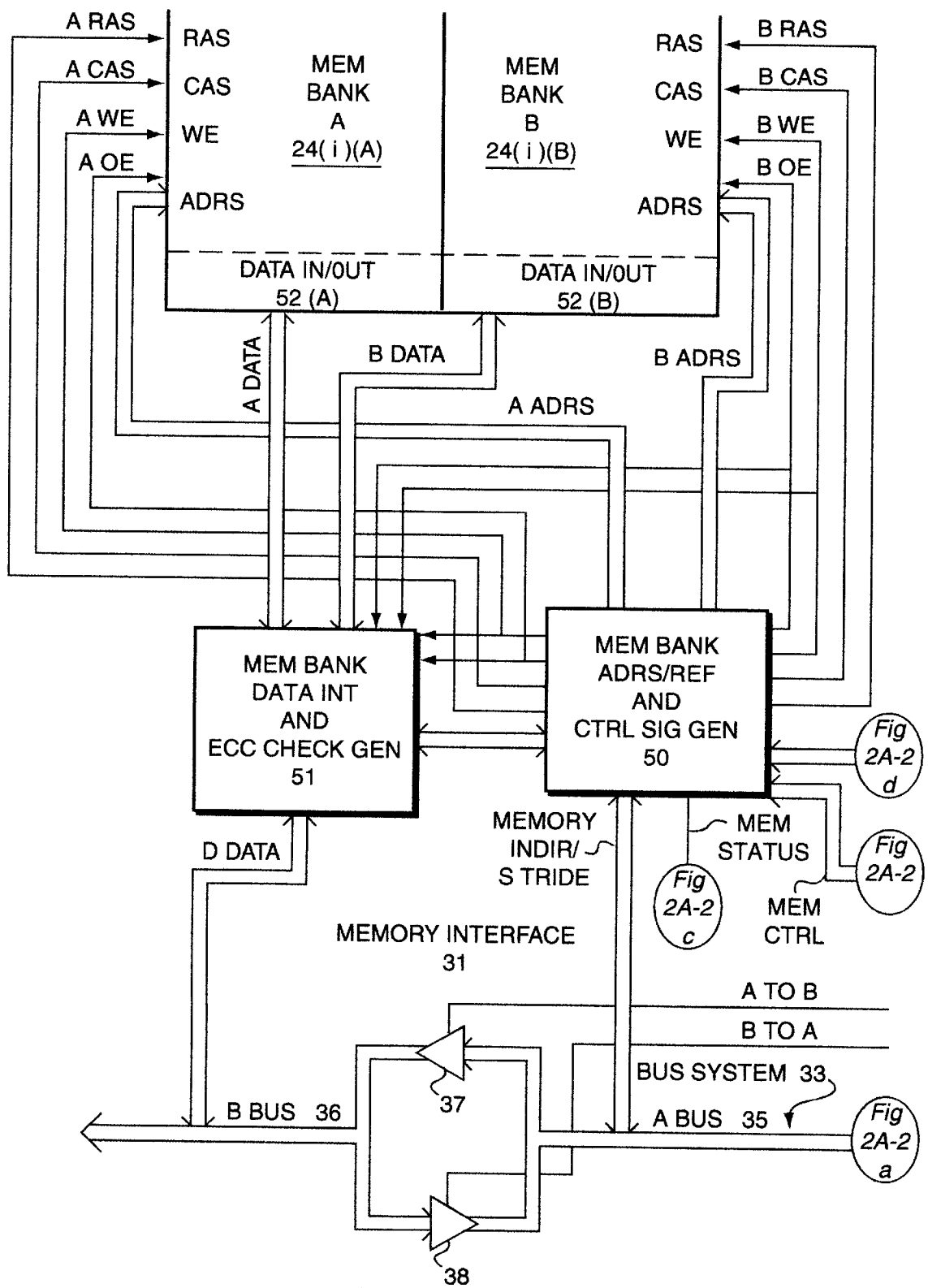
FIGS. 2A and 2B together comprise a general block diagram of the auxiliary processor depicted in FIG. 1.
Figures 2, 2A:
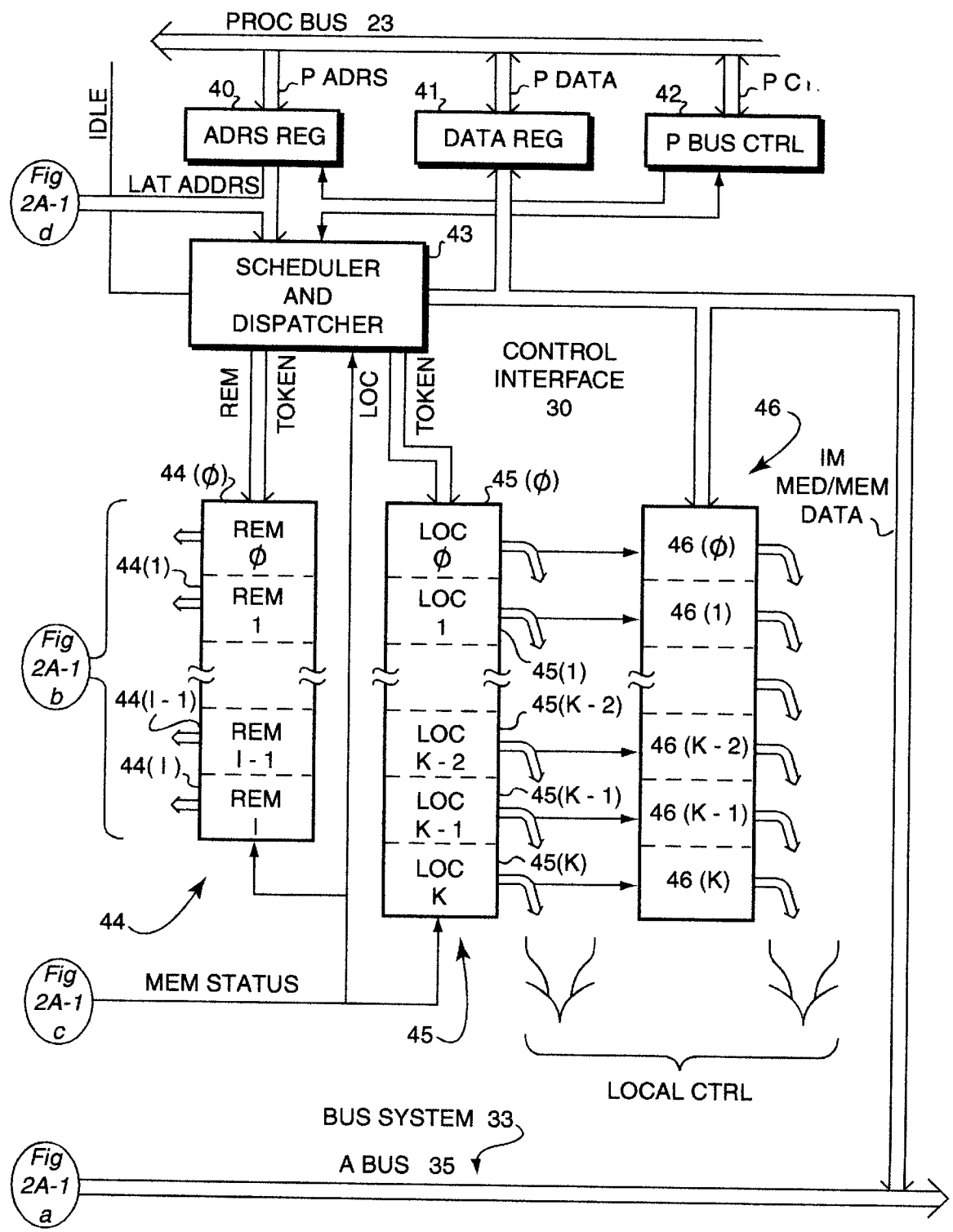
Figure 2B:
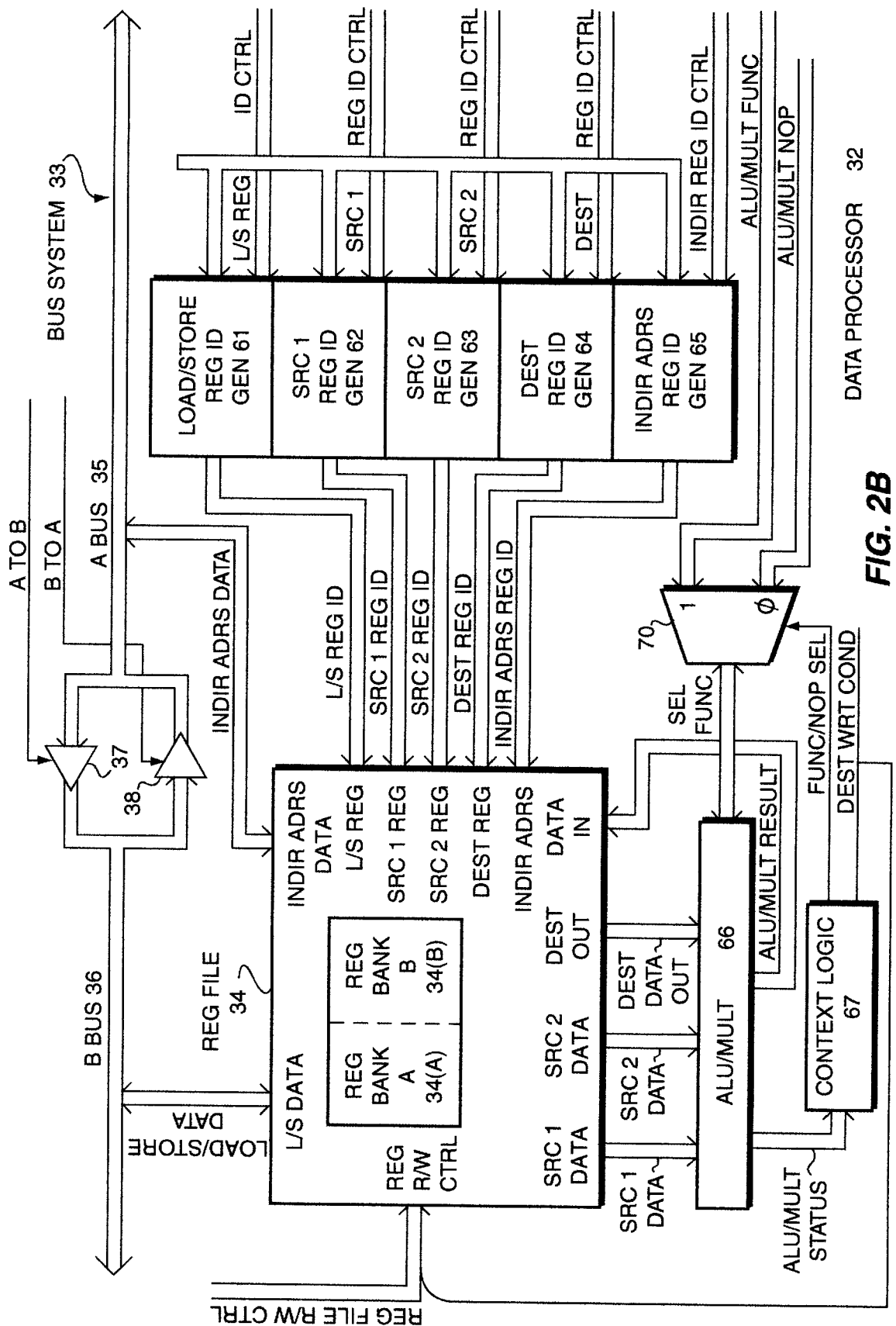

With this background, the structure and operation of an auxiliary processor 21(*i*) will be described in connection with FIGS. 2A through 6. In one particular embodiment, the structure and operation of the auxiliary processors 21 are all similar. FIGS. 2A and 2B depict a general block diagram of one embodiment of auxiliary processor 21(*i*). With reference to FIGS. 2A and 2B, auxiliary processor 21(*i*) includes a control interface 30 (FIG. 2A), a memory interface 31 (FIG. 2A), and a data processor 32 (FIG. 2B), all interconnected by a bus system 33 (the bus system 33 is depicted on both FIGS. 2A and 2B). The control interface 30 receives storage and retrieval requests (which will generally be termed "remote operations") over processor bus 23. For a retrieval operation, the control interface 30 enables the memory interface 31 to retrieve the contents of the storage location identified by an accompanying address for transfer to the processor 20. For a storage operation, the control interface 30 enables the memory interface 31 to store data accompanying the request in a storage location identified by an accompanying address.

In addition, the control interface 30 receives auxiliary processing instructions (which will be generally termed "local operations"). If a auxiliary processing instruction received by the auxiliary processor 21(*i*) contains a load/store instruction, the control interface 30 enables the memory interface 31 and data processor 32 to cooperate to transfer data between one or more storage locations and registers in a register file 34 in the data processor 32. If the auxiliary processing instruction contains an auxiliary data processing instruction, the control interface 30 enables the data processor 32 to perform the data processing operations as required by the instruction in connection with operands in registers in the register file 34. If an auxiliary processing instruction includes both a load/store instruction and an auxiliary data processing instruction, it will enable both a load/stroe and a data processing operation to occur.

As noted above, the memory interface 31 controls storage in and retrieval from the memory banks 24(*i*)(*j*) connected thereto during either a remote or local operation. In that function, the memory interface 31 receives from the control interface 30 address information, in particular a base address which identifies a storage location at which the storage or retrieval is to begin. In addition, the memory interface 31 receives from the control interface 30 other control information. For example, if the storage or retrieval operation is to be in connection with multiple storage locations, the control interface 30 controls the general timing of each successive storage or retrieval operation, in response to which the memory interface 31 generates control signals for enabling a memory bank 24(*i*)(*j*) to actually perform the storage or retrieval operation. In addition, if the storage or retrieval operation is to be in connection with a series of storage locations whose addresses are separated by a fixed "stride" value, the control interface 30 provides a stride value, which the memory interface 31 uses in connection with the base address to generate the series of addresses for transmission to a memory banks 24(*i*)(*j*). On the other hand, if the storage or retrieval operation is to be in connection with "indirect" addresses, in which the storage locations are at addresses which are diverse offsets from the base address, the memory interface 31 receives offset values, which are transmitted from registers in the register file 34 of the data processor 32 under control of the control interface 30, which it uses in connection with the base address to generate addresses for transmission to the memory banks 24(*i*)(*j*).

As further noted above, the data processor 32 operates in connection with local operations, also under control of the control interface 30, to perform data processing operations in connection with operands stored in its register file 34. In that connection the control interface 30 provides register identification information identifying registers containing operands to be processed, as well as control information identifying the particular operation to be performed and the register into which the result is to be loaded. If the local operation is to be in connection with vectors, the control interface 30 also provides information from which the data processor 32 can identify the registers containing operands comprising the vectors, as well as the register in which each result operand is to be loaded. As in memory operations, operands comprising successive vector elements may be provided by registers having fixed strides from particular base registers and the control interface will provide the base identifications and stride values. In addition, at least some operands may come from registers selected using "indirect" register addressing, as described above in connection with the memory interface 31, and the control interface 30 identifies a base register and a register in the register file 34 which is the base of a table containing register offset values. From the base register identification and the register offset values in the table, data processor identifies the registers whose values are to be used as the successive operands.

With reference to FIGS. 2A and 2B, the bus system 33 provides data paths among the control interface 30, memory controller 31 and data processor 32. The bus system 33 includes two buses, identified as an A bus 35 and a B bus 36, as well as two gated drivers 37 and 38 which are controlled by A TO B and B TO A signals from the control interface 30. If both gated drivers 37 and 38 are disabled, which occurs if both A TO B and B TO A signals are negated, the A bus 35 and B bus 36 are isolated from each other. If, however, the control interface 30 asserts the A TO B signal, the gated driver 37 couples signals on the A bus 35 onto the B bus 36. Similarly, if the control interface asserts the B TO A signal, the gated driver 38 couples signals on the B bus 36 onto the A bus 35.

With reference to FIG. 2A, the control interface 30 includes an address register 40, a data register 41 and a processor bus control circuit 42, all of which are connected to the processor bus 23. The processor bus control circuit 42 receives P CTRL processor bus control signals from the processor bus 23 controlling transfers over the processor bus 23 and when they indicate that an address is on the processor bus, initiating a transfer over the processor bus, enables the address register 40 to latch P ADRS processor address signals from the bus. The data register 41 is connected to receive P DATA processor data signals. If the control signals received by the processor bus control circuit 42 indicate that the processor bus transfer is accompanied by data, it enables the data register 41 to latch the P DATA signals, which comprise the data for the transfer.

The processor bus control circuit 42 further notifies a scheduler and dispatcher circuit 43 that an address and data have been received and latched in the address and data registers 40 and 41, respectively. In response, the scheduler and dispatcher 43 examines the LAT ADRS latched address signals coupled by the address register 40 to determine whether the transfer is for the particular auxiliary processor 21(*i*), and if so, enables the processor bus control circuit 42 to transmit P CTRL processor bus control signals to acknowledge the bus transaction.

If the scheduler and dispatcher circuit 43 determines that the LAT ADRS address signals indicate that the transfer is for this auxiliary processor 21(*i*), it further examines them to determine the nature of the transfer. In particular, the address signals may indicate a storage location in a memory bank 24(*i*)(*j*), and if so the bus transfer serves to indicate the initiation of a remote operation. Similarly, the address signals may indicate one of a plurality of registers, which will be described below in connection with FIG. 2C, which are located on the auxiliary processor 21(*i*) itself, and if so the address signals also serve to indicate the initiation of a remote operation. In addition, the P ADRS signals may indicate that the accompanying P DATA signals comprise an auxiliary processing instruction to be processed by the auxiliary processor 21(*i*). If the LAT ADRS latched address signals indicate a remote operation in connection with a storage location in a memory bank 24(*i*)(*j*), it also identifies a transaction length, that is, a number of storage locations to be involved in the operation.

When the LAT ADRS latched address signals identify a register, the scheduler and dispatcher circuit 43 enables the contents of the data register 41 to be loaded into the indicated register during a write operation, or the contents of the indicated register to be transferred to the data register 41 for transmission over the processor bus 23 during a read operation. However, if the LAT ADRS latched address signals indicate that the accompanying P DATA processor data signals define an auxiliary processing instruction, the data in the data register 41 is an auxiliary processing instruction initiating a local operation. In response, the scheduler and dispatcher circuit 43 uses the contents of the data register 41 to initiate an operation for the data processor 32. In addition, if the local operation includes a load/store operation, the scheduler and dispatcher circuit 43 uses the low-order portion of the address defined by the LAT ADRS latched address signals to identify a storage location in a memory banks 24(*i*)(*j*) to be used in connection with the load/store operation.

The control interface 30 further includes two token shift registers, identified as a remote strand 44 and a local strand 45, and a local strand control register set 46. The remote strand 44 comprises a shift register including a series of stages, identified by reference numeral 44(*i*), where "i" is an index from "0" to "I." The successive stages 44(*i*) of the remote strand 44 control successive ones of a series of specific operations performed by the auxiliary processor 21(*i*) in performing a remote operation. Similarly, the local strand 45 comprises a shift register including a series of stages, identified by reference numeral 45(k), where "k" is an index from "0" to "K." The successive stages 45(k) of the local strand 45 control successive ones of a series of operations performed by the auxiliary processor 21(*i*) during a local operation. The local strand control register set 46 includes a plurality of registers 46(0) through 46(K), each associated with a stage 45(k) of the local strand 45, and each storing operational information used in controlling a particular operation initiated in connection with the associated stage 45(k) of the local strand 45.

To initiate a remote operation involving a storage location in a memory bank 24(*i*)j), the scheduler and dispatcher circuit 43 transmits REM TOKEN signals comprising a remote token to the remote strand 44, generally to the first stage 44(0). If the LAT ADRS latched address signals identify a transaction length greater than one word, referencing a transfer with a like number of storage locations, the scheduler and dispatcher circuit 43 will provide successive REM TOKEN remote token signals defining a series of remote tokens. As the remote strand 44 shifts each remote token through the successive stages 44(i), it generates MEM CTRL memory control signals that are transmitted to the memory interface 31, in particular, to an address/refresh and control signal generator circuit 50, which receives the low-order portion of the LAT ADRS latched address signals and the MEM CTRL memory control signals from the successive stages 44(i) of the remote strand 44 and in response generates address and control signals in an appropriate sequence for transmission to the memory banks 24(i)(j) to enable them to use the address signals and to control storage if the remote operation is a storage operation. In particular, the address/refresh and control signal generator circuit 50 generates "j" ADRS address signals ("j" being an index referencing "A" or "B"), which identify a storage location in the corresponding memory bank 24(i)(j), along with "j" RAS row address strobe, "j" CAS column address strobe and "j" WE write enable signals. Each memory bank 24(i)(j) also is connected to receive from a data interface circuit 51, and transmit to the data interface circuit, "i" DATA data signals representing, during the data to be stored in the respective memory bank 24(i)(j) during a write or store operation or the data to be retrieved during a read or load operation.

As is conventional, the storage locations in each memory bank are organized as a logical array comprising a plurality of rows and columns, with each row and column being identified by a row identifier and a column identifier, respectively. Accordingly, each storage location will be uniquely identified by its row and column identifiers. In accessing a storage location in a memory bank 24(i)(j), the address/refresh and control signal generator 50 can transmit successive "j" ADRS address signals representing, successively, the row identifier and the column identifier for the storage location, along with successive assertions of the "j" RAS and "j" CAS signals. Each memory bank 24(i)(j) includes, in addition to the storage locations, a data in/out interface register 52(j), which receives and transmits the "j" DATA signals. During a retrieval from a memory bank 24(i)(j), in response to the "j" ADRS signals and the assertion of the "j" RAS signal, the memory bank 24(i)(j) loads the contents of the storage locations in the row identified by the "j" ADRS signals, into the data in/out interface register 52(j) and thereafter uses the "j" ADRS signals present when the "j" CAS signal is asserted to select data from the data in/out interfaceregister 52(j) to transmit as the "j" DATA signals. If subsequent retrievals from the memory bank 24(i)(j) are from storage locations in the same row, which is termed a "page," the address/reference and control signal generator 50 may operate in "fast page mode," enabling a retrieval directly from the data in/out interface register 52(j) by transmitting the column identifier as the "j" DATA signals and asserting the "j" CAS signal, enabling the memory bank 24(i)(j) to transmit the data from that column as the "j" DATA signals. Since the memory bank 24(i)(j) does not have to re-load the data into the data in/out interface register 52(i) while in the fast page mode, the amount of time required by the memory bank 24(i)(j) to provide the data from the requested storage location can be reduced. Otherwise stated, if, to respond to a retrieval, a memory bank 24(i)j) has to load a row, or "page," into its data in/out interface register 52(j) because the row identifier of the retrieval differs from that of the previous retrieval (which is termed here a "miss page" condition), the retrieval will likely take longer than if the retrieval operation did not result in a miss page condition, because of the extra time required to load the data in/out interface register 52(i).

The address/refresh and control signal generator circuit 50 also controls refreshing of the memory banks 24(i)(j). In one embodiment, the memory banks 24(i)(j) will initiate a refresh operation if they receive an asserted "j" CAS signal a selected time period before they receive an asserted "j" RAS signal, in so-called "CAS-before-RAS" refreshing. In that embodiment, the address/refresh and control signal generator 50 controls the "j" RAS and "j" CAS signals as necessary to enable the memory banks 24(i)(j) to perform refreshing.

The address/refresh and control signal generator 50 further generates MEM STATUS memory status signals which indicate selected status information in connection with a memory operation. In connection with certain occurrences, such as a miss page condition as described above and others as will be described below, the timings of an operation enabled by a remote token at a particular stage 44(s) ("s" is an integer) of the remote strand 44 will be delayed, which will be indicated by the condition of the MEM STATUS signals. When that occurs, the remote token at that particular stage 44(s) and the upstream stages 44(0) through 44(s-1) are stalled in their respective stages, and will not be advanced until the stall condition is removed. The scheduler and dispatcher circuit 43 also receives the MEM STATUS memory status signals and will also be stalled in issuing additional remote tokens to the remote strand 44.

To initiate a local operation, including a load/store operation, the scheduler and dispatcher circuit 43 transmits LOC TOKEN signals comprising a local token to the first stage 45(0) of the local strand 45. If the local operation is for a vector of operands, the scheduler and dispatcher circuit 43 will provide LOC TOKEN local token signals defining a series of local tokens. As the local strand 45 shifts the first local token through the successive stages 45(k), the operational information, which is provided by the auxiliary processing instruction latched in the data register 41, is latched in the corresponding ones of the registers 46(k) of the local strand control register set 46. The local token in each stage 45(0) of the local strand 45, along with operational information stored in each associated register 46(k), provide LOC CTRL local control signals. Some of the LOC CTRL signals are coupled to the address/refresh and control signal generator 50 and if the local operation includes a load/store operation they control the memory interface 31 in a manner similar to that as described above in connection with remote operation to effect a memory access for a load/store operation. In addition, the LOC CTRL signals will enable the data processor 32 to select a register in the register file 34 and enable it to participate in the load/store operation. If, on the other hand, the local operation includes an auxiliary data processing operation, the LOC CTRL local control signals will enable the data processor 32 to select registers in the register file 34 to provide the operands, to perform the operation, and to store the results in a selected register.

The MEM STATUS memory status signals from the address/refresh and control signal generator 50 also may stall selected stages 45(j) of the local strand 45, in particular at least those stages which enable load/store operations and any stages upstream thereof, under the same conditions and for the same purposes as the remote strand 44. If the MEM STATUS signals enable such a stall, they also stall the scheduler and dispatcher circuit 43 from issuing additional local tokens.

The memory interface 31, in addition to the address/ refresh and control signal generator 51, includes a data interface circuit 51, which includes an error correction code check and generator circuit (not shown). During a store operation of a remote operation or during a load/store operation in which the data to be stored is for an entire storage location in a memory bank 24(i)(j), the data interface 51, under control of the address/refresh and control signal generator 50, receives DATA signals representing the data to be stored from the B bus 36, generates an error correction code in connection therewith, and couples both the data and error correction code as A DATA or B DATA signals, depending on the particular memory bank 24(i)(j) in which the data is to be stored. If the data to be stored is less than an entire storage location in a memory bank 24(i)(j), the data interface 51, under control of the address/refresh and control signal generator 50, receives the A DATA or B DATA signals from the particular storage location in the memory bank 24(i)(j) in which the data is to be stored, and uses the error correction code to check and, if necessary, correct the data. In addition, the data interface receives the DATA signals representing the data to be stored from the B bus 36, merges it into the retrieved data, thereafter generates an error correction code in connection therewith, and couples both the data and error correction code as A DATA or B DATA signals, depending on the particular memory bank 24(i)(j) in which the data is to be stored. In either case, if the store operation is a remote operation, the data is provided by the data register 41. In particular, the data register 41 couples the data onto A bus 35, and the control interface 30 asserted the A TO B signal enabling driver 37 to couple the data signals on A bus 35 onto B bus 36, from which the data interface 51 received them. On the other hand, if the store operation is a local operation, the data is provided by the data processor 32, in particular the register file 34, which couples the data directly onto the B bus 36.

During a retrieval operation of a remote operation or during a load operation of a local operation, the data interface receives the A DATA or B DATA signals, defining the retrieved data and error correction code, from the appropriate memory bank 24(i)(j) and uses the error correction code to verify the correctness of the data. If the data interface 51 determines that the data is correct, it transmits it onto B bus 36. If the operation is a remote operation, the control interface asserts the B TO A signal to enable the gated driver 38 to couple the data on B bus 36 onto A bus 35. The data on A bus 35 is then coupled to the data register 41, which latches it for transmission onto the processor bus 23 as P DATA processor data signals. On the other hand, if the operation is a local operation, the data is transferred from B bus 36 to the register file 34 for storage in an appropriate register.

If the data interface 51 determines, during either a retrieval operation of a remote operation or a load operation of a local operation, that the data is incorrect, it uses the error correction code to correct the data before transmitting it onto B bus 36. In addition, if the data interface determines that the data is incorrect, it will also notify the address/refresh and control signal generator 50, which generates MEM STATUS memory status signals enabling a stall of the local and remote strands 45 and 44 and the scheduler and dispatcher circuit 43 while the data interface 51 is performing the error correction operation.

With reference to FIG. 2B, the data processor 32 includes the aforementioned register file 34, and further includes a set of register identifier generator circuits 61 through 65, an arithmetic and logic unit ("ALU") and multiplier circuit 66, a context logic circuit 67 and a multiplexer 70. The register file 34 includes a plurality of registers for storing data which may be used as operands for auxiliary processing instructions. Each register is identified by a register identifier comprising a plurality of bits encoded to define a register identifier space. The registers in register file 34 are divided into two register banks 34(A) and 34(B) [generally identified by reference numeral 34(j)], with the high-order bit of the register identifier comprising a register bank identifier that divides the registers into the two register banks. Each register bank 34(j) is associated with one memory bank 24(i)(j). The association between a memory bank 24(i)(j) and a register bank is such that the value of the memory bank identifier which identifies a memory bank 24(i)(j) in the address transmitted over the processor bus 23 corresponds to the value of the register bank identifier. In one embodiment, the auxiliary processor 21(i) effectively emulates two auxiliary processors separately processing operands stored in each memory bank 24(i)(j), separately in each register bank 34(j). If an auxiliary processing instruction enables a load/ store operation with respect to both register banks, and processing of operands from the two register banks 34(j), the scheduler and dispatcher circuit 43 issues tokens to local strand 45 for alternating register banks 34(j) and the load/ store operation and processing proceeds an interleaved fashion with respect to the alternating register banks 34(j).

The register file 34 has six ports through which data is transferred to or from a register in response to REG FILE RIW CTRL register file read/write control signals from the control interface 30 and the context logic 67. The ports are identified respectively as an L/S DATA load/store data port, an INDIR ADRS DATA indirect address data port, an SRC 1 DATA source (1) data port, a SRC 2 DATA source (2) data port, a SRC 3 DATA source (3) data port and a DEST DATA IN destination data input port. The register identifier circuits 61 through 65 generate register identifier signals for identifying registers whose contents are to be transferred through the respective ports for use as operands, in which processed data is to be stored, or which are to be used in connection with load/store operations or indirect addressing. In addition, the register identifier circuits 61 through 65 identify registers into which immediate operands, that is, operand values supplied in an auxiliary processing instruction, are to be loaded, and registers in register file 34 to be accessed during a remote operation.

In particular, a load/store register identification generator circuit 61 generates L/S REG ID load/store register identification signals, which are used to identify registers in the register file 34 into which data received from the B bus 36 through the LUS DATA port is to be loaded during a load operation, or from which data is to be obtained for transfer to the B bus 36 through the L/S DATA port during a store operation.

Several register identifier circuits 62 through 64 provide register identifications for use in connection with processing of operands. A source 1 register identifier generator circuit 62, a source 2 register identifier generator circuit 63, and a destination register identification generator circuit 64 generate, respectively, SRC 1 REG ID and SRC 2 REG ID source 1 and 2 register identification signals and DEST REG ID destination register identification signals. These signals are used to identify registers from which operands are transmitted, respectively, as SRC 1 DATA source 1 data signals through the SRC 1 DATA port, SRC 2 DATA source 2 data signals through the SRC 2 DATA port, and SRC 3 DATA source 3 data signals through the SRC 3 DATA port, all to the ALU and multiplier circuit 66. The ALU and multiplier circuit 66 generates result data in the form of ALU/MULT RESULT result signals, which are directed through the destination data input port DEST DATA IN. The destination data is stored in a destination register, which is identified by the DEST REG ID destination register identification signals from destination register identification generator circuit 64.

During a load operation, if the load/store register identification generator circuit 61 identifies the same register in register file 34 as one of the source register identifier generator circuits 62 through 64, the register file 34, in addition to loading the data in the register identified by the load/store register identification generator circuit 61, will at the same time supply the data as SCR (*i*) DATA signals through the particular SRC (*i*) DATA port whose register identifier generator circuit 62, 63 or 64 identifies the register.

Finally, an indirect address register identifier generator circuit 65 provides a register identification for use in identifying registers in register file 34 into which data from A bus 35 is to be loaded or from which data is to be coupled onto A bus 34. The data may be used in connection with indirect addressing for the memory banks 24(*i*)(*j*) as described above. In addition, the data may comprise immediate operands to be loaded into a register in register file 34 from an auxiliary processing instruction, or data to be loaded into the register or read from the register during a remote operation. In indirect addressing, the circuit 65 provides register identifications for a series of registers in the register file 34, with the series of registers containing the diverse offset values for the series of locations in a memory bank 24(*i*)(*j*). The indirect address register identifier generator circuit generates INDIR ADRS REG ID indirect address register identification signals which are coupled through the INDIR ADRS DATA indirect address data port.

Each register identifier generator circuit 61 through 65 generates the respective register identification signals using register identification values which they receive from the A bus 35, and operates in response to respective XXX REG ID register identification signals ("xxx" refers to the particular register identification generator circuit). The XXX REG ID signals may enable the respective circuit 61 through 65 to iteratively generate one or a series of register identifications, depending on the particular operation to be performed.

The ALU and multiplier circuit 66 receives the SRC 1 DATA source 1 data signals, the SRC 2 DATA source 2 data signals, and SRC 3 DATA source 3 data signals and performs an operation in connection therewith as determined by SEL FUNC selected function signals from the multiplexer 70. The multiplexer 70, in turn, selectively couples one of the ALU/MULT FUNC function signals, forming part of the LOC CTRL local control signals from the control interface 30, or ALU/MULT NOP no-operation signals as the SEL FUNC selected function signals. If the multiplexer 70 couples the ALU/MULT FUNC signals to the ALU and multiplier circuit 66, the circuit 66 performs an operation in connection with the received signals and generates resulting ALU/MULT RESULT signals, which are coupled to the destination data port on the register file, for storage in the register identified by the DEST REG ID destination register identification signals. In addition, the ALU and multiplier circuit 66 generates ALU/MULT STATUS signals which indicate selected status conditions, such as whether the operation resulted in an under- or overflow, a zero result, or a carry. The ALU/MULT STATUS signals are coupled to the context logic 67. On the other hand, if the multiplexer 70 couples ALU/MULT NOP no-operation signals to the ALU and multiplier circuit 66, it performs no operation and generates no ALU/MULT RESULT or ALU/MULT STATUS signals.

The multiplexer 70 is controlled by the context logic 67. As noted above, and as will be described further below in connection with FIG. 6, when the auxiliary processor 21(*i*) is processing operands as elements of vectors, it may be desirable to selectively disable both load/store and data processing operations with respect to selected vector elements. The context logic 67 determines the elements for which the operations are to be disabled, and controls a FUNC/NOP SEL function/no operation select signal in response. The context logic 65 further controls a DEST WRT COND destination write condition signal, which aids in controlling storage of ALU/MULT RESULT signals in the destination register, and, when it determines that operations for an element are to be disabled, it disables storage for that particular result.

Before proceeding to a detailed description of the control interface 30, memory interface 31 and data processor 32, it would be helpful to first identify and describe various control and status registers 100 in the auxiliary processor 21(*i*), as well as to describe the formats of several forms of the auxiliary processing instructions which may be executed by one embodiment of auxiliary processor 21(*i*), all of which are shown on FIG. 2C. With reference to FIG. 2C, control and status registers 100 include a vector length register 101 which, in an auxiliary processing instruction enables the auxiliary processor 21(*i*) to operate on one or more series of operands, with each series defining a vector, identifies the number of operands, or elements, in the vector. If an auxiliary processing instruction defines a dyadic or triadic operation, requiring operands organized as elements of multiple vectors, each vector has the same number of elements.

Two registers are used to identify stride values. A memory stride register 102, located in the address/refresh and control signal generator circuit 50 (FIG. 2A) provides a value indicating the amount by which the address of the storage location in memory bank 24(*i*)(*j*) is to be incremented for each subsequent memory access in a series of memory accesses, either during a remote operation or a local (load/store) operation. Similarly, source (1) stride register 103, which is located in the source 1 register identification generator circuit 62 (FIG. 2B), provides a value indicating the amount by which the register identification provided by the SRC 1 REG ID source (1) register identification signal is to be incremented for each subsequent access.

Several registers, located in the context logic 67, are used to control vector masking as described generally above, including a vector mask register 104, a vector mask mode register 105, a vector mask buffer 106 and a vector mask direction register 107. Vector mask register 104 contains a series of bits, each of which controls conditioning for corresponding vector elements when an auxiliary processing instruction enables the auxiliary processor 21(*i*) to process series of operands as vector elements. During execution of an auxiliary data processing instruction, as the ALU and multiplier circuit 66 generates status information for each successive vector element, the context logic 67 uses the status information to control the condition of the corresponding bit of a new vector mask for storage in vector mask register 104. The resulting vector mask may be used in connection with a subsequent auxiliary processing instruction.

The vector mask mode register 105 includes two mode flags, namely, an ALU MODE flag 105(A) and an L/S MODE flag 105(B). The ALU MODE flag 105(A) controls the usage of the vector mask in register 104 in connection with the auxiliary data processing instruction portion of an auxiliary processing instruction. When the ALU MODE flag 105(A) is set, the auxiliary processor 21(i) uses the vector mask in register 104 to condition latching of the ALU/MULT RESULT signals in the destination register for the corresponding vector element, and in addition to condition latching of the status information generated in connection therewith in the corresponding bit position of the vector mask. If the ALU MODE flag is clear, the ALU/MULT RESULT signals and status information will be latched regardless of the whether the individual bits of the vector mask are set or clear.

The L/S MODE flag 105(B) controls the use of the vector mask in connection with load/store operations. If the L/S MODE flag 105(B) is set, bits of the vector mask will control the load or store of particular vector elements. During both a load operation and a store operation, if a bit of the vector mask is clear, such that the data will not be written into the register file 34 (during a load) or the memory bank 24(i)(j) (during a store), the memory address and the register identification generated by the load/store register identifier generator 61 will be incremented. If the L/S MODE flag 105(B) is in the clear condition, the load or store operations will not be conditioned in response to the conditions of the bits of the vector mask in vector mask register 104.

The vector mask buffer 106 provides a register in which a current vector mask in the vector mask register 104 may be buffered. As noted above, the context logic 67 uses the status information generated during execution of an auxiliary data processing instruction to control the condition of corresponding bits of a new vector mask for use in connection with a subsequent auxiliary processing instruction. The context logic may buffer the current vector mask in the vector mask buffer for subsequent use.

The vector mask direction register 107 comprises a single flag whose condition indicates the direction with which the bits of the vector mask are applied to the successive vector elements. If the flag is, for example, set, the context logic 67 uses the bits of the vector mask register 104 in bit locations in order of increasing significance to condition operations in connection with the successive vector elements. On the other hand, if the flag is clear the context logic 67 uses the bits of the vector mask register in bit locations in order of decreasing significance to condition operations in connection with the successive vector elements. The flag similarly conditions the direction with which context logic 67 conditions the bit position of the vector mask register 104 in response to status information generated by the ALU and multiplier circuit 66 for the successive vector elements.

The context logic 67 uses the contents of a status mask register 110 to determine particular status information from the ALU and multiplier circuit 66 which it uses in conditioning the bits of a new vector mask for storage in register 104. As is conventional, the ALU and multiplier circuit 66 generates, for each element (if a monadic operation) or set of elements (if a dyadic or triadic operation), status information indicating, for example, whether the operation resulted in a zero result, an overflow, an underflow, a carry, or the like. If the auxiliary data processing instruction enables a comparison operation, in which values of corresponding elements of two vectors are compared, the status information may indicate the result of the comparison. The status mask register 110 identifies which status information will be used by the context logic in conditioning the bits of the vector mask register 104. A status register 111 stores the actual status information for each successive result generated by the ALU multiplier circuit 66.

The control and status registers 100 also include two registers 112 and 113 containing four fields, which are used by the address/refresh and control signal generator circuit 50 in connection with memory address range checking during load/store operations. In particular, heap limit register 112 includes two fields, namely, a heap limit upper field 112(U) and a heap limit lower field 112(L) which define the range of addresses of storage locations in both memory banks 24(i)(j) which contain heap data. Similarly stack limit register 112 includes two fields, namely, a stack limit upper field 113(U) and a stack limit lower field 113(L) which define the range of addresses of storage locations in both memory banks 24(i)(j) which contain stack data. In one particular embodiment, same ranges are used for each memory bank 24(i)(A) and 24(i)(B), although it will be appreciated that separate heap and stack limit registers may be provided for use in identifying separate ranges for the two memory banks 24(i)(j). The range of addresses, from the lower limit to the upper limit, defined by the fields in each register 112 and 113 identify the range of storage locations, in each memory bank 24(i)(j), which contain data for the particular process being executed by the processing node 11(i). The registers 112 and 113 permit the auxiliary processors 21(i) to perform bounds checking in connection with addresses received in connection with auxiliary processing instructions provided by the node processor 20, that is, to verify that the addresses lay within particular ranges of addresses whose data may be accessed in connection with the auxiliary processing instruction.

FIG. 2C further depicts formats for the diverse auxiliary processing instructions which may be executed by one embodiment of the auxiliary processors 21(i). In one embodiment, there are generally two classes of auxiliary processing instructions, including a short class 120, comprising generally one word, and a long class 121, comprising generally two words. The long class encompasses four different formats, including an immediate format 122, a memory-stride format 123, a register-stride format 124 and a control and status register ("CSR") control format 125. In each of the formats for an auxiliary processing instruction of the long class 121, the format of the high-order word is the same as the format of the short class 120. When the auxiliary processor 21(i) receives the auxiliary processing instruction from the processor bus 23, it determines whether the instruction is of the long class 121 or the short class 120 based on the transaction length that accompanies the address.

The format of the short class 120 includes three general portions, namely, a vector/scalar select portion 130, a load/store control portion 131 and a data processor control portion 132. The vector/scalar select portion 130 indicates whether the auxiliary processing instruction is for a scalar operation or a vector operation. If the vector/scalar select portion 130 indicates that the auxiliary processing instruction is a vector instruction, it additionally provides information used by the source (1) register identification generator 62 in incrementing the register identification for the source (1) register. Instructions of the long class format 121 contain information which may further define incrementation of this register identification information, and may also contain information used by the other register identification generators 61 and 63 through 65.

The load/store control portion 131 controls load/store operations, and includes a load/store function field 133 and a load/store register field 134. The load/store function field 133 contains a value which indicates whether the load/store operation is to be a load or a store, and the load/store register identifies a register in register file 34 to be used in connection with the operation. That is, if the vector/scalar select portion 130 indicates that the auxiliary processing instruction is a scalar instruction, the load/store register field 134 identifies the register into which data is to be loaded or from which data is to be obtained for storage. If the vector/scalar select portion 130 indicates that the instruction is a vector instruction, the load/store register field identifies a base register in register file 34, that is, the first register to be so used. In either case, the contents of load/store register field 134 are transferred to load/store register identification generator 61 for use in generating the L/S REG ID load/store register identification signals.

The data processor control portion 132 controls operations of the ALU and multiplier circuit 66, including identification of registers of the register file 34 to be used as the source (1), source (2) and destination registers. The data processor control portion 132 includes an ALU and multiplier function field 135 and three register identifier fields 140 through 142. The ALU and multiplier function field 135 provides the ALU/MULT FUNC signals to control the ALU and multiplier circuit 66. The register identifier fields 140 through 142 provide values which are used by the source (1), source (2) and destination register identification generators 62 through 64 in generating the respective register identification signals.

The four formats 122 through 125 of instructions of the long class have a high-order portion of the same format as the short class 120. In addition, the formats 122 through 125 have a low-order word whose format depends on the particular instruction format 122 through 125. In the immediate format 122, the low-order word comprises an immediate operand 143, that is, a value which is loaded into a selected register of register file 34 and is used as the source (2) operand; that is, the register file 34 transmits it as SRC 2 DATA source (2) data signals through the SRC 2 DATA port. Since the immediate operand is loaded into a register in register file 34, it will also be available for use in connection with subsequent auxiliary processing instructions if the register is identified by one of the register identifier fields 140 through 142. If the auxiliary processing instruction of the immediate format is a scalar instruction, as indicated by the contents of the vector/scalar select field 130, the data processor 32 will use the immediate operand in connection with the value in the register determined in connection with the source (1) register field 140 and the result will be stored in the register determined in connection with the destination register field 142. On the other hand, if the instruction is a vector instruction, the data processor 32 will use the immediate operand in connection with the values in the registers containing the vector determined in connection with the source (1) register field 140, and the result will be stored in the registers determined in connection with the destination register field 142. Accordingly, instructions of the immediate format can be useful in operating on all of the elements of a vector, which is identified in connection with the source (1) register field 140, using the same immediate operand.

In the memory-stride instruction format 123, the low-order word 144 comprises a memory stride value, which is loaded into memory stride register 102. In addition, an identification field 145 contains a value that identifies the instruction as having the memory-stride format.

In the register-stride instruction format 124, the low-order word includes several portions 146, 147 and 150 which are used in controlling the register selection by the source 2, destination and load/store register identification generators 63, 64 and 61, as well as an identification field 151 which contains a value that identifies the instruction as having the register-stride format. Each portion 146, 147 and 150 includes an offset field 152, 153 and 154 which contains an offset value that is used in conjunction with the value in the corresponding register identifier field 141, 142, or 134 of the high-order word, to generate a base register value for the corresponding register identification generator 63, 64 or 61. If the auxiliary processing instruction is a scalar instruction, the respective register identifier generators 63, 64 and 61 couple the base register values as respective register identification signals to the register file 34. If the auxiliary processing instruction is a vector instruction, they also couple the base register values for the first vector elements, and for each subsequent set of vector elements supply respective register identification signals representing register values incremented by amounts identified in stride fields 155 through 157 in respective portion 146, 147 and 150.

In the control and status register (CSR) control instruction format 125, the low-order word contains a number of fields whose contents may be used in executing the operations otherwise specified by the high-order word and the contents of the control and status registers 100, in place of the contents of the registers 100. In addition, depending on the values in several of the fields of format 125, the contents of several of the fields may be loaded in a particular one of registers 100. A field 160 contains a value that identifies the instruction as having the CSR control instruction format 125.

The CSR control instruction format 125 has a number of fields for controlling various ones of register 100 relating to use of the vector mask in register 104. A vector mask mode field 161 specifies two flags which perform the same function as the ALU mode flag 105(A) and load/store mode 105(B) flag of the vector mask mode register 105. If the auxiliary processing instruction has the CSR control instruction format 125, the contents of field 161 are used instead of flags 105(A) and 105(B). If a vector mask mode "sticky" field 162 contains a predetermined value, the contents of field 161 are loaded into the vector mask mode register 105, and may be used for subsequent auxiliary processing instructions.

In addition, a vector mask new field 163 controls selection of the vector mask, as between the contents of the vector mask register 104 and the vector mask buffer register 106. Depending on the value in the vector mask new field 163, the contents of the vector register mask register 104 may be copied into the vector mask buffer register 106, or the contents of the vector mask buffer register 106 may be copied into the vector mask register 104. Accordingly, the vector mask new field 163 facilitates saving of a current vector mask in the buffer register 106 for use later, or re-use of a vector mask previously saved in the buffer register 106.

A vector mask complement field 164 controls complementing of each of the bits of the vector mask in register 104. By suitable conditioning of the vector mask complement field 164 in sequential auxiliary processing instructions, the auxiliary processors 21(*i*) can be enabled to perform an operation in connection with some elements of one or more vectors, and subsequently a different operation in connection with the remaining elements of the same vectors.

Finally, a vector mask direction flag 165 contains a value which identifies the direction with which the context logic 67 applies the bits of the vector mask to the sequential elements of the vector or vectors. The context logic 67 will use this value instead of the contents of the vector mask direction register 107.

An auxiliary processing instruction of the CSR control instruction format 125 also includes two fields which control the vector length, that is, the number of elements to be processed in connection with the instruction. In particular, a vector length field 166 contains a value that identifies the number of vector elements to be processed. A vector length new field 167 contains a value that specifies that the contents of the vector length field 166 or the vector length register 101 will be used for the instruction, and may further enable the contents of the vector length field 166 to be stored in the vector length register 101.

The CSR control instruction format 125 further includes a register indirect base field 170, which identifies a base register containing an offset value for use in generating indirect addresses. The contents of field 170 may be used by the indirect address register identification generator 65 (FIG. 2B) as the base of a table of offset values in register file 34, with generator 65 iteratively generating the identifiers for a series of registers whose contents are to be used as offsets for use in generating a series of indirect addresses.

A register stride field 171 in the CSR control instruction format 125 includes a register stride value which may be used by either the source (1) or indirect address register identifier generator 62 or 65 in incrementing the register identifiers generated thereby. The particular one of the register identifier generators to receive the value in field 161 is specified in a miscellaneous address control field 172. The value in field 172 may also specify that the contents of register stride field 171 be loaded into the source (1) stride register 103, for use in connection with execution of this and subsequent auxiliary processing instructions.

II. Detailed Description Of Selected Circuits

A. Control Interface 30

Figures 1, 3A:
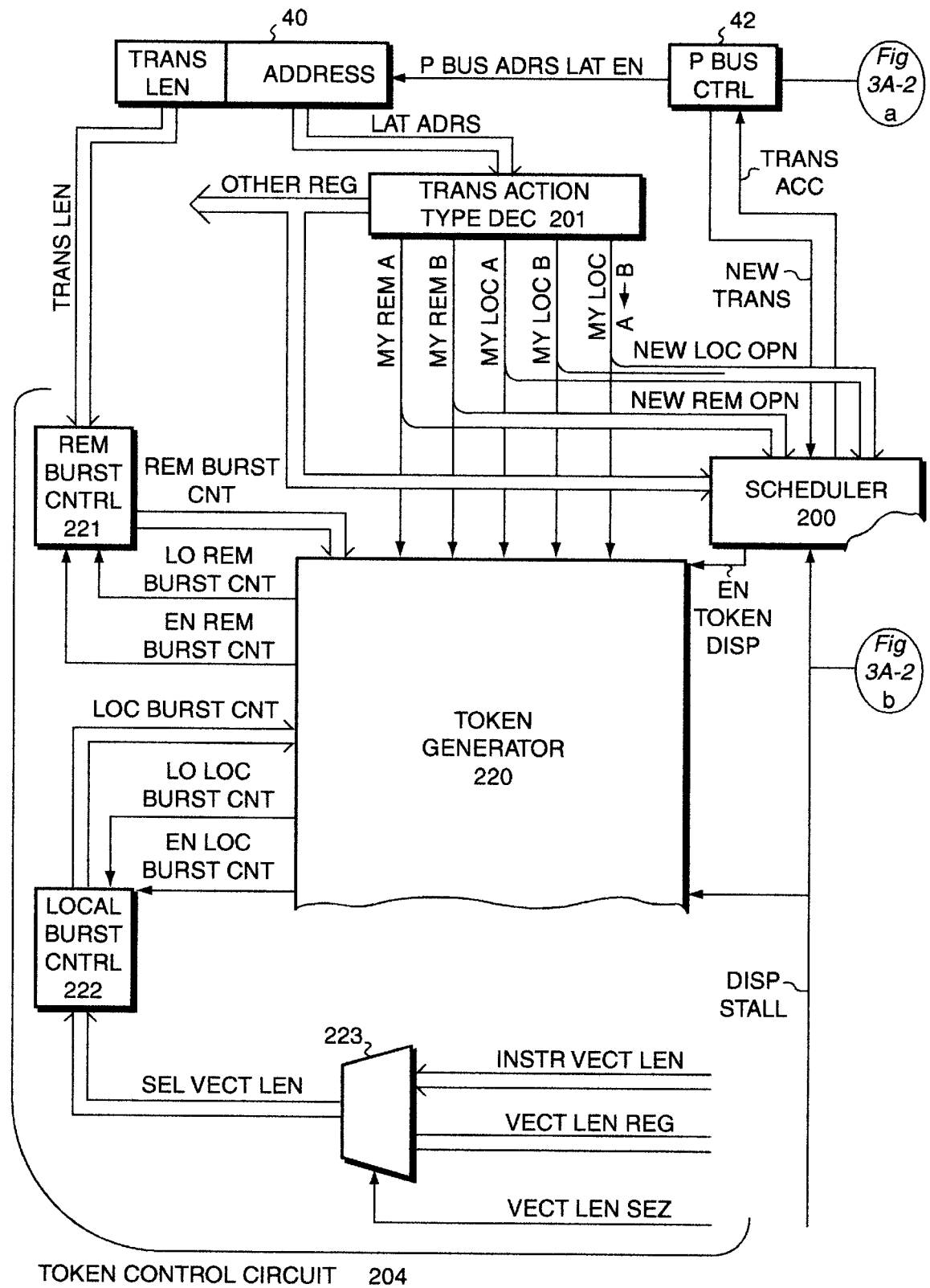
Figures 2, 3A:
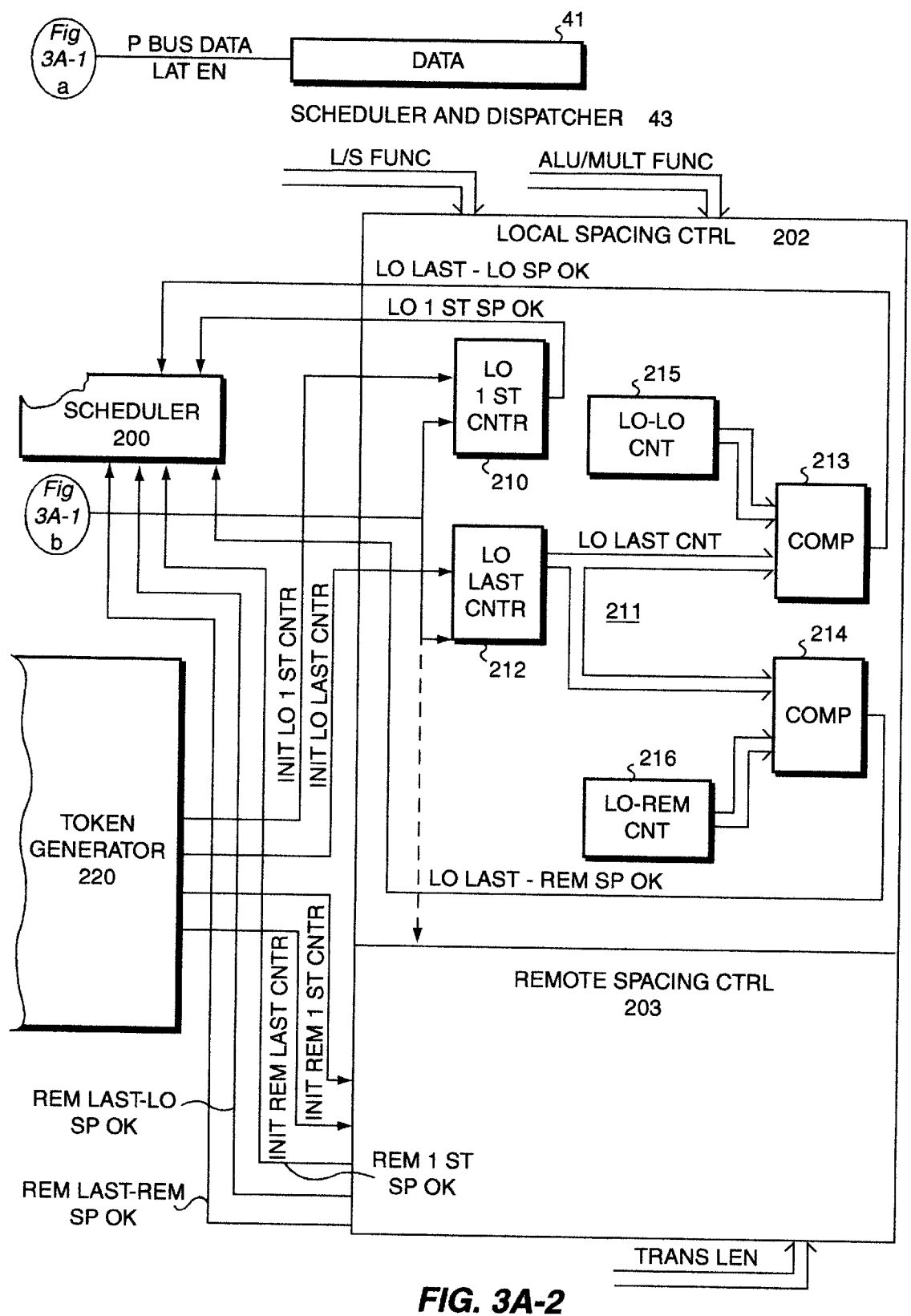
Figures 1, 3B:
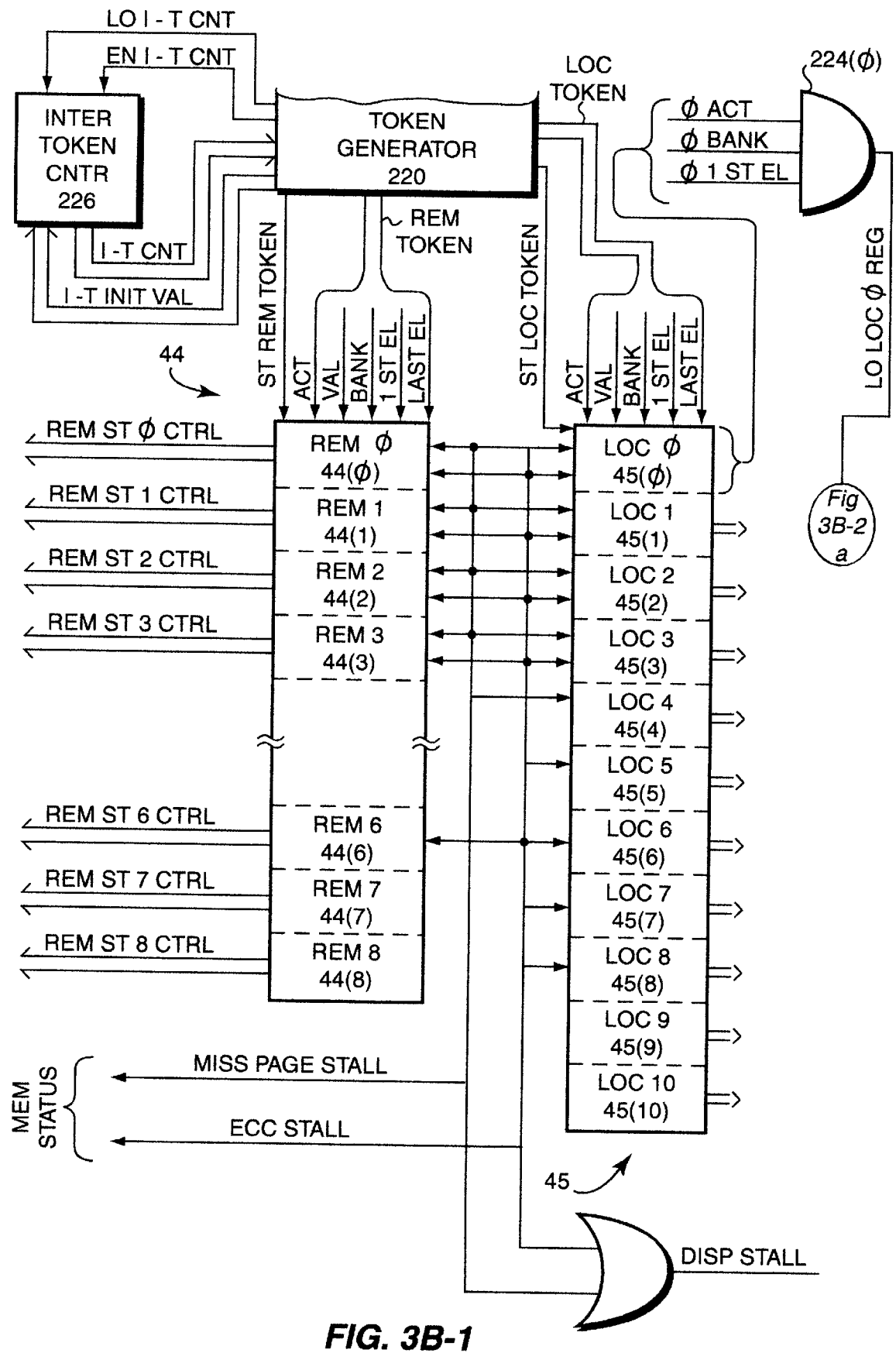
Figures 2, 3B:
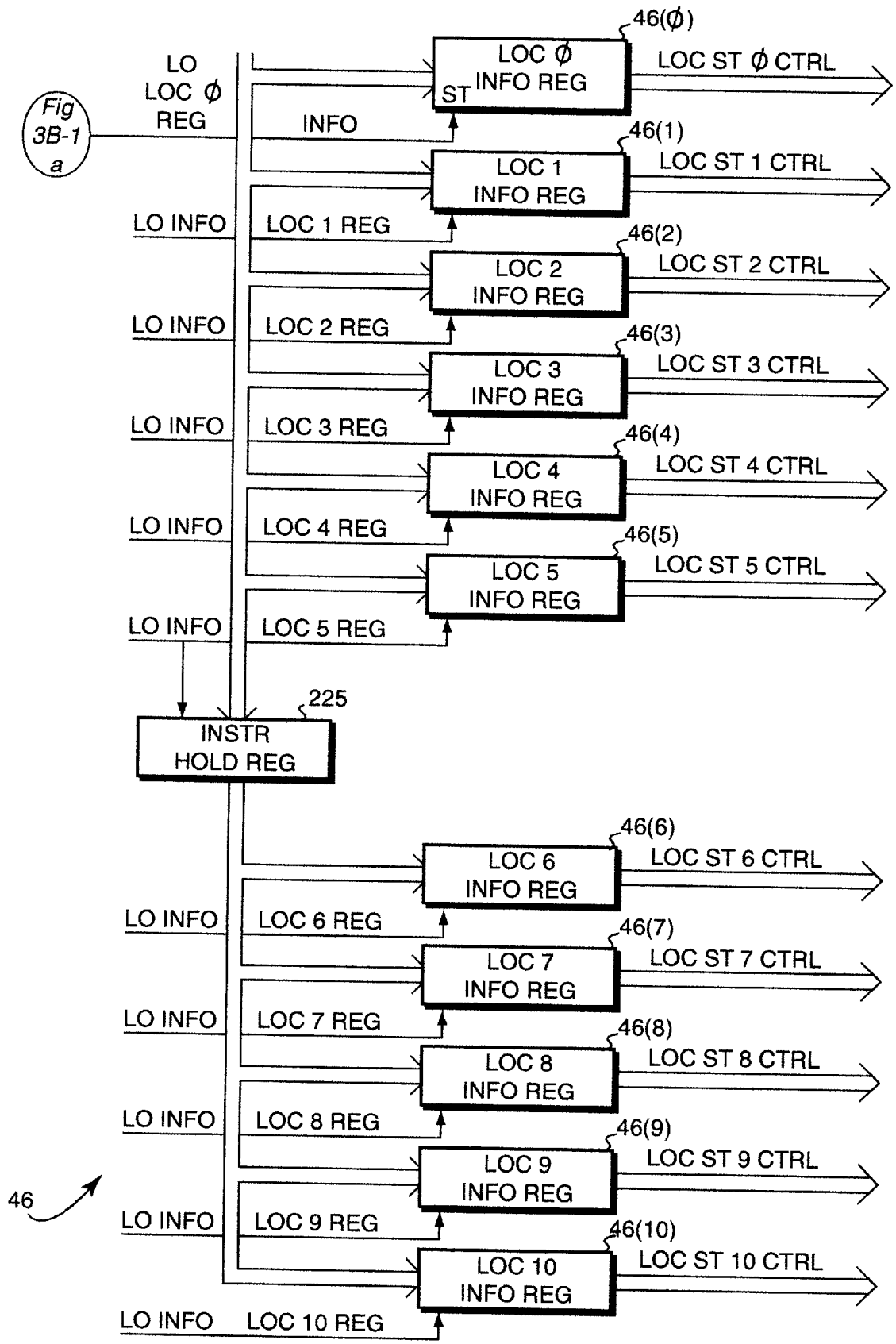

With this background, the details of the control interface 30 (FIG. 2A), and portions of memory interface 31 (FIG. 2A) and data processor 32 will be described in detail in connection with FIGS. 3A through 6. FIGS. 3A and 3B depict a functional block diagram of the control interface 30. With reference to FIG. 3A, when the processor bus control circuit 42, in response to appropriate control signals which it receives over the processor bus 23, determines that the node processor 20 has initiated a transaction over the processor bus 23, it controls PBUS ADRS LAT EN processor bus address latch enable signals to enable the address register 40 to latch the address and transaction length information. In addition, if the processor bus control circuit 42 determines that the transaction is a write transaction, it controls PBUS DATA LAT EN processor bus data latch enable signals to enable the data register 41 to latch the data signals. In addition, it controls NEW TRANS new transaction signals to notify a scheduler 200 in the scheduler and dispatcher circuit 43 of the new transaction.

The scheduler and dispatcher circuit 43 includes several circuit elements. A transaction type decoder 201 receives LAT ADRS latched address signals from the address register 40 and indicates whether the transaction is initiating a local operation or a remote operation, as well as the particular memory bank 24(*i*)(*j*) or register bank 34(*j*) in register file 34 to be used. The scheduler 200 uses a local spacing control circuit 202 and a previous remote spacing control circuit 203 to dispatch, that is, to schedule initiation of a new local or remote operation in relation to current local and remote operations. By providing that the initiation of a new local or remote operation be spaced in relation to current local and remote operations, the scheduler 200 can initiate an operation before the auxiliary processor 21(*i*) has completed previous operations, and guarantee that the newly-initiated operation and previously-initiated operations do not use the same circuit elements of the auxiliary processor 21(*i*) at the same time. When the scheduler 200 determines that the spacing with respect to the previous operation is satisfactory, it enables a token control circuit 204 to generate tokens for transmission to the appropriate local or remote strands 44 or 45 (FIGS. 2B and 3B). In this connection, the scheduler 200 enables a "dispatch" to enable the token control circuit 204 to generate the first token for the local or remote operation and provide it to the local or remote strand 45 or 44; thereafter, the token control circuit 204 iteratively generates successive tokens required for each storage location to be accessed during a remote operation or for each vector element during a local operation. If a local operation is a scalar operation, the token control circuit 204 generates tokens as though it were a vector operation with the vector having a vector length of one element.

More specifically, in response to the LAT ADRS latched address signals, the transaction type decoder 201 generates a MY REM A my remote bank A signal or MY REM B my remote bank B signal if the transaction initiates a local operation with respect to memory bank 24(*i*)(A) or 24(*i*)(B), respectively, for the auxiliary processor 21(*i*). These signals are transmitted to the scheduler 200 as NEW REM OPN new remote operation signals. If the local spacing control circuit 202 is asserting a LO 1ST SP OK local first spacing ok signal and a LO LAST-REM SP OK local last/remote spacing ok signal, and if the previous remote spacing control circuit 203 is asserting a REM 1ST SP OK remote first spacing ok signal and a REM LAST-REM SP OK remote last/remote spacing ok signal, scheduler 200 controls an EN TOK DISP enable token dispatch signal. The local spacing control circuit 202 asserts the LO 1ST SP OK local first spacing ok signal to indicate that a sufficient temporal spacing has passed since the token control circuit 204 has begun dispatching tokens for a local operation to permit it to dispatch either a new local operation or a new remote operation. Similarly, the local spacing control circuit 202 asserts the LO LAST-REM SP OK local last/remote spacing ok signal to indicate that a sufficient spacing has passed since the scheduler 200 has issued a dispatch to the token control circuit 204 token for the last vector element, or for the scalar element, for the local operation, for the first token for the new remote operation to be dispatched. The assertion by the remote spacing control circuit 203 of the REM 1ST SP OK and REM LAST-REM SP OK signals provide similar indications with respect to the dispatching of the tokens for the first and last elements for the remote operation.

On the other hand, if the LAT ADRS latched address signals indicate that the processor bus transaction provided an auxiliary processing instruction address to auxiliary processor 21(*i*), the transaction type decoder 201 generates a MY LOC A my local bank A signal or MY LOC B my local bank B signal if the transaction initiates a local operation with respect to the corresponding register bank 34(*j*) of register tile 34, or a MY LOC A+B signal if the local operation is for both register banks. These signals are transmitted to the scheduler 200 as NEW LOC OPN new local operation signals. If the local spacing control circuit 202 is asserting a LO 1ST SP OK local first spacing ok signal and a LO LAST-LO SP OK local last/local spacing ok signal, and if the remote spacing control circuit 203 is asserting a REM 1ST SP OK remote first spacing ok signal and a REM LAST-LO SP OK remote last/LOCAL spacing ok signal, scheduler 200 controls the EN TOK DISP enable token dispatch signal. The assertion of the LO 1ST SP OK local first spacing ok and the REM 1ST SP OK signals provide the same indication noted above. The local spacing control circuit 202 asserts the LO LAST-LO SP OK local last/local spacing ok signal to indicate that a sufficient spacing has passed since the scheduler 200 enabled the token control circuit 204 to dispatch the token for the last vector element, or for the scalar element, for the local operation, for the first token for the new local operation to be dispatched. The assertion by the remote spacing control circuit 203 of the REM LAST-LO SP OK signal provides a similar indication with respect to the dispatching of the token for the last element for the remote operation.

For either a new remote operation or a new local operation, if the signals from the spacing control circuits 202 and 203 provide the noted indications, and if a DISP STALL dispatch stall signal is not asserted, the scheduler 200 asserts an EN TOKEN DISP enable token dispatch signal to enable the token control circuit 204 to begin generating tokens. In addition, the scheduler 200 asserts a TRANS ACC transaction accepted signal, which it couples to the processor bus control circuit 42 to enable it to generate processor bus control signals to acknowledge the transaction.

As described above, the local spacing control circuit 202 and the remote spacing control circuit 203 enable the scheduler 200 to schedule the dispatch of tokens by the token control circuit 204 for a new local or remote operation in relation to the dispatch current local and remote operations to provide that various circuits of the auxiliary processor 21(i) will not be used for a local and a remote operation simultaneously. The local and remote spacing circuits are constructed similarly and so the structure of only local spacing control circuit 202 is shown in detail. The local spacing control circuit 202 includes the aforementioned counter circuit 210, which loads an initial value in response to the assertion by the token control circuit 204 of the INIT LO 1ST CNTR initialize local first counter signal. This occurs when the scheduler 200 enables the token control circuit 204 to begin generating tokens for a local operation for loading in the local strand 45. The counter circuit 210 decrements as the first token sequences through successive stages 45(k) of the local strand 45. The first token sequences through the successive stages 45(i) in response to successive ticks of a global clocking signal (not shown), which clocks all of the circuits comprising the auxiliary processor 21(i), unless a DISP STALL dispatch stall signal is asserted indicating the existence of a stall condition as described above. When the counter 210 counts out, it generates the LO 1ST SP OK local first spacing ok signal. The initial value used to initialize the counter 210 is selected to provide that, when the counter 210 counts out and asserts the LO 1ST SP OK signal, sufficient spacing from the dispatch of a local operation exists so that the scheduler 200 can dispatch a subsequent local or remote operation, as will be described below.

The local spacing control circuit 202 also has a circuit 211 which controls the aforementioned LO LAST-LO SP OK local last/local spacing ok signal and LO LAST-REM SP OK local last/remote spacing ok signal. The scheduler 200 uses these signals to provide that dispatch of a new local or remote operation, respectively, has sufficient spacing from the generation by the token control circuit 204 of the last token for a local operation whose tokens are currently being dispatched so that there will be no conflict for circuits of the auxiliary processor 21(i) between the current local operation and a new local or remote operation, respectively. The circuit 211 includes a counter 212 that loads an initial value in response to assertion by the scheduler 200 of an INIT LO LAST CNTR initialize local last counter signal, which occurs contemporaneously with the generation by the token control circuit 204 of the last token for a local operation. As with counter 210, the counter 212 decrements in response to the global clocking signal, if the DISP STALL dispatch stall signal is not asserted. Since the token is also shifted through the local strand 45 in response to each successive tick of the global clocking signal for which the DISP STALL dispatch stall signal is not asserted, the LO LAST CNT local last count signal generated by the counter 212 represents a value corresponding to the initial value, less the number of stages 45(k) which the token has been shifted through the local strand 45.

The LO LAST CNT local last count signal from counter 212 is coupled to two comparators 213 and 214 which actually generate the LO LAST-LO SP OK local last/local spacing ok signal and LO LAST-REM SP OK local last/remote spacing ok signal, respectively. The comparator 213 generates the LO LAST-LO SP OK signal in response to the LO LAST CNT signal and LO-LO CNT local-local count signal from a table 215. The LO-LO CNT signal provided by table 215 for any particular local operation represents a value which depends upon the various characteristics of the most recently dispatched local operation, including the particular type of load/store operation and the particular data processing operation, and it uses L/S FUNC load/store function and ALU/MULT FUNC signals representing the contents of fields 133 and 135 (FIG. 2C) of the auxiliary processing instruction for the current local operation in selecting a particular value to be represented by the LO-LO CNT signal. The table 215 provides the LO-LO CNT signal representing the selected value so that, when the counter 212 generates the LO LAST CNT local last count signal to indicate that the last token in the local strand 45 for the most recently dispatched local operation has reached a predetermined stage $45(k_x)$, the comparator 213 will assert the LO LAST-LO SP OK local last/local spacing ok signal. The stage $45(k_x)$ is selected to ensure that, if the scheduler 200 dispatches a new local operation, the new local operation will not require use of the same circuits of the auxiliary processor 21(i) contemporaneously with their use for the current local operation, as will be described below.

Similarly, the comparator 214 generates the LO LAST-REM SP OK signal in response to the LO LAST CNT signal and LO-REM CNT local-remote count signal from a table 216. The LO-REM CNT signal provided by table 215 for any particular local operation represents a value which depends upon the various characteristics of the most recently dispatched local operation, including the particular type of load/store operation and the particular data processing operation, and it uses L/S FUNC load/store function and ALU/MULT FUNC signals representing the contents of fields 133 and 135 (FIG. 2C) of the auxiliary processing instruction for the current local operation in selecting a particular value for the LO-REM CNT signal. The value represented by the LO-REM CNT signal from table 216 is such that, when the counter 212 generates the LO LAST CNT local last count signal to indicate that the last token in the local strand 45 for the most recently dispatched local operation has reached a predetermined stage $45(k_y)$ the comparator 214 will assert the LO LAST-REM SP OK local last/remote spacing ok signal. The stage $45(k_y)$ is selected to ensure that, if the scheduler 200 dispatches a new remote operation, the new remote operation will not require use of the same circuits of the auxiliary processor 21(i) contemporaneously with their use for the current local operation, as will be described below.

The remote spacing control circuit 203 has a counter (not shown) similar to the counter 210 which loads an initial value in response to assertion by the token control circuit 204 of an INIT REM 1ST CNTR initialize remote first counter signal. The token control circuit 204 asserts the INIT REM 1ST CNTR signal when it begins generating tokens for a remote operation for loading in the remote strand 44. The initial value used to initialize this counter is selected to provide that, when the counter counts out and asserts a REM 1ST SP OK remote first spacing ok signal, sufficient spacing from the dispatch of a remote operation exists so that the scheduler 200 can dispatch a subsequent local or remote operation. The remote spacing control circuit 203 further includes a circuit similar to circuit 211, which receives an INIT REM LAST CNTR initialize remote last counter signal from the token control circuit 204, for controlling the aforementioned REM LAST-LO SP OK remote last/local spacing ok signal and REM LAST-REM SP OK remote last/remote spacing ok signal. The token control circuit 204 asserts the INIT REM LAST CNTR signal when it generates the last token for a remote operation.

The token control circuit 204 generates tokens for transfer to the remote and local strands 44 and 45. The token control circuit includes a token generator 220, a remote burst counter 221 and a local burst counter 222. The token generator 220 actually generates the tokens. The tokens that it generates are determined by the MY REM A my remote bank A signal, the MY REM B my remote bank B signal, the MY LOC A my local bank A signal, MY LOC B my local bank B signal, and the MY LOC A+B my local banks A and B signal, which it receives from the transaction type decoder 201. The timing with which it begins generating tokens for a particular local or remote operation is determined by the EN TOKEN DISP enable token dispatch signal from the scheduler 200.

The number of tokens that the token generator 220 generates for a particular local or remote operation is determined by the remote burst counter 221 and local burst counter 222. If the token generator determines, based on the assertion of either the MY REM A or MY REM B signal, that the operation is a remote operation, it asserts an LD REM BURST CNT load remote burst counter signal that enables the remote burst counter 221 to load the transaction length value from the address register 40. Alternatively, if the token generator 220 determines, based on the assertion of either the MY LOC A, MY LOC B, or the MY LOC A+B signal that the operation is a local operation, it asserts an LD LOC BURST CNT load local burst counter signal that enables the local burst counter 222 to load SEL VECT LEN selected vector length signals from a multiplexer 223. The multiplexer 223, in turn, selectively couples INSTR VECT LEN instruction vector length signals, which are obtained from vector length information in the auxiliary processing instruction (FIG. 2C) or VECT LEN REG vector length registered signals from the vector length register 101, as selected by a VECT LEN SEL vector length select signal which is representative of the condition of the vector/scalar select portion 130 and the vector length new field 167 of the auxiliary processing instruction. In addition, the token generator 220 asserts the INIT LO 1ST CNT initialize local first counter signal, if the operation is a local operation, or the INIT REM 1ST CNTR initialize remote first counter signal, if the operation is a remote operation, to initialize the respective counter of the local spacing control circuit 202 or the remote spacing control circuit 203.

After being enabled, the token generator 220 will generate tokens in response to the global clocking signal (not shown), unless the DISP STALL dispatch stall signal is asserted, until it determines that the remote or local burst counter 221 or 222 decrements to zero. The token generator 220 may generate each successive token in response to successive ticks of the global clocking signal, so that successive tokens will sequence through successive stages of the respective remote or local strand 44 or 45. Alternatively, the token generator 220 may provide a selected inter-token spacing, so that there will be a minimum number of stages between successive tokens in the respective remote or local strand 44 or 45. The particular number of stages provided will depend on the type of memory access to be performed by the memory interface 31 or the data processing operation performed by the data processor 32, as will be described below in connection with FIGS. 7A through 10. If the token generator 220 provides a multiple-tick inter-token spacing, it uses a counter 226 (FIG. 3B). Upon dispatching each token, the token generator 220 will provide an I-T INIT VAL inter-token initialization value signal, representing the inter-token spacing, and assert an LD I-T CNT load inter-token count signal to enable the counter 226 to load the value represented by the I-T INIT VAL signal. The particular initialization value will, as noted above, depend on the type of memory access to be performed by the memory interface 31 or the data processing operation performed by the data processor 32. For each successive stage of the remote or local strand 44 or 45 through which the token progresses, the token generator 220 asserts an EN I-T CNT enable inter-token count signal to enable the counter 226 to count down. The counter 226 generates I-T CNT inter-token count signals, which are received by the generator 220, and when the I-T CNT signals indicate that the counter 226 has counted out, the previously-dispatched token has progressed to a stage such that the token generator 220 can dispatch a new token. The token generator 220 repeats these operations for each successive token.

After generating each token for a remote operation, the token generator asserts an EN REM BURST CNT enable remote burst counter signal, which enables the remote burst counter to decrement, and the token generator 220 receives REM BURST CNT remote burst count signals generated thereby to determine if they represent the value zero. If not, the token generator 220 repeats the operation. When the token generator 220 determines that the REM BURST CNT remote burst count signal represents a zero value, it stops generating tokens and asserts the INIT REM LAST CNTR initialize remote last counter signal to control the respective counter (not shown, corresponding to counter 212) of the remote spacing control circuit 203.

For a local operation, the token generator 220 generates tokens for both banks, even if an auxiliary processing instruction enables operations only for one bank. Accordingly, the token generator 220 asserts an EN LOC BURST CNTR enable local burst counter signal, to enable the local burst counter 222 to decrement, for every two tokens which it generates, one token being generated for each bank. After generating a token for each bank, the token generator asserts the EN LOC BURST CNT enable local burst counter signal, which enables the remote burst counter to decrement, and the token generator 220 receives LOC BURST CNT local burst count signals generated thereby to determine if they represent the value zero. If not, the token generator 220 repeats the operation. When the token generator 220 determines that the LOC BURST CNT local burst count signal represents a value that corresponds to zero, it stops generating tokens and asserts the INIT LOC LAST CNTR initialize local last counter signal to initialize counter 212 of the local spacing control circuit 203.

With reference to FIG. 3B, the token generator 220, in generating each token, controls five signals. In particular, a remote token comprises an ACT active signal, a VAL valid signal, a BANK identifier, a 1ST EL first element signal and a LAST EL last element signal. The ACT signal, when asserted, indicates that it and the rest of the signals represent a token. The VAL signal, when asserted, indicates that the token is valid. The BANK identifier identifies the particular memory bank $24(i)(A)$ or $24(i)(B)$ to be involved in the memory access represented by the token. The 1ST EL and LAST EL first and last element signals, when asserted indicate that the token is for the first and last access, respectively, for a multi-word access of the identified memory bank $24(i)(j)$. In directing a token to the remote strand 44, the token generator 220 asserts an ST REM TOKEN store remote token signal, which enables the first stage 44(0) of the remote strand to latch the five signals.

Similarly, a local token comprises an ACT active signal, a VAL valid signal, a BANK identifier, a 1ST EL first element signal and a LAST EL last element signal. The ACT signal, when asserted, indicates that it and the rest of the signals represent a token. The VAL signal, when asserted, indicates that the token is valid. The BANK identifier identifies the particular register bank $34(j)$ of register file 34 to be used in connection with the operation enabled by the token, and thus corresponds to the high-order signal of the register identifier. In one particular embodiment, the token generator 220 alternatively generates local tokens for the respective register banks $34(j)$, even if an auxiliary data processing instruction is only for one bank. In that case, in a local token for a bank whose data is to be processed, the ACT active signal is asserted indicating that it and the accompanying signals represent a token, and the VAL valid is asserted. On the other hand, for the bank whose data is not to be processed, the ACT active signal is asserted, also to indicate that the signals represent a token, but the VAL valid signal is negated. In one embodiment, the token generator 220 begins with local tokens for the bank of register file 34 for which the BANK signal is asserted. Continuing with a description of the various signals representing a local token, the 1ST EL and LAST EL first and last element signals, when asserted indicate that the token is for the first and last vector element, respectively, for a vector operation of the identified memory bank $24(i)(j)$. In directing a token to the local strand 45, the token generator 220 asserts an ST LOC TOKEN store local token signal, which enables the first stage 45(0) of the local strand to latch the five signals.

As described above, the remote strand 44 and the local strand 45 are both in the form of shift registers, comprising a series of stages $44(i)$ and $45(k)$, respectively. In one embodiment, the remote strand 44 comprises nine stages 44(0) through 44(8) and the local strand comprises eleven stages 45(0) through 45(10), with each stage being associated with one stage of the series of steps, each associated with one tick of the global clock signal, in the operations required to perform a remote or local operation for accessing one storage location in a remote operation or processing one scalar or vector element in a local operation. Each stage $44(i)$ of the remote strand 44 provides REM ST "i" CTRL remote state "i" control signals ["i" representing the same value as the index "i" in reference numeral $44(i)$], which are coupled to the address/refresh and control signal generator circuit 50 as the MEM CTRL signals as shown in FIG. 2A to control it in performing the series of operations required to access one storage location in the memory bank $24(i)$ identified by the BANK signal.

Each stage $45(k)$ of the local strand 45 generates signals which, along with signals from the corresponding register $46(k)$ of the local strand control register set 46, provide LOC ST "k" CTRL local state "k" control signals ["k" representing the same value as the index "k" in reference numeral $44(k)$], which are coupled as the LOC CTRL signals as shown in FIG. 2A, which to control the address/refresh and control signal generator circuit 50 and the data processor 32 in performing the series of operations required to access one storage location in the memory bank $24(i)(j)$ identified by the BANK signal in connection with a load/store operation, and which further control the data processor 32 in performing the series of operation required to select the required registers and execute the auxiliary data processing operation.

As the token for the first element is transferred through each stage $45(k)$ of the local strand 45, a decoder $224(k)$ associated with the stage asserts a LD LO "k" INFO REG load local state "K" information register signal, which enables the register $46(k)$ to load selected information from the auxiliary data processing instruction in the data register 41, the selected information being the information necessary to generate the required LOC ST "k" CTRL signals for the state. The decoders $224(k)$ are generally similar, and only one, namely, decoder 224(0), is shown in FIG. 3B. Decoder 224(0) comprises an AND gate, which receives a 0 ACT stage "0" active signal, a 0 VAL stage "0" valid signal and a 0 1ST EL stage "0" first element signal, and asserts the LD LOC 0 INFO REG signal when all of these signals are asserted. Each of the 0 ACT, 0 VAL and 0 1ST EL signals is asserted when the stage 45(0) of the local strand 45 receives a token in which the respective ACT, VAL, and 1ST EL signal is asserted, which occurs when the token for the first element of a vector or when the token for a scalar is loaded into the stage 45(0). As the local strand 45 shifts the token through the successive stages $45(k)$, successive decoders $224(k)$ (not shown) enable the successive registers $46(i)$ to latch the corresponding information from the auxiliary processing instruction. In addition, as the token for the first element transfers through the sixth stage 45(5), the LD LOC "5" INFO REG signal enables an instruction hold register 225 to buffer the auxiliary processing instruction from the data register 41. The subsequent registers 46(6) through 46(10) of the local strand control register set 46 thereafter receive their information from the instruction hold register 225, rather than the data register 41. This enables the data register 41 to be re-used for another transaction over the processor bus 23.

The remote strand 44 and the local strand 45 shift the tokens provided by the token generator 220 in response to successive ticks of the global clocking signal (not shown) while MISS PAGE STALL and ECC STALL error correction code stall signals are not asserted. The MISS PAGE STALL and ECC STALL signals are provided in the MEM STATUS memory status signals from the memory interface 31, and are asserted to indicate conditions in a memory access which may delay the memory interface 31 in connection with a memory access, which may arise either during a remote operation or during a local operation. For example, if the memory bank data interface circuit 51 detects an error during an access of a memory location, it will attempt to correct the error using error correction code bits that are stored with the data. Such a correction will result in a delay in responding to that and any subsequent accesses represented by other tokens in the remote strand preceding the token representing the access which gave rise to the error. Similarly, if, as described above, a memory bank $24(i)(j)$ is required to load a new page in its output registers, the address/refresh and control signal generator 50 will assert a MISS PAGE STALL signal since that operation will require more time by the memory interface 31. In either case, to ensure that operations enabled by tokens in the local strand 45 as described above do not cause conflicts for circuits of the auxiliary processor 21(i) with respect to operations for stalled tokens in the remote strand, tokens in at least some stages 45(k) of the local strand will also be stalled.

The MISS PAGE STALL and ECC STALL signals are also coupled to an OR circuit 225 to enable it to assert the DISP STALL dispatch stall signal if either signal is asserted. The DISP STALL signal is coupled to control the scheduler 200, local and remote spacing control circuits 202 and 203 and the token generator 220 as described above.

It will be appreciated that there may be other conditions, both internal to the auxiliary processor 21(k) which may also give rise to stall conditions, which may be handled by the control interface 31 in a manner similar to those which enable the assertion of the MISS PAGE STALL and ECC STALL signals as described above.

B. Memory Bank Address/Refresh And Control Signal Generator 50.

The structure and operation of the data interface 51 is generally conventional and will not be described in detail. During a read operation, in which data is retrieved from a storage location in a memory bank 24(i)(j) during either a local or remote operation, the data interface 51 receives the data as "j" DATA signals (index "j" represents "A" or "B") from the appropriate memory bank 24(i)(j). The "j" DATA signals includes the data to be provided, plus error correction and detection code ("ECC") signals. The data interface uses the ECC signals to determine whether the data has an error, and if so corrects the error, if possible. The data interface 51 notifies the address/refresh and control signal generator 50 if an error has been found, which in turn can notify the control interface 30 to stall the remote and local strands 44 and 45 and the scheduler and dispatcher 43 as described above. If it finds no error, or after the error correction, the data interface 51 transmits the data as DATA signals onto B bus 36. If the operation is a local operation, the data is coupled from B bus 36 as LOAD/STORE DATA signals to the register file 34, for storage in a location identified by the L/S REG ID load/store register identifier signals from load/store register identifier generator 61. On the other hand, if the operation is a remote operation, the data signals on B bus 36 are coupled through driver 38 onto A bus 35 and to the data register 41 for transmission as P DATA processor bus data signals to the node processor 20.

On the other hand, during a write operation, in which data is stored in a storage location in a memory bank 24(i)(j) during either a local or remote operation, the data interface 51 receives the data as DATA signals from B bus 36. In addition, since the DATA signals representing data to be stored in a storage location may represent only a portion (such as a byte) of the total amount of data (such as a eight-byte word) stored in the storage location, the address/refresh and control signal generator 50 initiates a read operation, as described above, to retrieve the contents of the storage location in which the data is to be stored, and the data interface 51 performs an error detection and correction operation in connection with the retrieved data as described above. After data interface 51 detects and, if necessary corrects, the data, it constructs a new word by merging the data received from the B bus 36 into the data received from the memory bank 24(i), generates error detection and correction ("ECC") code signals for the new word and transmits the data and ECC signals as "j" DATA signals for storage in the memory bank 24(i)(j).

The address/refresh and control signal generator 50 will be described in connection with FIG. 4. With reference to FIG. 4, the generator 50 includes two general portions, including an address generator 250 and a control signal generator 251. The address generator 250 generates the A ADRS and B ADRS address signals (generally, the aforementioned "j" ADRS signals) for coupling to the memory banks 24(i)(j). The memory control signal generator 251 generates the "j" RAS, "j" CAS, "j" WE and "j" OE (index "j" referencing "A" and "B") row address strobe, column address strobe, write enable and output enable control signals for controlling the memory banks 24(i)(j) and a number of control signals for controlling the address generator 250 as described below. The memory control signal generator 251 generates the signals under control of REM ST 0 CTRL through REM ST 8 CTRL remote state zero through eight control signals from the remote strand, and LOC ST 0 CTRL through LOC ST 10 CTRL local state zero through ten control signals from the local strand and registers 46(k). In addition, the memory control signal generator 251 generates the MISS PAGE STALL and ECC STALL signals, which it couples to the control interface 30 (FIG. 3B), in response to A MISS PAGE and B MISS PAGE signals from the address generator 250 and an ERR DET error detected signal from the data interface 51, respectively. The address generator 250 asserts the A MISS PAGE and B MISS PAGE signals when it detects a miss page condition with respect to an address coupled to the memory banks 24(i)(j). The data interface 51 asserts the ERR DET error detected signal when it detects an error in a data word which it receives from a memory bank 24(i)(j). The resulting MISS PAGE STALL and ECC STALL signals generated by the memory control signal generator 251 enables the respective remote and local strands 44 and 45, along with the scheduler and dispatcher 43, to stall as described above.

The address/refresh and control signal generator 50 also includes a refresh controller 252 which periodically generates a REF EN refresh enable signal to enable the memory control signal generator 251 to initiate a refresh operation with respect to the memory banks 24(i)(j). In one embodiment, the memory control signal generator 251 enables the memory banks 24(i)(j) to perform a refresh operation using "CAS-before-RAS" refresh signalling. That is, the memory control signal generator 251 enables a refresh operation with respect to each memory bank 24(i)(j) by asserting the "j" CAS column address strobe signal prior to asserting the "j" RAS row address strobe signal.

The address generator 250 generates the A ADRS and B ADRS address signals for coupling to the memory banks 24(i)(j) based on signals representing a base address value and either signals representing a stride value or an indirect offset value. The address generator 250 receives the base address as LAT ADRS signals from address register 40 (FIG. 2A) and latches them in a memory base register 260. If the address as coupled to memory banks 24(i)(j) is to be incremented by a stride value, the stride value is previously loaded into the memory stride register 102 by means of a remote operation addressing a register on the auxiliary processor 21(i). As described above, in that operation, the memory stride value is received as P DATA signals and latched in the data register 41, accompanied by P ADRS signals identifying the register 102. The transaction type decoder 201 and scheduler 200 cooperate to enable the signals in the data register 41 to be coupled onto the A bus 35 and to the address generator as MEM INDIR/STRIDE memory indirect/stride signals, which are latched by register 102. If the address coupled to memory banks 24(i)() is to be incremented by an indirect offset value, the indirect offset value is coupled from the register file 34, from a register identified by the indirect address register identifier generator 65, onto the A bus 35 of bus system 33 and to the address generator 250 as MEM INDIR/STRIDE signals, and stored in memory indirect register 254.

Describing initially a memory operation in which one memory bank 24(*i*)(A) will be accessed, as the token for the first element, sequences through the respective local or remote strand 45 or 44, REM ST "x" CTRL and LOC ST "x" CTRL local and remote state "x" control signals will be generated which enable memory control signal generator to generate miscellaneous control signals for enabling the address generator 250 to transfer the base memory address from register 260 to a bank "A" address register 270A. In that sequence, the memory control signal generator 251 initially asserts an EN MEM BASE enable memory base signal to enable a multiplexer 261 to couple the contents of memory base register 260 as SEL MEM BASE selected memory base signals to one input of an adder circuit 262. The memory control signal generator 251 maintains SEL INDIR/STR selected indirect/strobe signals from a multiplexer 236 LAT at a negated, or zero value, level. The adder 262 thereby generates output INC ADRS incremented address signals, which point to the same storage location as the SEL MEM BASE signal provided by register 260. The INC ADRS incremented address signals are coupled as NEW A ADRS new bank "A" address signals to an input terminal of a register 265A. Since the bank identifier of the token identifies memory bank 24(*i*)(A), the memory control signal generator 251 asserts a LAT NEW A ADRS signal, which enables a register 265A to latch the INC ADRS incremented address signal and couple it as NEW A ADRS new bank "A" address signals.

The address generator 250, under control of the memory control signal generator 251, performs two comparison operations. In one comparison operation, which occurs before the INC ADRS signals are latched in register 265A, the INC ADRS (ROW) signals representing the portion of the INC ADRS signals which identify the row in memory bank 24(*i*)(A) are compared to the row portion of address signals which may be already latched in the register 265A, which are identified as LAT NEW A ROW ADRS latched new bank "A" row address signals, to determine whether they identify the same row. If they do, the memory access using the INC ADRS signals may proceed in fast page mode. Otherwise, the access will proceed in normal mode. In making this comparison, the memory control signal generator 251 asserts an SEL A/B ROW ADRS select bank "A" or "B" address signal, which enables a multiplexer to couple the LAT NEW A ROW ADRS signals as NEW A/B ROW ADRS new bank "A" or "B" row address signals to one input terminal of a comparator 271. The other input terminal of comparator 271 receives the INC ADRS (ROW) signals. If the comparator determines that the signals at its input terminals identify the same row, it asserts an A/B MISS PAGE bank "A" or "B" miss page signal., On the other hand, if comparator 271 determines that the signals at its input terminals identify different rows, it negates the A/B MISS PAGE signal. The A/B MISS PAGE signal is coupled to the memory control signal generator 251.

In the other comparison, which takes place after the INC ADRS signal is latched in register 265A, the address identified by the NEW A ADRS signals is compared with the heap and stack limits in the registers 112 and 113 to verify that it is within the required heap and stack ranges. In that operation, the NEW A ADRS signals are coupled to one input terminal of a multiplexer 274. At this point, the memory control signal generator 251 asserts a COMP A/B ADRS compare A/B address signal, which enables the multiplexer 274 to couple the NEW A ADRS signals as SEL NEW A/B ADRS selected compare A/B address signals to comparator circuits 275 and 276, which perform bounds checking for the access. In particular, the comparator circuit performs bounds checking in connection with HEAP/STACK LIM UPPER heap and stack limit upper signals, representing the values contained in both the heap limit upper field 112(u) and the stack limit upper field 113(u). If the address defined by the NEW A ADRS signals represents a value that is higher than the value contained in the heap limit upper field 112(u) or the value contained in the stack limit upper field 113(u), the comparator 275 asserts a NEW ADRS TOO HIGH new address too high signal, which is coupled to the memory control signal generator 251. Similarly, the comparator circuit 276 performs bounds checking in connection with HEAP/STACK LIM LOWER heap and stack limit lower signals, representing the values contained in both the heap limit lower field 112(l) and the stack limit lower field 113(l). If the address defined by the NEW A ADRS signals represent a value that is lower than yhe value contained in the heap limit lower field 112(l) or the value contained in the stack limit lower field 113(l), the comparator 276 asserts a NEW ADRS TOO LOW new address too low signal, which is also coupled to the memory control signal generator 251. If either the NEW ADRS TOO HIGH signal or the NEW ADRS TOO LOW signal is asserted, the memory control signal generator 251 can assert a NEW ADRS BOUNDS VIOL new address bounds violation signal, which is coupled to the control interface 30 to enable it to notify the node processor 20 of the error.

.AAs noted above, the MISS PAGE signal is coupled to the memory control signal generator 251 and, when it is negated, there is no miss page condition and so the generator 251 will enable the memory access of memory bank 24(*i*)(A) to proceed in fast page mode. If a miss page condition exists, the memory control signal generator 251 operates in a miss page mode to enable the multiplexer to initially couple, as the A ADRS bank "A" address signals, the LAT NEW A ROW ADRS signals, followed by the LAT NEW A COL ADRS signals, accompanied respectively by A RAS bank "A" row address strobe and A CAS bank "A" column address strobe signals. Accordingly, if the MISS PAGE signal is asserted, the memory control signal generator 251 in miss page mode initially asserts an XMIT A RA transmit bank "A" row address signal to enable the multiplexer 272A to couple the LAT NEW A ROW ADRS signals as the A ADRS signals, and contemporaneously asserts the A RAS bank "A" row address strobe. Subsequently, the memory control signal generator 251 negates the XMIT A RA signal to enable the multiplexer 272A to couple the LAT NEW A COL ADRS signals as the A ADRS signals, and contemporaneously asserts the A CAS bank "A" column address strobe. In addition, the memory control signal generator 251 also asserts the MISS PAGE STALL signal, which controls the control interface 30 as described above.

However, in fast page mode, the memory control signal generator 251 need only enable the multiplexer 272A to couple the LAT NEW A COL ADRS signals, accompanied by the A CAS bank "A" column address strobe signal, to the memory bank 24(*i*)(A). Thus, if the MISS PAGE signal is negated, the memory control signal generator 251 in fast page mode maintains the XMIT A RA transmit bank "A" row address in a negated state, so that the multiplexer does not couple the LAT NEW A ROW ADRS bank "A" row address signal as the A ADRS bank "A" address signals. Instead, the negated XMIT A RA signal merely enables the multiplexer 272A to couple the LAT NEW A COL ADRS signals as the A ADRS signals, and the memory control signal generator 251 contemporaneously asserts the A CAS bank "A" column address strobe.

In either fast page mode or miss page mode, if the memory access is to store data in the addressed storage location, the memory control signal generator 251 will also assert an A WE bank "A" write enable signal. If data is to be retrieved from the location, it will maintain the A WE signal in a negated condition and assert the A OE bank "A" output enable signal to enable the memory bank 24(i)(A) to transmit data to the data interface 51.

It will be appreciated that, if the next token enables similar operations with respect to the corresponding storage location in memory bank 24(i)(B), that is, the storage location with the same row and column identifiers, the operations described above will be repeated with respect to register 265 multiplexers 266 and 267 (with the A/B MISS PAGE SEL signal in the negated condition) and comparator 271, multiplexer 264 (with the COMP A/B ADRS SEL signal in the negated condition) and comparators 275, as well as multiplexer 272. This may occur, in particular, if the operation is a load/store operation with respect to storage locations at corresponding row and column identifiers in both memory banks 24(i)(j).

In generating addresses for a series of storage locations, which may be necessary if, for example, the operation is a local load or store operation with respect to a series of vector elements, the specific operations of the address generator 250 will depend on whether the auxiliary processing instruction calls for memory stride addressing or indirect addressing. If the auxiliary processing instruction calls for memory stride addressing, the address generator 250 will generate addresses for the first access as described above. In generating addresses for succeeding locations, the contents of the memory stride register 102 are added, by adder 262, to the current address to provide the address of the next storage location of memory bank 24(i)(j). In particular, to generate the address for the next storage location of memory bank 24(i)(A), the memory control signal generator 251 asserts a SEL A/B BASE ADRS selected memory bank "A/B" base address signal, which enables a multiplexer 273 to couple the NEW A ADRS new bank "A" address signals, which at this point represent the base address latched in register 265A, as NEW A/B BASE ADRS new bank "A" or "B" base address signals to multiplexer 261. The memory control signal generator 251 further negates the EN MEM BASE signal, which enables multiplexer 261 couple the NEW A/B BASE ADRS signal as the LAT BASE latched base signal to one input terminal of adder 262. The memory control signal generator 251 further negates the EN INDIR/STRIDE enable indirect/stride signal, which, in turn, enables the multiplexer 263 to couple the contents of the memory stride register 102 as SEL INDIR/STRIDE latched indirect or stride signals to the other input terminal of adder 262. Adder 262 generates INC ADRS incremented address signals which are coupled to register 265A and which point to the next location in memory bank 24(i)(A) to be accessed. After the miss page comparison using multiplexer 266 and comparator 271 as described above, the memory control signal generator 251 will asserts the LAT NEW A ADRS signal to enable register 265A to latch the NEW A ADRS signals.

IIf alternate tokens enable similar operations with respect to the memory bank 24(i)(B), the memory control signal generator 251 may further enable incrementation of the address in register 265B in a corresponding manner. In that operation, the memory control signal generator 251 negates the SEL A/B BASE ADRS SIGNAL, which enables the multiplexer 273 to couple the NEW B ADRS new bank "B" address signals, which still represent the base address latched in register 265B, as NEW A/B BASE ADRS new bank "A" or "B" base address signals to multiplexer 261. The memory control signal generator 251 further negates the EN MEM BASE signal, which enables the multiplexer 261 to couple the NEW A/B BASE ADRS signal as the LAT BASE latched base signal to one input terminal of adder 262. The memory control signal generator 251 further negates the EN INDIR/STR enable indirect/stride signal, which, in turn, enables the multiplexer 263 to couple the contents of the memory stride register 102 as LAT INDIR/STRIDE latched indirect or stride signals to the other input terminal of adder 262. Adder 262 generates INC ADRS incremented address signals which point to the next location in memory bank 24(i)(B) to be accessed. After performing the miss page comparison as described above, the memory control signal generator 251 asserts the NEW BASE B signal to enable register 265B to latch the INC ADRS incremented address signals. At this point the NEW B ADRS new bank "B" address signals provided by the register 265B will correspond to the latched INC ADRS incremented address signals. The memory control signal generator 251 will subsequently control the XMIT B RA transmit bank "B" row address to enable the multiplexer 272B to selectively couple the B ROW ADRS and B COL ADRS signals from the register 265B to the memory bank 24(i)(B) as the B ADRS signals.

The memory control signal generator 251 will repeat these operations for each successive vector element.

The operations performed in connection with indirect addressing are somewhat more complex than those performed in connection with memory stride addressing. In indirect addressing, for each successive vector element for each of the memory banks 24(i)(A) and 24(i)(B), including the first vector element, the memory interface receives an indirect offset value which is stored in the memory indirect register 254, and which will be added to the base address in the memory base register 260 by the adder 262. The indirect offset values are stored in successive registers in the register file 34, which are pointed to by the INDIR ADRS REG ID indirect address register identifier signals from the indirect address register identifier generator 65.

After the control interface 30 and the memory control signal generator 251 have cooperated to enable an indirect offset value to be transferred from a register in register file 34 to the register 254, to generate the address for the storage location of memory bank 24(i)(A), the memory control signal generator 251 asserts the EN MEM BASE enable memory base and EN INDIR/STR enable indirect/stride signals which enable multiplexers 261 and 263 to couple LAT BASE latched base signals representing the memory base, and LAT INDIR/STR latched indirect/stride signals representing the indirect offset value, to respective input terminals of adder 262. The adder 262 generates INC ADRS incremented address signals which represent the sum of the base and indirect offset values represented by the LAT BASE and LAT INDIR/STR signals, respectively.

After enabling the miss page comparison as described above, the memory control signal generator 251 asserts the LAT NEW BASE A latch new base bank "A" signal to enable the register 265A to latch the INC ADRS incremented address signals. The register 265A then couples the latched signals as NEW A ADRS new bank "A" address signals, and, if the address is within the range limits determined by the stack and heap limit registers 112 and 113, transmission of the row (if necessary) and column portions of the address to the memory bank 24(i)(A) proceed as described above.

The operations performed in connection with generating an address for the memory bank 24(i)(B) are similar.

These operations will be repeated for each vector element represented by tokens in the local strand 45 for the auxiliary processing instruction enabling indirect addressing in connection with a load/store operation enabled thereby. It will be appreciated that a new indirect offset value will be provided for each access for each memory bank 24(i)(A) and 24(i)(B) since the offset values may differ for corresponding vector elements from the memory banks. As described above, the register file 34 is divided into two portions based on the high-order bit of the register identifications, with one portion being for storing data loaded from memory bank 24(i)(A) and the other portion being for storing data loaded from memory bank 24(i)(B). The indirect offset values used in connection with accesses of each memory bank 24(i)(j) are provided from registers in the bank's respective portion in the register file, and the values in corresponding ones of these registers may differ. Accordingly, prior to generating an address for a storage location in a memory bank 24(i)(j), the indirect offset value from the register identified by the indirect address register identifier generator 65 in the specific portion of the register file 34 associated with the memory bank 24(i)(j) for which the address is being generated, is transferred to the register 254.

The operations performed in connection with generating addresses for a remote operation are similar to the operations described above in connection with memory stride addressing for a load or store operation. If the remote operation only requires one memory access the address will correspond to the address identified by the LAT ADRS signals loaded in the register 260. If the access requires multiple storage locations, a stride value representing the address increment for each successive storage location is provided to adder 262 and used in generating the incremented address as described above.

It will be appreciated that, in both memory stride addressing and indirect addressing, the operations in connection with the elements upstream of and including the registers 265A and 265B, in generating addresses for a next storage location in memory banks 24(i)(j), may occur generally contemporaneous with the operations in connection with the elements downstream of the registers in providing addresses and control signals to the respective memory bank 24(i)(j). That is, while the comparator 271j is controlling the "j" MISS PAGE signal (index "j" referencing "A" or "B" respectively) with respect to a current address, and while the memory control signal generator 251 is enabling the current address to be latched in the respective register 270j and the multiplexer 272j is being controlled to couple the signals from the respective register 270j as the "j" ADRS signals, along with controlling the respective "j" RAS, "j" CAS and "j" WE signals for the memory bank 24(i)(j):

(A) if an auxiliary processing instruction has enabled memory stride addressing, the memory control signal generator may control the multiplexers 261, 263, 266, 273 and 274 as described above to provide LAT BASE and LAT INDIR/STR signals to, in turn, enable the adder 262 to generate the INC ADRS incremented address signals comprising the address for the next location, and further control the appropriate LAT NEW "j" ADRS signal to enable the INC ADRS incremented address signals to be latched in the corresponding register 265j, or (B) is an auxiliary processing instruction has enabled indirect addressing, the control interface may control the indirect address register identifier generator 65 to identify the register in register file 34 to provide the indirect offset value and the register file to transfer the offset value for storage in the register 254, and the memory control signal generator 251 may thereafter control the multiplexers 261, 263, 266, 273 and 274 as described above to provide LAT BASE and LAT INDIR/STR signals to, in turn, enable the adder 262 to generate the INC ADRS incremented address signals comprising the address for the next location, and further control the appropriate LAT NEW "j" ADRS signal to enable the INC ADRS incremented address signals to be latched in the corresponding register 265j.

Accordingly, the address generator 250 can generate storage location addresses for successive accesses of memory banks 24(i)(j) in an overlapped or contemporaneous fashion.

C. Data Processor 32

Figure 5:
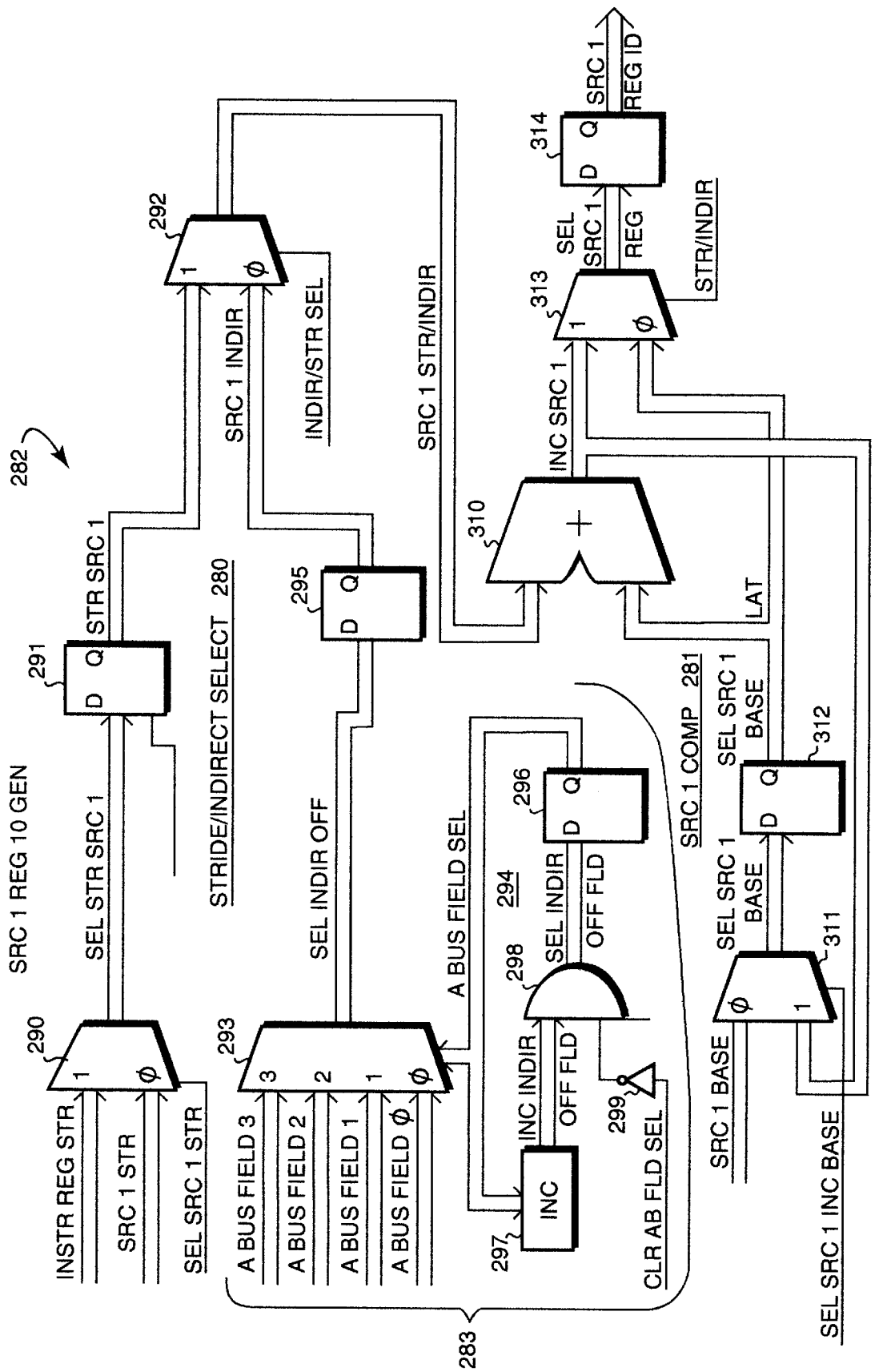
Figure 6:
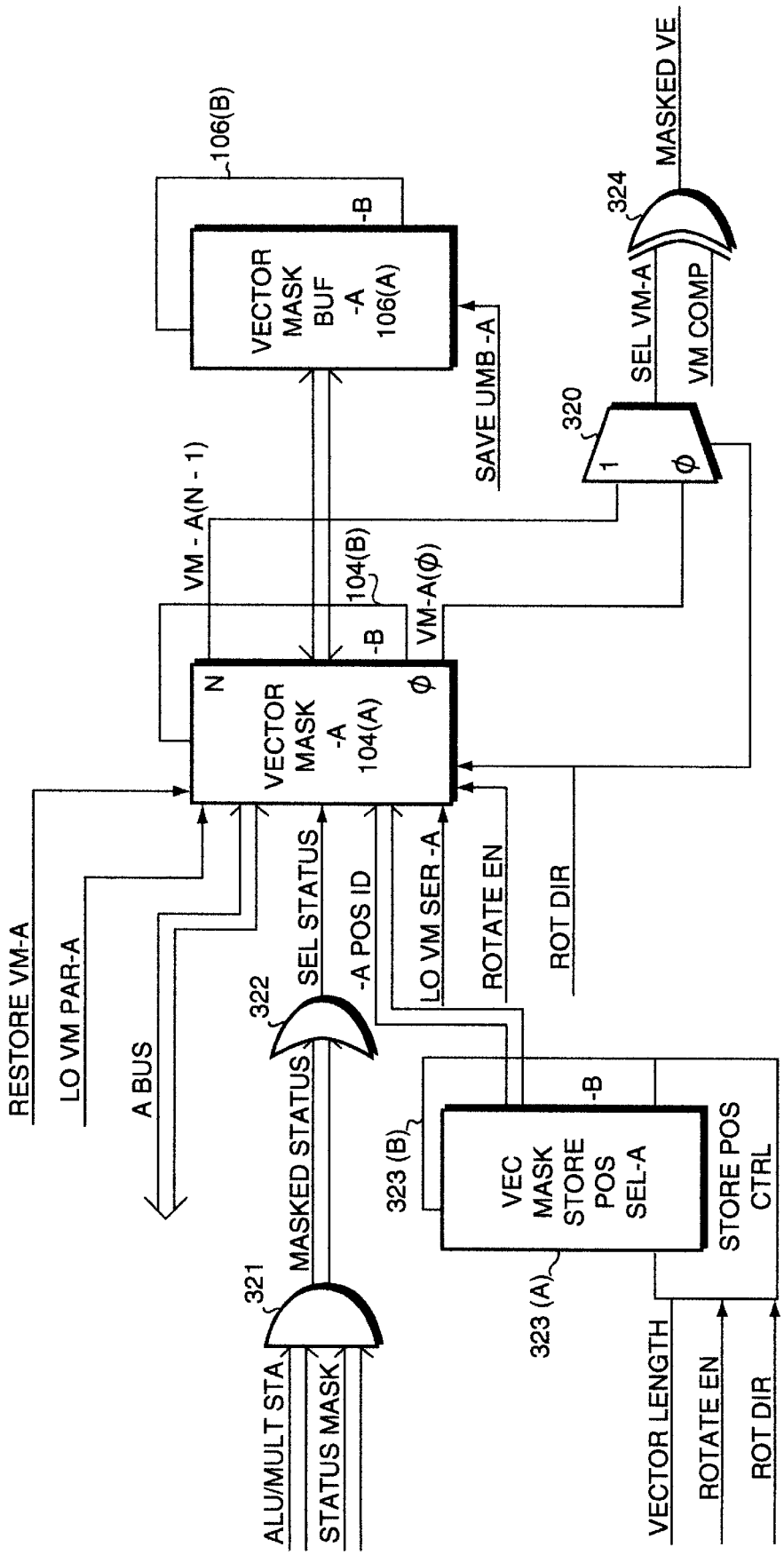

Details of various components of the data processor 32 will be described in connection with FIGS. 5 and 6. In one embodiment, the register file 34 and ALU and multiplier circuit 66 comprises a conventional register file and floating point numerical processing circuit available from Texas Instruments, Inc., and will not be described in detail herein. FIG. 5 depicts details of the source 1 register identifier generator 62, which generates SRC 1 REG ID source 1 register identifier signals for identifying the register in register file 34 whose contents are transmitted through the SRC 1 DATA port of the register file 34. The circuits of the load/store, source 2, destination, and indirect address register identifier generators 61 and 63 through 65, are all generally similar to each other, and are similar to a portion of the source 1 register identifier generator 62, and will not be separately depicted or described in detail. Finally, FIG. 6 depicts the details of context logic 67.

1. Source 1 Register Identifier Generator 62

FIG. 5 depicts a detailed block diagram of the source 1 register identifier generator 62 used in one embodiment of the data processor 32. The source 1 register identifier generator generates SRC 1 REG ID source 1 register identifier signals which identify registers in register file 34 whose contents are to be transferred to the ALU and multiplexer circuit 66 through the SRC 1 DATA source 1 data terminal of register file 34. In particular, the SRC 1 REG ID signals comprise the low-order signals which identify a register within a register portion of register file 34, and the portion identifier is provided by the BANK signal in the token for a vector element contained in the register identified by the source 1 register identifier generator 62.

During processing of an auxiliary processing instruction in which operands are in the form of a series of vector elements, the source 1 register identifier generator 62 generates the SRC 1 REG ID source 1 register identifier signals using a plurality of diverse addressing modes, including a register stride mode and a register indirect mode, both of which are similar to the memory stride and memory indirect modes described above in connection with the memory interface 31 and memory address generator 250. In register stride mode, the source 1 register identifier for the first vector element corresponds to a base value provided in field 140 of the auxiliary processing instruction (FIG. 2C). For each vector element after the first, the source 1 register identifier generator 62 increments the source 1 register identifier by a register stride value stored in the source 1 stride register 103 (FIG. 2C) or by the register stride value in field 171 (FIG. 2C) in an auxiliary processing instruction of the CSR) control instruction format 125.

In register indirect mode, for each vector element the source 1 register identifier generator 62 generates a register identifier in response to the sum of a base value and an offset value. The base value is the same for each element, but the offset values may differ. As in the register stride mode, the base value is provided by the field 140 of the auxiliary processing instruction (FIG. 2C). The offset values, on the other hand, are provided by one or more registers in register file 34, which are identified by the indirect address register identifier generator 65. In one particular embodiment, the offset values for a series of vector elements may be stored in successive fields of one register.

Alternatively, if the auxiliary processing instruction is a scalar instruction, the source 1 register identifier generator generates the SRC 1 REG ID signals corresponding to the base value provided in field 140 of the auxiliary processing instruction.

With reference to FIG. 5, the source 1 register identifier generator 62 includes a stride/indirect select portion 280 and a source 1 computation portion 281. The stride/indirect select portion 280 selects a stride value or an indirect offset value, in particular selecting for the indirect offset value a field of the register selected to provide indirect offset values. In one particular embodiment, one register of the register file 34 has sufficient capacity to provide offset values for four successive vector elements, and if a vector has more elements the offset values will be in successive registers in register file 34. The stride/indirect select portion 280 includes a stride source select circuit 282 and an indirect offset value select circuit 283, which select a respective stride or offset value from one of several sources, and a selection circuit 284 which selects one of the selected stride and offset values for coupling to the source 1 computation portion 281. The source 1 computation portion 281 computes the SRC 1 REG ID source 1 register identifier in response to the selected stride or offset value and the base value.

The stride source select circuit 282 selects a stride value from one of a plurality of sources, including the register stride field 171 and the register 103 (FIG. 2C), in response to a predetermined value in the miscellaneous address control field 172 of an auxiliary processing instruction of the CSR control format 125. In particular, the stride source select circuit 282 includes a multiplexer 290 which receives INSTR REG STR instruction register stride signals from the control interface 30 representing the contents of the register stride field 171, and SRC 1 STR source 1 stride signals representing the contents of source 1 stride register 103 (FIG. 2C). If the value in the miscellaneous address control field 172 identifies the register stride mode, an SEL SRC 1 STR selected source 1 stride signal selectively enables the multiplexer 290 to couple one of the INSTR REG STR or the SRC 1 STR signals to a register 291 as the SEL STR SRC 1 selected stride source 1 signals. The SEL SRC 1 STR select source 1 stride signal, in turn is conditioned in response to the value of the miscellaneous address control field 172. The register 291 latches the SEL STR SRC 1 signal and transmits in response STR SRC1 stride source 1 signals to one input terminal of a multiplexer 292.

Similarly, the indirect offset value select circuit 283 selects an indirect offset value representing the contents of various fields of signals ABUS FIELD 0 through ABUS FIELD 3 on the A bus 35, with the particular field being selected in response to A BUS FIELD SEL field election signals from an A bus field selection circuit 294. For providing successive indirect offset values for successive vector elements to be processed in connection with an auxiliary processing instruction, the A bus field selection circuit 294 generates ABUS FIELD SEL field selection signals to successively enable the multiplexer 293 to couple successive ones of the ABUS FIELD 0 through ABUS FIELD 3 signals as SEL INDIR OFF selected indirect offset signals for storage in a register 295. The register 295, in turn, couples the stored signals as SRC 1 INDIR source 1 indirect signals to another input terminal of multiplexer 292.

The A bus field selection circuit 294 includes a register 296, which provides the ABUS FIELD SEL field selection signals, an incrementation circuit 297, a gated driver 298 and an inverter 299. Prior to the indirect offset value circuit 283 selecting the indirect offset value for the first vector element, the control interface 30 enables the A bus field selection circuit 294 to be reset. In the reset operation, the control interface 30 asserts a CLR AB FIELD SEL clear A bus field select signal, which is complemented by the inverter 299 to disable the gated driver 298. The SEL INDIR OFF FLD selected indirect offset field signals generated by the gated driver 298 at that point will represent a zero value. The control interface then enables the register 296 to latch the SEL INDIR OFF FLD signals, and couple them to the multiplexer 293 as the A BUS FIELD SEL signals. At this point, the A BUS FIELD SEL signals will represent the value zero, and so the multiplexer 293 will couple the ABUS FIELD 0 signal as the SEL INDIR OFF selected indirect offset signals to the register 295 for storage. The register 295 then transmits SRC 1 INDIR source 1 indirect signals representing the value corresponding to that of the ABUS FIELD 0 signals to multiplexer 292.

The A BUS FIELD SEL signals are also coupled to the incrementation circuit 297, which generates INC INDIR OFF FLD incremented indirect offset field signals representing a value one higher than the value represented by the A BUS FIELD SEL signals. At this point, the control interface will maintain the CLR AB FLD SEL signal in a negated state, which is complemented by the inverter 299 to enable the gated driver to couple the INC INDIR OFF FLD signals to the register 296 as the SEL INDIR OFF FLD signals. When the multiplexer 293 is to provide an offset value from the next field of the A bus 35, the control interface 30 enables the register 296 to latch the SEL INDIR OFF FLD selected indirect offset field signals from the gated driver 298. The register 296 will transmit the stored signals as A BUS FIELD SEL signals which, at this point, enable the multiplexer 293 to couple the ABUS FIELD 1 signals from A bus 35 SEL IND register 295 as SEL INDIR OFF signals. The control interface 30 may thereafter enable the register 295 to latch the SEL INDIR OFF signals and transmit SRC 1 INDIR source 1 indirect signals corresponding thereto to the multiplexer 292 to provide the offset value for the next vector element. The control interface 30 may control the A bus field selection circuit 294 to iteratively enable these operations to be repeated until after it has enabled the multiplexer 293 to couple the ABUS FIELD 3 signals to its output terminal as the SEL INDIR OFF selected indirect offset signals, at which point the control interface may assert the CLR AB FLD SEL clear A bus field select signal to reset the A bus field selection circuit 294 so that it will enable the multiplexer 293 to again couple the ABUS FIELD 0 signals to its output terminal for the next vector element, or alternatively the incrementation circuit 297 may increment the value represented by the A BUS FIELD SEL signals modulo the value four, so that when the A BUS FIELD SEL signals represent the value three, the incrementation circuit 297 will generate INC INDIR OFF FLD increment indirect offset field signals representing the value zero.

As noted above, the multiplexer 292 in the stride/indirect select portion 280 receives the STR SRC 1 stride source 1 signal from the stride value select circuit 282 and the SRC 1 INDIR source 1 indirect signal from the indirect value circuit 283 and couples one of them, as selected in response to INDIR/STR SEL indirect/stride select signal, to the source 1 computation portion 281 as SRC 1 STR/INDIR source 1 stride/indirect signals. The control interface 30 will control the INDIR/STR SEL signal depending on the particular one of the modes which is enabled.

The source 1 computation portion 281 receives the SRC 1 STR/INDIR source 1 stride/indirect signals from the stride/indirect selection portion in one input terminal of an adder 310. The adder 310 receives at its second input terminal SEL SRC 1 BASE LAT selected source 1 base latched signals representing a base value from a multiplexer 311 and a register 312, and generates INC SRC 1 incremented source 1 signals representing the sum of the values represented by the SRC 1 STR/INDIR and SEL SRC1 BASE LAT signals. The multiplexer 311, under control of an SEL SRC 1 INC BASE selected source 1 increment base signal from the control interface 30, selectively couples either SRC 1 BASE signals, which are derived from the contents of the source 1 register field 140 of the auxiliary processing instruction, or the INC SRC 1 signals from the output of adder 310 as SEL SRC 1 BASE selected source 1 base signals to a register 312 for storage. The INC SRC 1 incremented source 1 output signal from the adder 310 and the SEL SRC 1 BASE LAT selected source 1 base latched signals from the register 312 are directed to respective input terminals of a multiplexer 313, which under control of a STR/INDIR stride/indirect signal from control interface 30 selectively couples one of these as SEL SRC 1 REG selected source 1 register signals to a register 314. The register 314 latches the SEL SRC 1 REG signals and transmits them as the SRC 1 REG ID source 1 register identifier signals.

If the auxiliary processing instruction enables the register stride mode, the control interface 30 maintains the INDIR/STR SEL indirect/strobe select signal asserted and the STR/INDIR stride/indirect signal negated. The assertion of the INDIR/STR SEL signal enables the multiplexer 292 to couple the STR SRC 1 stride source 1 signals to the adder 310 as the SRC 1 STR/INDIR source 1 stride/indirect signals. For the first vector element, the control interface 30 also negates the SEL SRC 1 BASE select source 1 incremented base signal to enable the multiplexer 311 to couple the SRC 1 BASE signals for storage in the register 312. Since the control interface 30 is maintaining the STR/INDIR stride/indirect signal in a negated state, the multiplexer couples the SEL SRC 1 BASE LAT signals from register 312 as the SEL SRC 1 REG selected source 1 register signals to register 314. Thus, the SRC 1 REG ID source 1 register identifier signals, which correspond to the SEL SRC 1 BASE LAT selected source 1 base latched signals from the register 312, at this point will identify the register identified by the SRC 1 BASE signals from the auxiliary processing instruction.

The SEL SRC 1 BASE LAT selected source 1 base latched signals are also coupled to the adder 310, which generates INC SRC 1 incremented source 1 signals which correspond to a value represented by the SEL SRC 1 BASE LAT signals, incremented by the stride value as represented by the SRC 1 STR/INDIR source 1 stride/indirect signals from stride/indirect select portion 280. The INC SRC 1 signals thus correspond to a value which identifies the register in register file 34 which contains the second vector element. At this point, the control interface 30 asserts the SEL SRC 1 INC BASE select source 1 incremented base signal, which enables the multiplexer 311 to, in turn, couple the INC SRC 1 signal as the SEL SRC 1 BASE selected source 1 base signal to register 312. The control interface 30 then enables the register 312 to latch the SEL SRC 1 BASE signals and transmit them to multiplexer 313 as the SEL SRC 1 BASE LAT signals. Since the control interface 30 is also maintaining the STR/INDIR stride/indirect signal in a negated condition, the multiplexer 313 couples the SEL SRC 1 BASE LAT signals to the register 314 as the SEL SRC 1 REG selected source 1 register signal. When it comes time for the source 1 register identifier generator 62 to couple a register identifier for the second vector element, the control interface 30 will enable the register 314 to store the SEL SRC 1 REG signals, and transmit them as the SRC 1 REG ID source 1 register identifier signals. The control interface 30 will enable these operations to be repeated for each of the subsequent vector elements to be processed pursuant to the auxiliary processing instruction. It will be appreciated that, for each vector element, the source 1 computation portion 281 will generate SRC 1 REG ID signals representing a value corresponding to the value generated for the previous vector element incremented by the stride value.

If, conversely, the auxiliary processing instruction enables the register offset mode, the control interface 30 will maintain the INDIR/STR SEL indirect/stride select signal negated to enable the multiplexer 292 to couple the SRC 1 INDIR source 1 indirect signal, representing the indirect offset value, from indirect value circuit 283 as the SRC 1 STR/INDIR source 1 stride/indirect signal to the adder 310. In addition, the control interface 30 will maintain the SEL SRC 1 INC BASE signal negated and the STR/INDIR strobe/indirect signal asserted. The negation of SEL SRC 1 INC BASE signal enables the multiplexer 311 to couple the SRC 1 BASE source 1 base signal, representing the base register identification value, as the SEL SRC 1 BASE selected source 1 base signal for storage in register 312. When the SEL SRC 1 BASE signals are stored in the register 312, the register transmits the SEL SRC 1 BASE signals as SEL SRC 1 BASE LAT selected source 1 base latched signals, which are directed to the second input terminal of adder 310. The adder 310 generates INC SRC 1 incremented source 1 signals which represent a value corresponding to the sum of the base register identification value and the indirect offset value. The asserted STR/INDIR stride/indirect signal enables the multiplexer 313 to couple the INC SRC 1 incremented source 1 signals as the SEL SRC 1 REG selected source 1 register signal for storage in the register 314. When the control interface 30 enables the register 314 to latch the SEL SRC 1 REG signals, it will transmit SRC 1 REG ID signals corresponding to this value.

For each vector element to be processed pursuant to an auxiliary processing instruction enabling the register indirect mode, the source 1 register identifier generator 62 repeats the above-described operations. Accordingly, the registers in register file 34 identified by the source 1 register identifier generator 62 will be those identified by the base register identifier represented by the SRC 1 BASE signals, as incremented by an amount corresponding to the particular indirect offset value provided by the indirect value circuit 283 for each vector element.

2. Load/Store, Source 2, Destination, and Indirect Address Register Identifier Generators The circuits for the load/store, source 2, destination and indirect address register identifier generators 61 and 63 through 65 are similar to the circuit for the source 1 register identifier generator 62 described above in connection with FIG. 5, except that they do not have circuits corresponding to the indirect value circuit 283 or the multiplexer 292, and instead the stride value signals from their respective stride value select circuits are connected directly to the input terminals of their respective adders corresponding to adder 310. In addition, the register identifier generators 61 and 63 through 65 do not include elements corresponding to multiplexer 313 or register 314; instead, the output signals from the register corresponding to register 312 in each register identifier generator comprises the particular register identifier signals that are transmitted to register file 34.

3. Context Logic

FIG. 6 depicts the details of context logic 67. With reference to FIG. 6, the context logic includes the vector mask register 104, vector mask mode register, vector mask buffer register 106, and the vector mask direction register 107. In particular, the context logic 67 includes separate vector mask registers 104(A) and 104(B) [generally identified by reference numeral 104(j), with index "j" referencing "A" or "B"] each of which is associated with a separate vector mask buffer register 106(A) and 106(B) [generally identified by reference numeral 106(j)]. As described above, the register file 34 is divided into two register banks, each of which loads data from a memory bank 24(i)(j), and from which data is stored to a memory bank 24(i)(j), having the same index "j." Each vector register 104(j) and each vector mask register 106(j) is used in connection with auxiliary processing instructions involving operands from the correspondingly-indexed register bank 34(j).

Each vector mask register 104(j) is essentially a bidirectional shift register having a number of stages corresponding to a predetermined maximum number "N" of vector elements, for each register bank 34(j), that the auxiliary processor 21(i) can process in response to an auxiliary processing instruction. Each vector mask register 104(j) stores a vector mask that determines, if the auxiliary processing instruction calls for processing series of operands as vectors, whether, for each successive vector element or corresponding ones of the vector elements, the operations to be performed will be performed for particular vector elements. The node processor 21(i), prior to providing an auxiliary processing instruction, enable a vector mask to be loaded into the vector mask register by initiating a remote operation identifying one or more of the vector mask registers 104(j) and providing the vector mask as P DATA processor data signals (FIG. 2A), or by enabling the contents of a register in register file 34 or the vector mask buffer register 106(j) to be copied into the vector mask register 104(j). The control interface 30 will latch the P DATA processor data signals in the data register 41, couple them onto A bus 35, and will assert a LD VM PAR -"j" load vector mask parallel bank "j" signal to enable the vector mask register 104(j) to latch the signals on the A bus 35 representing the vector mask.

Each vector mask register 104(j) generates at its low-order stage a VM-j(0) signal and at its high-order stage a VM-j(N-1) signal (index "j" corresponding to "A" or "B"), one of which will be used to condition, for the corresponding vector element, the load/store operation if the L/S mode flag 105(B) in vector mask mode register 105 is set, and processing by the ALU and multiplier circuit 66 of operands from the register file 34 if the mode flag 105(A) is set. Each vector mask register 104(j) can shift its contents in a direction determined by a ROT DIR rotation direction signal corresponding to the condition of the vector mask direction flag in register 107. Each vector mask register 104(j) shifts in response to a ROTATE EN rotate enable signal from the control interface 30, which asserts the signal as each successive vector element is processed so that the VM-A(0) or VM-A(N-1) signal is provided corresponding to the bit of the vector mask appropriate to the vector element being processed. The VM-A(0) and VM-A(N-1) signals are coupled to a multiplexer 320 which selectively couples one of them in response to the ROT DIR signal as a SEL VM-A selected vector mask (bank "A") signal. The SEL VM-A signal is coupled to one input terminal of an exclusive-OR gate 324, which under control of a VM COMP vector mask complement signal from the vector mask complement field 164 (FIG. 2C) of an auxiliary processing instruction of the CSR control format 125, generates a MASKED VE masked vector element signal. It will be appreciated that, if the VM COMP signal is negated, the MASKED VE signal will have the same asserted or negated condition as the SEL VM-A signal, but if the VM COMP signal is asserted the exclusive-OR gate 324 will generate the MASKED VE signal as the complement of the SEL VM-A signal. In either case, the MASKED VE signal will control the conditioning of the FUNC/NOP SEL function/no-operation select signal and the DEST WRT COND destination write condition signal by the context logic 67 (FIG. 2B), as well as the generation of the 'j' WE write enable signal by the memory control signal generator 251 (FIG. 4) to control storage in memory banks 24(i)(j) in connection with the corresponding vector element.

During processing of vector elements by the ALU and multiplier circuit 66, the circuit 66 generates conventional ALU/MULT STATUS status signals indicating selected information concerning the results of processing, such as whether an overflow or underflow occurred, whether the result was zero, whether a carry was generated, and the like. The context logic 67 uses such status information to generate a status bit that is stored in the vector mask register 104(j) so that, when the contents of the register 104(j) have been fully rotated, the bit will be in the stage corresponding to the vector element for which the status information was generated. That is, if the status bit was generated during processing of operands comprising a vector element "k," the context logic 67 will enable the status bit to be stored in a stage of the vector mask register 104(j) so that, after all of the vector elements have been processed, the status bit will be in stage "k" of the vector mask 104(j). Accordingly, the status bit can be used to control processing of the "k"-th elements of one or more vectors in response to a subsequent auxiliary processing instruction; this may be useful in, for example, processing of exceptions indicated by the generated status information.

To generate the status bit for storage in the vector mask register 104(j), the context logic 67 includes an AND circuit 321 that receives the ALU/MULT STATUS status signals from the ALU and multiplier circuit 66 and STATUS MASK signals from register 110 (FIG. 2C). The AND circuit 321 generates a plurality of MASKED STATUS signals, whose asserted or negated condition corresponds to the logical AND of one of the ALU/MULT STATUS signal and an associated one of the STATUS MASK signals. The MASKED STATUS signals are directed to an OR gate 322, which asserts a SEL STATUS selected status signal if any of the MASKED STATUS signal is coupled tried. The SEL STATUS signal is coupled to the vector mask register 104(j) and provides the status bit that is loaded into the appropriate stage of the vector mask register 104(j) as described above. The particular stage of the vector mask register 104(j) into which the bit is loaded is determined by a vector mask store position select circuit 323(j) (index "j" corresponding to "A" or "B") which, under control of VECTOR LENGTH signals from the vector length register 101 (FIG. 2C), and the ROTATE EN rotate enable and ROT DIR rotate direction signals from the control interface 30, generates -"j" POS ID position identification signals to selectively direct the SEL STATUS signal for storage in a particular stage of the correspondingly-indexed vector mask register 104(j). The vector mask register 104(j) stores the bit in the stage identified by the -"j" POS ID position identification signals in response to the assertion of a LD VM SER -"j" load vector mask serial bank "j" signal by the control interface 30. The control interface 30 asserts the LD VM SER -"j" signal to enable the vector mask register 104(j) to store the status bit for each vector element when the SEL STATUS signal representing the status bit appropriate for the particular vector element has been generated.

It will be appreciated that the vector mask store position select circuit will, for a particular vector length and rotation direction, enable the vector mask register 104(j) to latch the SEL STATUS selected status signal in the same stage. The particular stage that is selected will be determined only by the vector length and rotation direction, as indicated by the VECTOR LENGTH and ROT DIR signals, respectively.

The vector mask buffer registers 106(A) and 106(B) are used to buffer the vector mask in the correspondingly-indexed vector mask register 104(A) and 104(B). For example, the node processor 20 may load a vector mask into a vector mask register 104(j) of an auxiliary processor 21(i), enable the auxiliary processor 21(i) to buffer the vector mask to the vector mask buffer 106(j), and thereafter issue an auxiliary processing instruction to initiate processing of operands in the form of vectors using the vector mask in the vector mask register 104(j). While executing the auxiliary processing instruction, the ALU and multiplier circuit 66 generates status information which is used to create a vector mask in vector mask register 104(i) as described above. The node processor may then enable the auxiliary processor to use the newly-created vector mask in connection with, for example, processing of exception conditions as indicated by the bits of that vector mask. Thereafter, the node processor 20 may enable the auxiliary processor to restore the original vector mask, currently in the vector mask buffer 106(j) to the vector mask 104(j) for subsequent processing. To accomplish this, each vector mask register 104(j) and the correspondingly-indexed vector mask buffer register 106(j) are interconnected so as to permit the contents of each to be loaded into the other. When enabled by the node processor 20 to buffer a vector mask in a vector mask register 104(j), the control interface 30 asserts a SAVE VMB-"j" vector mask buffer save signal (index "j" corresponding to "A" or "B") which enables the contents of the correspondingly-indexed vector mask register 104(j) to be saved in the vector mask buffer register 106(j). Similarly, when enabled by the node processor 20 to restore a vector mask from a vector mask buffer register 106(j), the control interface 30 asserts a RESTORE VMB-"j" vector mask restore signal (index "j" corresponding to "A" or "B") which enables the contents of the correspondingly-indexed vector mask buffer register 106(j) to be loaded into the vector mask register 104(j).

III. Detailed Description Of Operation

Figure 7A:
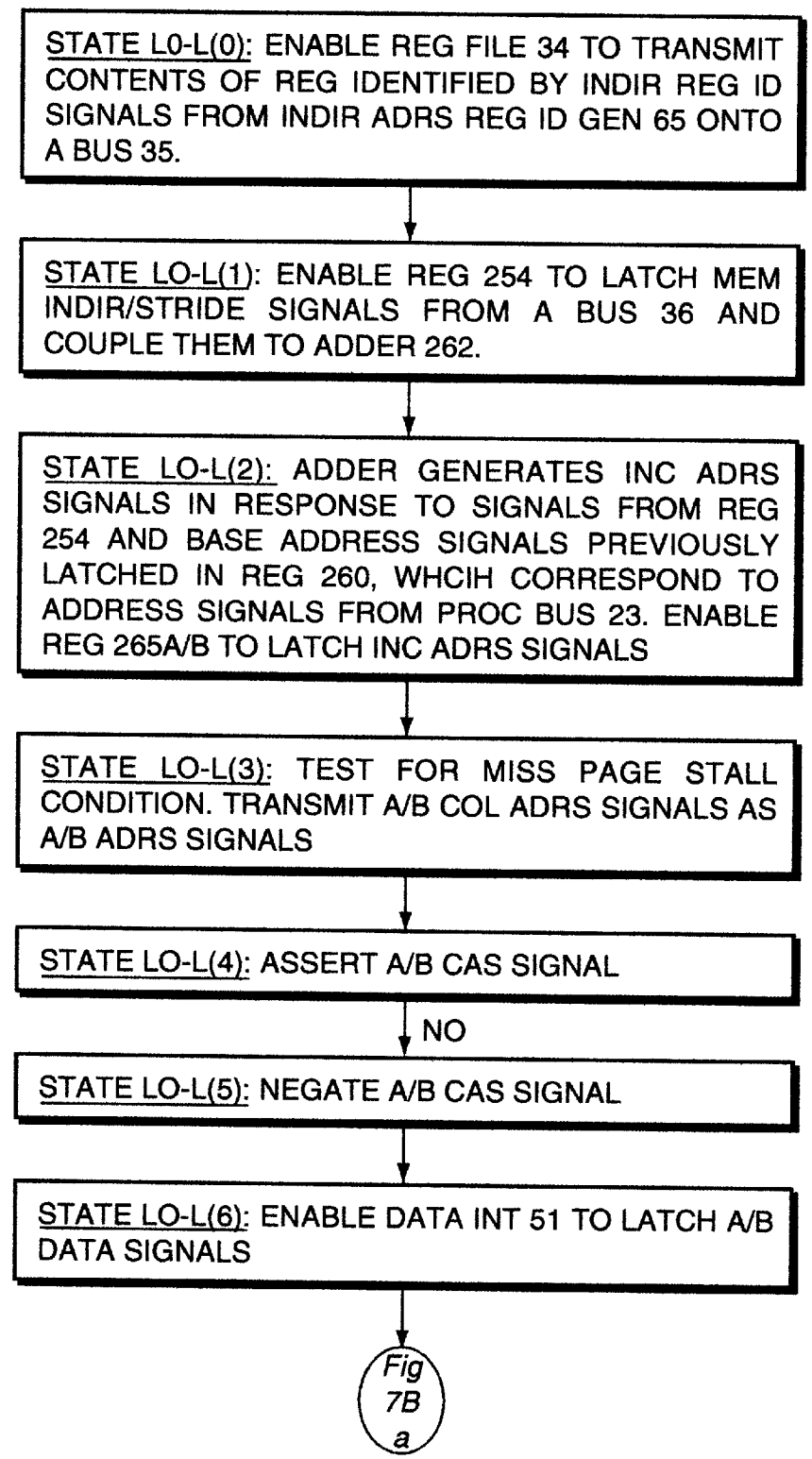
Figure 8B:
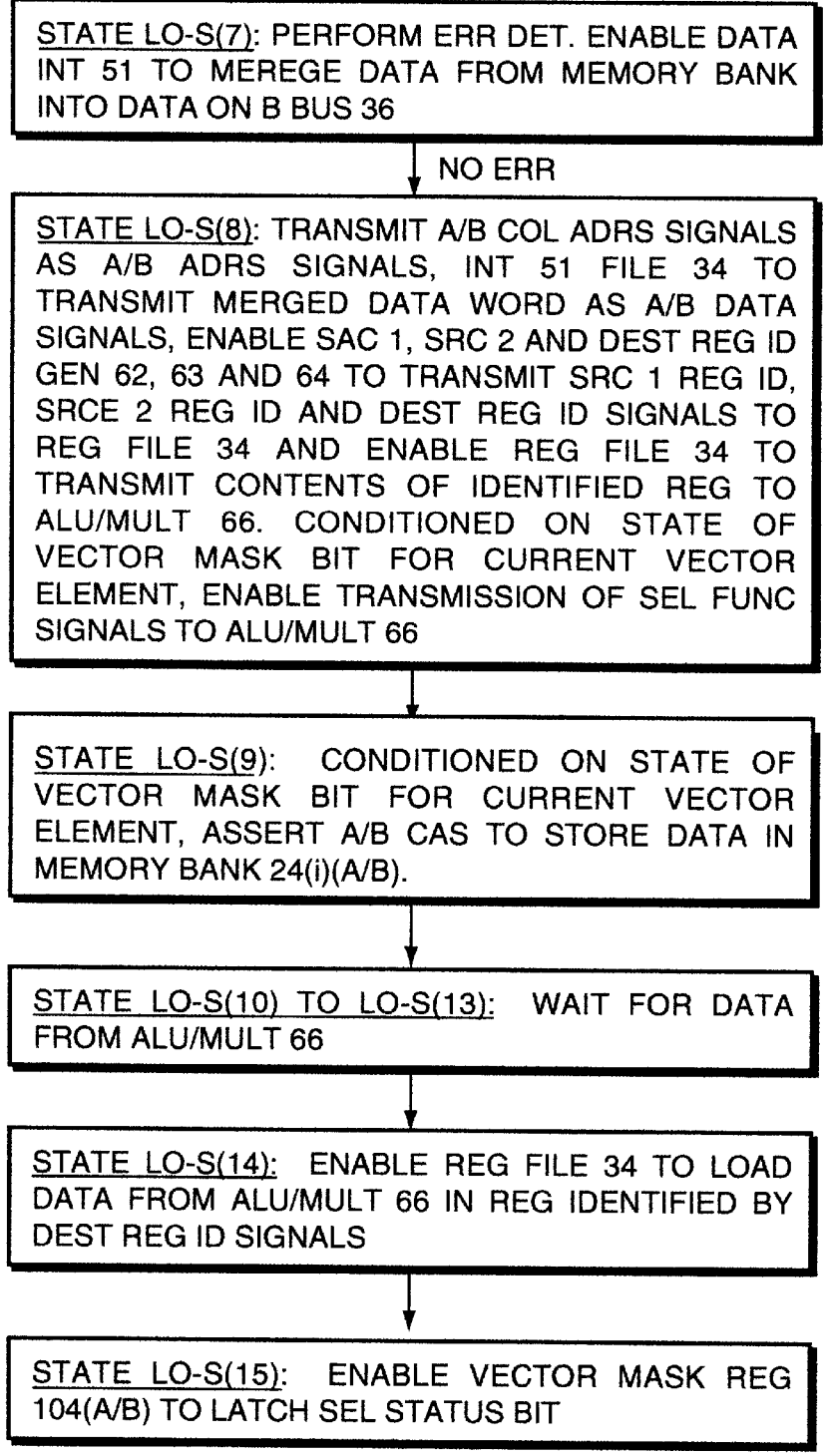
Figure 9:
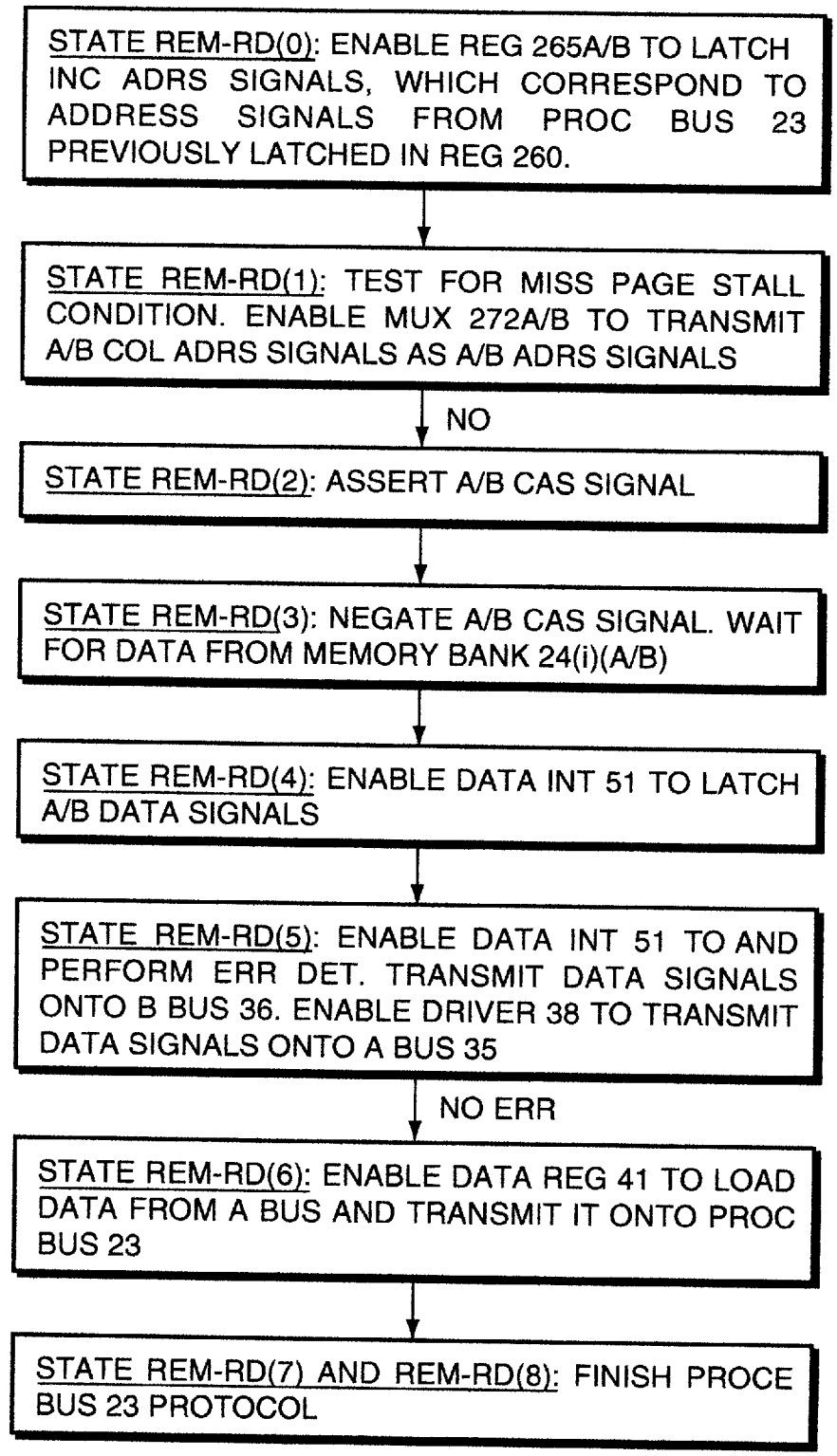
Figure 10A:
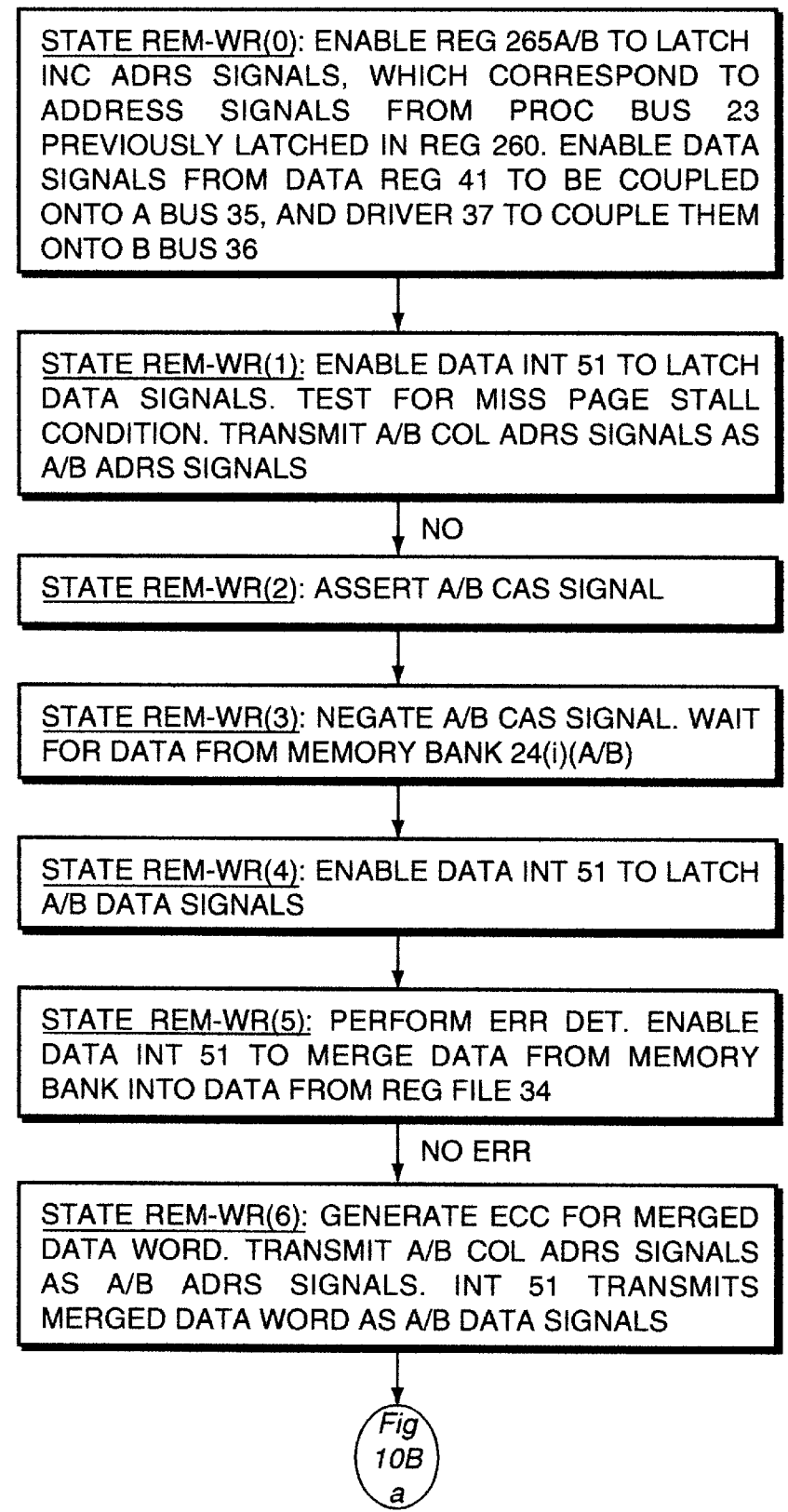
Figure 10B:
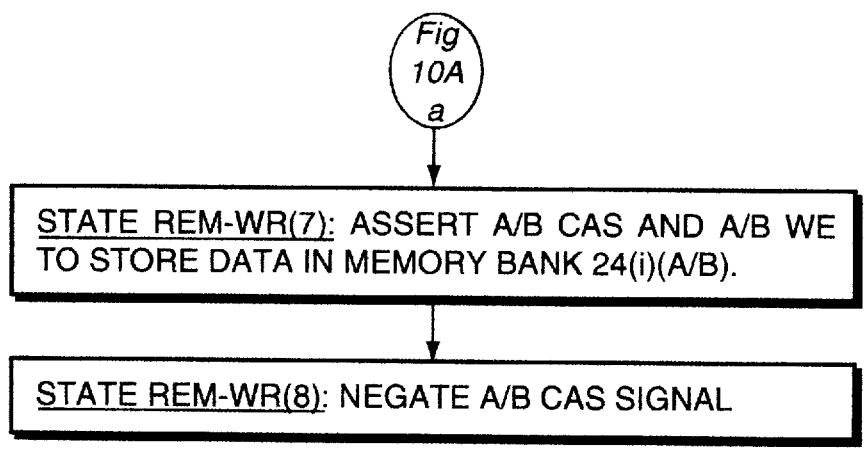

FIGS. 7A through 10B comprise flowcharts which detail operations which occur in response to the progression of a token through successive stages of the local strand 45 (FIGS. 7A through 8B) and the remote strand 44 (FIGS. 9 through 10B). FIGS. 7A and 7B detail operations which occur during a local operation in which the load/store operation is a load, while FIGS. 8A and 8B detail operations which occur during a local operation in which the load/store operation is a store. FIG. 9 details operations which occur during a remote operation comprising a read of data from storage locations of a memory bank 24(i)(j), while FIGS. 9A and 9B detail operations which occur during a remote operation comprising a write of data to storage locations of a memory bank 24(i)(j). Each paragraph on the FIGS. 7A through 10B is identified by "STATE" and a state identifier. For FIGS. 7A through 8B, the state identifier includes a prefix "LO" to identify a local operation. For FIGS. 7A and 7B, the state identifier includes a suffix "L(i)" ("i" is an integer from zero to sixteen), where "L" identifies a load, and index "i" identifies the state. Similarly, for FIGS. 8A and 8B, the state identifier includes a suffix "S(i)" ("i" is an integer from zero to sixteen), where "S" identities a store and index "i" identifies the state. For FIGS. 9 through 10B, the state identifier includes a prefix "REM" to identify a remote operation. For FIG. 9, the state identifier includes a suffix "RD(i)" ("i" is an integer from zero to eight) where "RD" identifies a read operation and index "i" identifies the state. Similarly, for FIGS. 10A and 10B, the state identifier includes a suffix "WR(i)" ("i" is an integer from zero to eight), where "WR" identifies a write operation and index "i" identifies the state.

Each of states REM-RD(0) through REM-RD(8) depicted on FIG. 9, and each of states REM-WR(0) through REM-WR(8) depicted on FIGS. 10A and 10B, is associated with a correspondingly-indexed one of the stages 44(i) of the remote strand 44 (see FIGS. 2A and 3A). Similarly, each of the first eleven states LO-L(0) through LO-L(10) depicted on FIGS. 7A and 7B, and each of the states LO-S(0) through LO-S(10) depicted on FIGS. 8A and 8B, is associated with a correspondingly-indexed one of the stages 45(i) of the local strand 45. The operations for the remaining states of the local operation are controlled by similar timing and control circuits (not shown) of the data processor 32.

The flowcharts are generally self-explanatory and will not be described in detail. Generally with respect to the local operation with a load, as depicted in FIGS. 7A and 7B, the load operation occurs in connection with states LO-L(0) through LO-L(9), and the ALU operation occurs in connection with states LO-L(10) through LO-L(16). Since the load operation takes place before the ALU operation, the data loaded during the load operation can be used in the ALU operation, if the register identified by the L/S REG ID load/store register identifier signals are the same as one of the source or destination registers. Accordingly, the same token in the local strand 45 can be used for both a load operation for a vector element and an ALU operation involving the same vector element. On the other hand, with respect to a local operation with a store, as depicted in FIGS. 8A and 8B, the store operation, which takes place in connection with states LO-S(0) through LO-S(10), precedes the ALU operation, which occurs in connection with states LO-S(10) through LO-S(16), and so the stored data will not be the result of the ALU operation. Accordingly, the same token in the local strand 45 will not be used for both a store operation for a vector element and an ALU operation involving the same vector element.

In all of the flowcharts, it has been assumed that the memory interface 31 does not assert either the MISS PAGE STALL signal or the ECC STALL signal. If the memory interface 31 determines that a miss page stall condition exists, or if it detects an error in connection with the retrieved data, it will assert the corresponding stall signal as described above, and perform the operations to either enable the memory bank 24(i)(j) to retrieve the missing page or to correct the error independently of the operations depicted in FIGS. 7A through 8B.

In addition, in all of the flowcharts it has been assumed that the address generator 250 (FIG. 4) uses indirect addressing in connection with generating addresses for the memory banks 24(i)(j). The differences in operation at each state in connection with other forms of addressing will be readily apparent to those skilled in the art.

Further, it will be noted that, although FIGS. 8A and 8B depict the local operation with store as having an ALU operation after the store operation, since the two operations are independent (that is, they will not involve storage of a result of the ALU operation) they could take place concurrently. Alternatively, the store operation could take place after the ALU operation, in which case the result of the ALU operation could be used as the subject of the store operation. It will be appreciated, however, that providing that the auxiliary data processor 21(i) for a local operation in one embodiment performs the load or store operation during the same series of states, and the ALU operation during the same series of states, will simplify the circuitry required to control the local operations. It should be noted, in particular, that, for both a local operation with load (FIGS. 7A and 7B) and a local operation with store (FIGS. 8A and 8B), the memory interface 31 performs the test for a miss page stall condition in effectively the states [states LO-L(4) and LO-S(4)] with the same index "4," and would perform the test in response to a token being in the same stage 45(4) of the local strand 45. Similarly, the memory interface 31 performs the error detection test in the states [states LO-L(7) and LO-S(7)] with the same index "7," and thus would perform the test in response to a token being in the same stage 45(7) of the local strand 45. In both cases, it should be noted that a determination that a miss page stall condition exists [states LO-L(4) and LO-S(4)] or the detection of an error [states LO-L(7) and LO-S(7)].

With further note to the local operation, with a store operation, as depicted in FIGS. 8A and 8B, the sequence of operations depicted for the store operation [states LO-S(0) through LO-S(10)] are described as actually comprising two accesses of a memory bank 24(i)(j). In a first access, data is retrieved from a storage location in the memory bank 24(i)(j) [states LO-S(0) through LO-S(7)]. Thereafter, the memory interface 31 merges the data to be written into the retrieved data [state LO-S(8)], at which point it also generates an error correction code for the merged data. Thereafter, the memory interface 31 performs the second access [state LO-S(9)] in which it stores the merged data in the same storage location. This procedure enables the memory interface to generate an error correction code for the entire storage location. It will be appreciated that, if the auxiliary processor 21(i) is to store data for an entire storage location, it will not have to perform the operations of retrieving the storage location's current contents, performing the error detection operation, and the merging operation, and instead may perform the storage operations described in connection with state LO-S(9) during state LO-S(5). It will be appreciated that the auxiliary data processor 21(i) may skip the intermediate steps, and proceed directly to the ALU operation [depicted in states LO-S(10) through LO-S(16)]. Similar operations are performed in connection with a remote write operation (FIGS. 10A and 10B) if the data to be written will fill an entire storage location.

With this background, the scheduling performed by the control interface 30 in connection with inter-operational scheduling, as well as intra-operational (that is, inter-token) scheduling within a local and remote operation, will be generally described in connection with FIGS. 7A through 10B. It will be appreciated that, for inter-operational scheduling, there are four general patterns, namely;

(1) a local operation followed by a local operation;
(2) a local operation followed by a remote operation;
(3) a remote operation followed by a local operation; and
(4) a remote operation followed by a remote operation.

It will be appreciated that one purpose for scheduling is to facilitate overlapping of processing in connection with multiple operations, while at the same time limiting the complexity of the control circuitry required for the overlapping. The complexity of the control circuitry is limited by limiting the number of operations that can be overlapped in connection with the remote strand 44 or the local strand 45. In one particular embodiment, the scheduling limits the number of operations, that is, the number of local operations for which tokens can be in the local strand 45 or the number of remote operations for which tokens can be in the remote strand 44, to two. To accomplish that, the scheduler 200 ensures that there be a predetermined minimum spacing between the first tokens for each of the two successive operations which it dispatches into a strand 44 or 45 corresponding to one-half the number of states required for a local operation or a remote operation (FIGS. 7A through 10B). Thus, for a local operation, the scheduler 200 provides that there be a minimum spacing of eight from the first token of one local operation to the first token of the next local operation. Similarly, the scheduler 200 provides that there be a minimum spacing of four from the first token of one remote operation to the first token of the next remote operation. These spacings will be facilitated by suitable initialization values for the counter 210 of the local spacing control circuit 202 (FIG. 3A) for local operations, and the corresponding counter (not shown) of the remote spacing control circuit 203.

A further purpose for scheduling is to ensure that no conflict will arise in connection with the use of specific circuits in the auxiliary processor 21(i), after the dispatch of all of the tokens required for a first operation, from beginning the dispatch of tokens for a subsequent operation. Inter-token, intra-operation scheduling generally has a similar purpose. Conflicts may particularly arise in connection with use of the memory interface 31 in accessing of memory banks 24(i)(j) during a load, store, write or read operation, and also in connection with use of the bus system 33 in connection with transfer of information thereover at various points in a memory access. For example, for a store operation in which data for less than an entire storage location is stored (FIGS. 8A and 8B) as described above, requiring first a read [states LO-S(0) through LO-S(7)] followed by a merge [state LO-S(8)] and write operation [state LO-S(9)], it will be appreciated that the address generator 250 will be used for both the read and write operations for each vector element, and so the intra-operation inter-token spacing will be such as to accommodate the use of the address generator for the write operation.

In addition, for the ALU and multiplier circuit 66 (FIG. 2B) in one particular embodiment, the operations performed during the successive states are such that it will normally be able to begin a new operation for each token in the local strand 45 for tokens successively dispatched for each tick of the aforementioned global clocking signal. However, for some types of complex operations, the ALU and multiplier circuit 66 will require a spacing of several ticks, and the scheduler 200 will schedule the dispatch of the successive tokens within the series required for local operation accordingly.

It will be appreciated, therefore, that for local operations which do not include a load or a store operation, and for which the ALU and multiplier circuit 66 can initiate a new operation for tokens dispatched at each clock tick, the token generator 220 can generate successive tokens at successive ticks of the global clocking signal. In addition, the scheduler 200 can enable the token generator 220, after it has finished generating all tokens for such a local operation, enable it to begin generating tokens for a subsequent local operation, subject to the minimum spacing constraint between initial tokens for the operations as described above. Otherwise stated, the table 215 of the local spacing control circuit 202 (FIG. 3A) will provide a value to the comparator 213, which will enable the comparator 213 to assert the LO LAST-LO SP OK local last/local spacing ok signal immediately after the token generator 220 generates the last token for the first local operation, which signal enables the scheduler 200 to, in turn, enable the token generator 220 to begin generating tokens for the next local operation at the next clock tick.

On the other hand, if the successive local operations involve load or store operations, ignoring any spacing to accommodate the ALU and multiplier circuit 66, the required inter-operation spacing, will depend (1) on the sequence of load and store operations, and (2) if the first operation is a store operation, whether a store operation is of the entire storage location:

(A) If the first local operation involves a store operation of less than an entire storage location, and the second involves either a load operation or a store operation, the second operation will be delayed to accommodate the use of the address generator 250 (1) for both the read and write portions of the initial store operation of the first local operation and (2) for the early states of either a load operation or a store operation for the second local operation.

(B) If the first local operation involves a store operation of the entire storage location, and the second local operation involves either a load operation or a store operation of less than an entire storage location, it will be appreciated that the address generator 250 will be used only at the beginning of operations for each element of the first local operation, and so a small or zero delay thereafter will be required.

(C) If a local operation involving a load operation is followed by a local operation involving a store operation, the required spacing will also depend on whether the store operation involves an entire storage location. If the store operation does involve an entire storage location, it should be noted that, while the address generator 250 will be used in the same states for both the load operation and the store operation, the load/store register identifier generator 61 will be used late [in state LO-L(8)] in the load operation, but relatively early in the store operation. Accordingly, the local spacing control circuit 202 will enable a generally large spacing between the first local operation and the second local operation to ensure that the load/store register identifier generator 61 will not be used for the first vector element of the second local operation until the state after the generator 61 has been used for last vector element for the local operation's load operation. On the other hand, if the second local operation is a store involving data for less than an entire storage location, the load/store register identifier generator 61 will be used in connection with the store operation in state LO-S(7), which is closer to the state LO-L(8) in which the generator is used in connection with the load operation, and so the spacing provided by the local spacing control circuit 202 will substantially less. In either case, the table 215 will provide the necessary value to comparator 213 as described above.

(D) Finally, if two successive local operations both involve load operations, since the progression of operations through the successive states depicted in FIGS. 7A and 7B will be the same for both local operations, and the various circuits of the auxiliary processor 21(i) are not used in two diverse states, the first token for the second local operation may be dispatched immediately following the last token for the first local operation.

In all of these cases, the counter 215 will provide the comparator 213 with the required values to enable the necessary spacing. It will be appreciated that, if the computation operation required for the local operation is such that the ALU and multiplier circuit 66 will not accept a new operation at each tick of the global clock signal, the actual spacing will be the greater of the above-identified spacing to accommodate load and store operations and the spacing to accommodate the ALU and multiplier circuit 66.

The particular spacing enabled for other combinations of local and remote operations are determined in a generally similar manner and will not be described in detail. It will be appreciated, however, that the auxiliary processor 21(i) may initiate a remote operation, that is, the token generator 220 may begin generating tokens for the remote strand 44, before it has finished generating tokens for a local operation so that the auxiliary processor 21(i) will begin processing of the remote operation before it begins processing in connection with some of the vector elements of the prior local operation. This can occur, for example, if the local operation has no load or store operation, in which case the memory interface 31 will not be used during processing of the local operation.

IV. Summary

The auxiliary processor 21(i) provides a number of advantages. First, the auxiliary processor 21(i) operates both as a memory interface for the node processor 20 and as an auxiliary processor. Since it can be embodied in a single integrated circuit chip, it can reduce the amount of space required for a computer system, which can be advantageous particularly in, for example, a massively parallel computer. In addition, since each auxiliary processor 21(i) connects directly to the memory banks 24(i)(j), it will be able to retrieve the data to be processed directly from, and load the processed data directly into, the memory banks connected thereto, so that all of the auxiliary processors 21(i) on each processing node 11(i) will be able to perform these operations in parallel. Accordingly, no single connection point or bus, such as processor bus 23, will operate as a data transfer bottleneck to limit the data processing rate if a processing node 11(i) includes a plurality of auxiliary processors. Furthermore, since the auxiliary processors 21(i) overlap local operations and remote operations, the processing of the local operations by the auxiliary processors 21(i) will have a generally minimal effect on the processing by the node processors 20.

In addition, the auxiliary processor 21(i) is quite flexible. Since the vector mask in register 104 is used in connection with load/store operations as well as arithmetic operations, it can both (1) condition the retrieval of data from particular locations in the memory banks 24(i)(j) to be loaded into the register file 34 as vector elements when establishing a vector from, for example, diverse and widely-distributed storage locations in the memory banks 24(i)o), and (2) may also, after the vector is established, condition the particular elements of the vector which are processed by the ALU and multiplier circuit 66 in connection with arithmetic operations. This is particularly advantageous if the storage locations are specified using memory indirect addressing as described above, since the same set of registers in register file 34 may be used to provide offset values for diverse vectors, with the particular vector elements for each vector being specified by the conditions of the particular bits of the vector mask register 104.

In addition, since the auxiliary processor 21(i) itself performs bounds checking, through the heap and stack limit registers 112 and 113 (FIG. 2C), either the node processor 20 itself may be freed from that operation, or alternatively the bounds checking performed by the auxiliary processor may be a second check to verify that the auxiliary processor will be permitted to process data in the storage locations at the addresses provided by the node processor 20. In addition, it will be appreciated that, if a processing node 11(i) has a plurality of auxiliary processors 21(i), they may also have diverse non-overlapping values in their limit registers 112 and 113, which may specify data belonging to diverse processes which the auxiliary processors 21(i) may be processing in parallel under control of the node processor 20.

Furthermore, the formats of the various auxiliary processing instructions which control the local operations by the auxiliary processors 21(i) are quite efficient. Since a single auxiliary processing instruction can specify both a load/store operation and a data processing operation, the auxiliary processors 21(i) can perform both operations concurrently. In addition, as described above, the data which is loaded into the register file 34 can at the same time be used as an operand in the data processing operation for the same auxiliary processing instruction, which can speed up processing.

In addition, since the auxiliary processor 21(i) normally operates with the memory banks 24(i)(j) in "fast page mode" as described above, it will normally provide only a column address to the memory banks 24(i)(j), and will only provide a row address to the memory banks 24(i)(j) if an access is to for a different row than was previously accessed. It will be appreciated that this will generally facilitate a faster accessing of memory that would be the case if the memory banks 24(i)(j) are not operated in fast page mode and the auxiliary processor 21(i)(j) provided the row address for every access. The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the united states is:

1. A massively-parallel computer comprising a plurality of processing nodes and at least one control node interconnected by a network for facilitating the transfer of data among the processing nodes and of commands from the control node to the processing nodes, each processing node comprising:

A. an interface for transmitting data over, and receiving data and commands from, said network;

B. at least one memory module for storing data in a plurality of storage locations each identified by an address;

C. a node processor for receiving commands received by the interface and for processing data in response thereto, said node processor generating (i) auxiliary processing instructions, (ii) memory access requests for facilitating the retrieval of data from or storage of data in said memory module, and (iii) said node processor further controlling the transfer of data over said network by said interface; and D. an auxiliary processor connected to said memory module, said auxiliary processor including:

(i) a memory interface for performing memory access operations in response to said memory access requests from said node processor, to store data received from said memory module for transfer to said node processor, (ii) a data processor for performing data processing operations in response to said auxiliary processing instructions from said node processor, said data processor including a data processing circuit and a resister file that includes a plurality of registers each identified by a resister identification, said data processor, also in response to data processing control signals, performing data processing elemental operations and generating processed data items which correspond to input data items that represent the contents of selected registers and storing the processed data items in selected registers, the input data items that are provided for each elemental operation and the processed data items that are produced for each elemental operation representing vector elements of corresponding vectors; and (iii) a control interface for receiving (a) said auxiliary processing instructions from said node processor and for generating data processing control signals in response thereto, and (b) said memory access requests from said node processor and for generating memory access control signals in response thereto, (iv) said control interface further selectively generating memory access control signals in response to receipt of auxiliary processing instructions, an address, a data processing identifier that identifies one of a plurality of data processing operations, and a load/store identifier that includes a register identifier, said control interface in response to a load/store identifier that identifies a load operation enabling said memory module to selectively retrieve data from a storage location in said memory module identified by the received address for transfer to the identified resister in said data processor, and in response to a load/store identifier that identifies a store operation enabling said memory module to store in a storage location identified by the received address data received from said identified register in said data processor, (v) said control interface further including a conditionalizing circuit for selectively disabling execution by said data processor of selected elemental operations by disabling storage of processed data items generated by said data processing circuit for said selected elemental operations, said conditionalizing circuit including:

a. a vector mask register including a plurality of vector mask bits, each vector mask bit being associated with an elemental operation, and each bit having a selected condition;

b. a mask bit selection circuit for selecting a vector mask register for an elemental operation; and c. a storage control circuit for controlling storage of processed data items by said register file for an elemental operation in response to the condition of the selected vector mask bit.

2. A computer as defined in claim 1 in which said conditionalizing circuit includes:
   A. a vector mask register including a plurality of vector mask bits, each vector mask bit being associated with an elemental operation, and each bit having a selected condition;
   B. a mask bit selection circuit for selecting a vector mask bit of said vector mask register for an elemental operation; and
   C. a storage control circuit for controlling storage of processed data items by said register file for an elemental operation in response to the condition of the selected vector mask bit.

3. A computer as defined in claim 1 in which said conditionalizing circuit further includes a processor mode flag having a selected condition, the storage control circuit further operating in response to the condition of said processor mode flag, in response to the processor mode flag having one selected condition the storage control circuit controlling storage of processed data by said register file in response to the condition of the selected vector mask bit, and in response to the processor mode flag having a second selected condition the storage control circuit enabling storage of processed data items by said register file.

4. A computer as defined in claim 3 in which, in response to a load/store instruction, said control circuit generates memory access control signals to enable, for each of a plurality of successive elemental operations, said memory interface to perform a memory access operation and said register file to perform a register access operation to selectively facilitate the transfer of data between a selected storage location of said memory module and a selected register of said register file.

5. A computer as defined in claim 4 in which said conditionalizing circuit further selectively disables transfer of data by said register file and memory interface for selected elemental operations in response to the conditions of the vector mask bits, said conditionalizing circuit including a load/store mode flag having selected conditions for selectively controlling use of said vector mask bits to disable such transfers.

6. A computer as defined in claim 1 in which operations for each elemental operation in response to an auxiliary processing instruction proceed through a sequence of processing stages, said control interface in each stage generating processing stage control signals for enabling said register file and said data processing circuit to perform predetermined operations in said stage, said control interface including:
   A. a token generator for, in response to receipt of an auxiliary processing instruction, generating a series of data processing enabling tokens corresponding to the number of elemental operation to be performed;
   B. a data processing token shift register comprising a series of data processing token shift register stages corresponding to the number of processing stages, said token shift register iteratively receiving data processing enabling tokens from said token generator and shifting them through said data processing token shift register stages; and
   C. a series of processing stage control signal generators (46), each associated with one of said data processing stage control signals for enabling said register file and said data processing circuit to perform predetermined operations for the associated stage.

7. A computer as defined in claim 6 further comprising:
   A. an initial token spacing control signal generating circuit (202, 203) for generating a spacing control signal at the expiration of a selected time period following the generation by the token generator of the first of a series of data processing enabling tokens for an auxiliary processing instruction;
   B. a scheduler circuit (200) for controlling the initiation by the token generator of generating of data processing enabling tokens in response to receipt by the auxiliary processor of an auxiliary processing instruction and the generation by the initial token spacing control circuit of the spacing control signal so that data processing enabling tokens for an auxiliary processing instruction will have a selected spacing relationship in said processing stages with respect to a preceding auxiliary processing instruction.

* * * * *